(12) United States Patent
Shibata et al.

(10) Patent No.: US 8,270,800 B2
(45) Date of Patent: Sep. 18, 2012

(54) INFORMATION PROCESSING APPARATUS AND METHOD, RECORDING MEDIUM, AND PROGRAM

(75) Inventors: Shojiro Shibata, Kanagawa (JP); Shuji Tsunashima, Tokyo (JP); Mototsugu Takamura, Kanagawa (JP); Kyohei Koyabu, Kanagawa (JP); Shinjiro Kakita, Kanagawa (JP); Mitsuhisa Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 2014 days.

(21) Appl. No.: 11/255,205

(22) Filed: Oct. 21, 2005

(65) Prior Publication Data
US 2006/0133770 A1 Jun. 22, 2006

(30) Foreign Application Priority Data

Oct. 26, 2004 (JP) .................................. 2004-311559
Aug. 24, 2005 (JP) .................................. 2005-242160

(51) Int. Cl.
*H04N 5/765* (2006.01)
*H04N 5/931* (2006.01)

(52) U.S. Cl. ........................................ 386/200; 386/204
(58) Field of Classification Search .................. 386/46
See application file for complete search history.

(56) References Cited

U.S. PATENT DOCUMENTS

| | | | | |
|---|---|---|---|---|
| 5,943,102 | A * | 8/1999 | Hoshi ............................ | 348/715 |
| 6,356,702 | B1 * | 3/2002 | Suzuki ............................ | 386/68 |
| 6,408,030 | B1 * | 6/2002 | Koda ........................ | 375/240.26 |
| 2001/0009567 | A1 * | 7/2001 | Tsuboi ........................ | 375/240.25 |
| 2001/0048805 | A1 * | 12/2001 | Adolph et al. .................. | 386/95 |
| 2004/0228412 | A1 * | 11/2004 | Okawahara et al. ...... | 375/240.25 |

FOREIGN PATENT DOCUMENTS

JP 2004-274694 9/2004

OTHER PUBLICATIONS

U.S. Appl. No. 11/257,360, filed Oct. 25, 2005, Shibata, et al.
U.S. Appl. No. 12/633,457, filed Dec. 8, 2009, Shibata, et al.

\* cited by examiner

*Primary Examiner* — William C Vaughn, Jr.
*Assistant Examiner* — Oluwaseun A Adegeye
(74) *Attorney, Agent, or Firm* — Oblon, Spivak, McClelland, Maier & Neustadt, L.L.P.

(57) ABSTRACT

An information processing apparatus decodes compression-coded video data including I-pictures, P-pictures, and B-pictures. The information processing apparatus includes at least one decoder decoding the compression-coded video data, a supply controller controlling the supply of the compression-coded video data to the decoder, and a controller controlling processing executed by the supply controller and the decoder. The decoder includes a bank memory for storing decoded picture data, and the controller controls the timing at which a picture stored in the bank memory is released by changing the value of a first counter indicating a number of times for which the picture stored in the bank memory is referred to when a P-picture or a B-picture is decoded by the decoder.

21 Claims, 50 Drawing Sheets

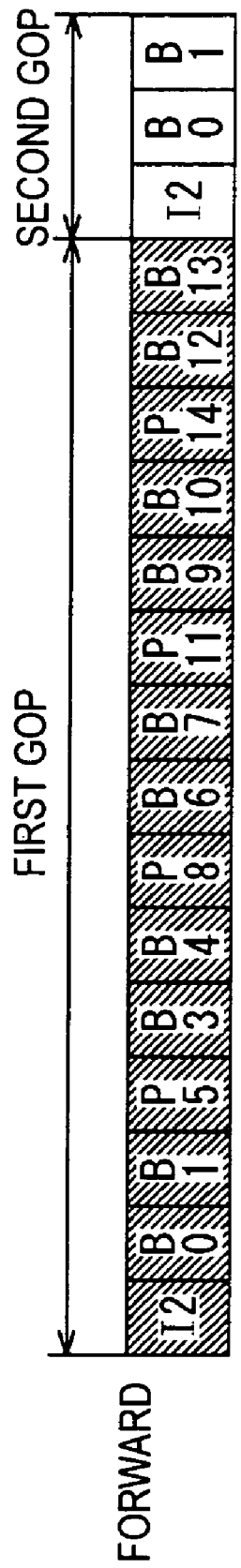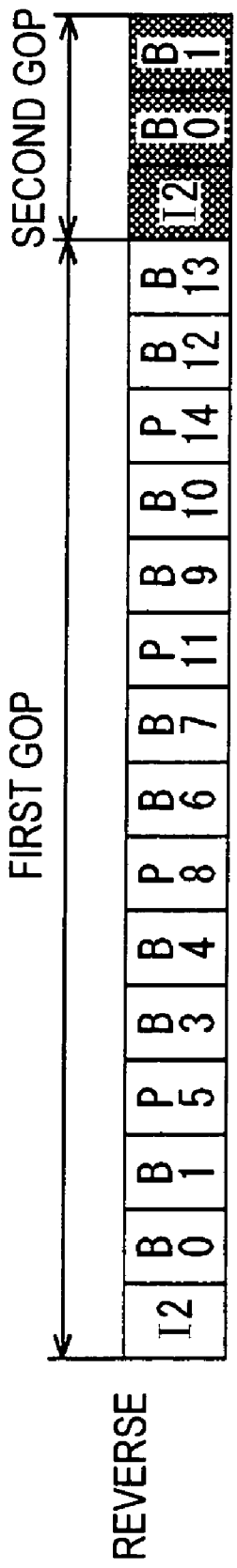

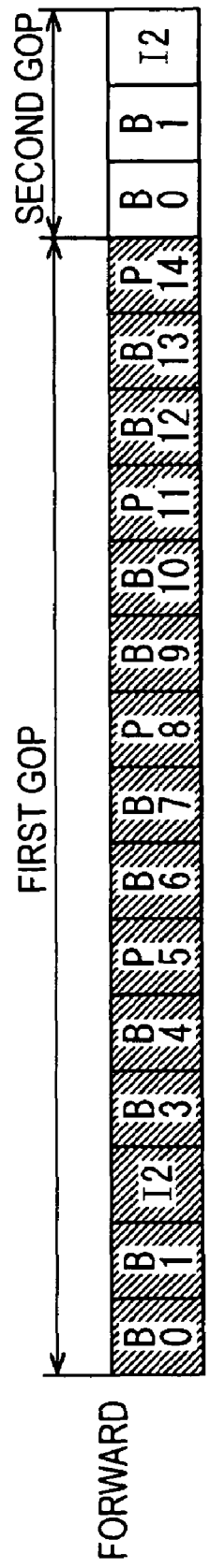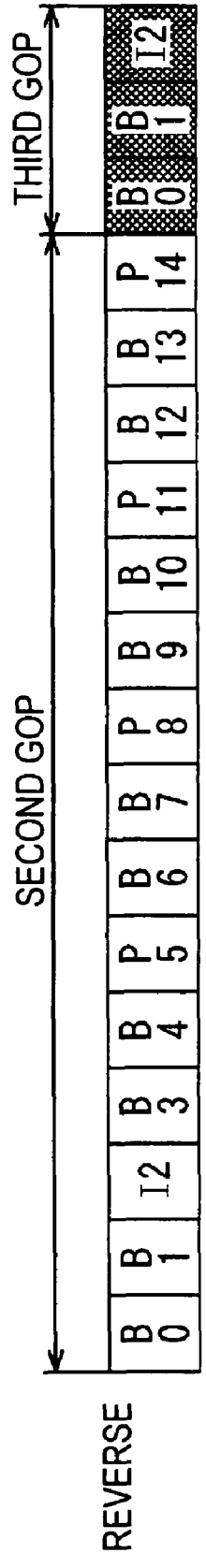

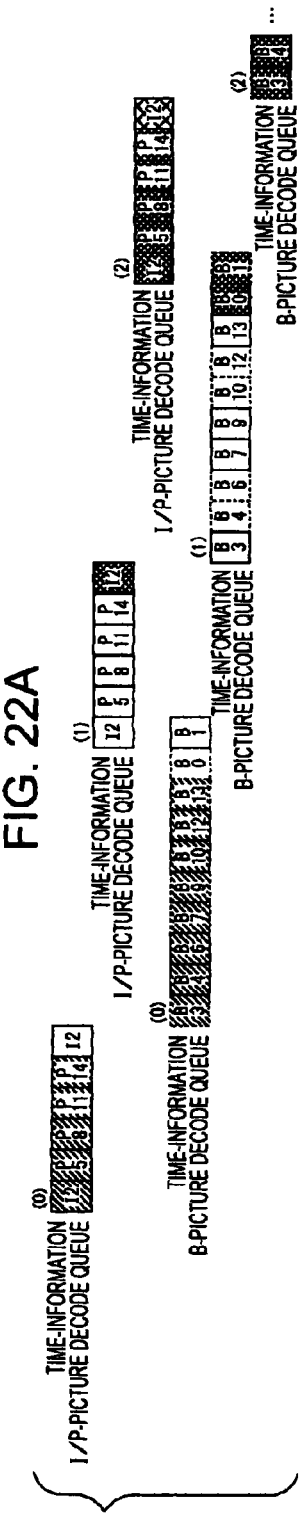
FIG. 22A
FIG. 22B

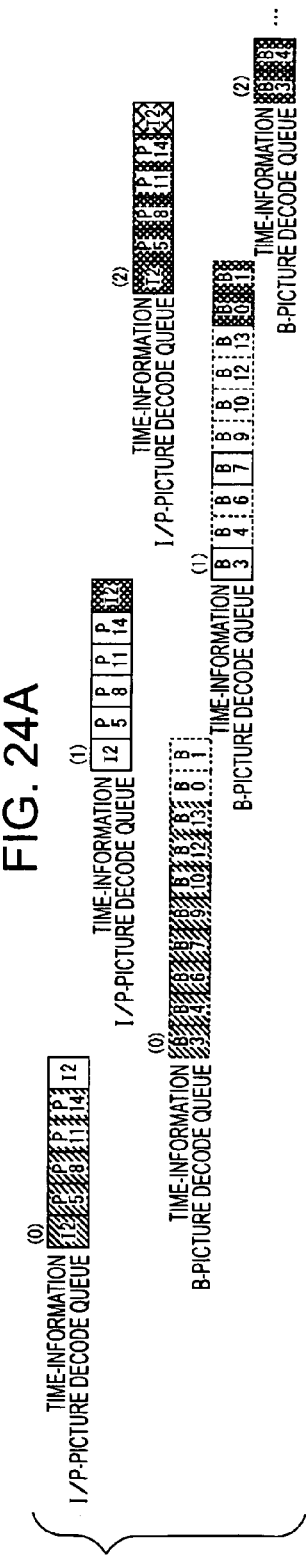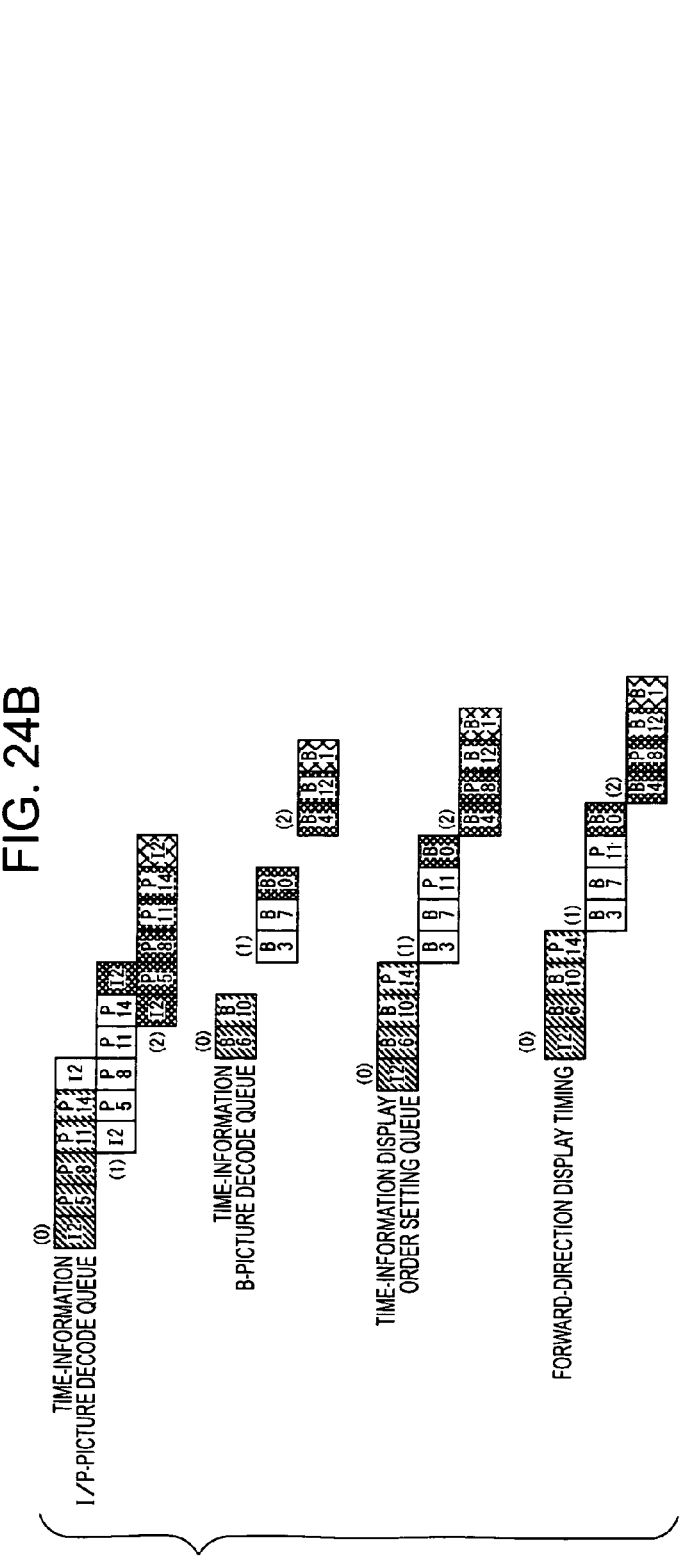

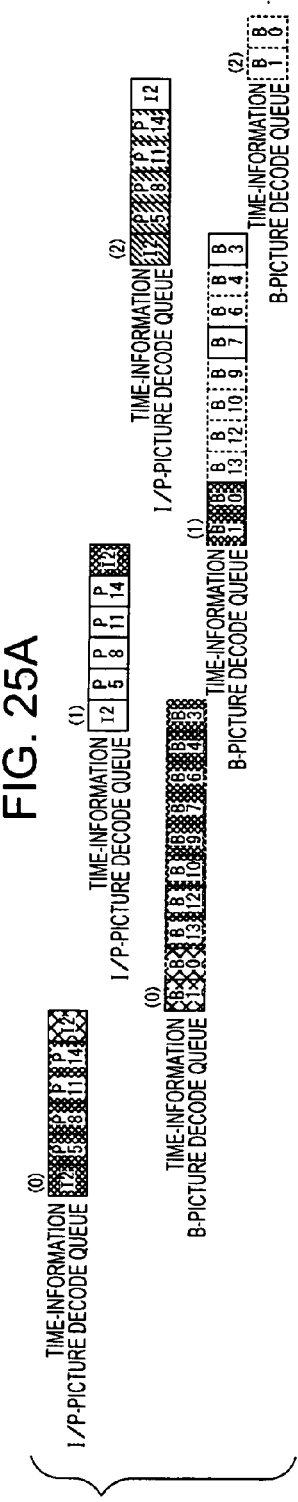

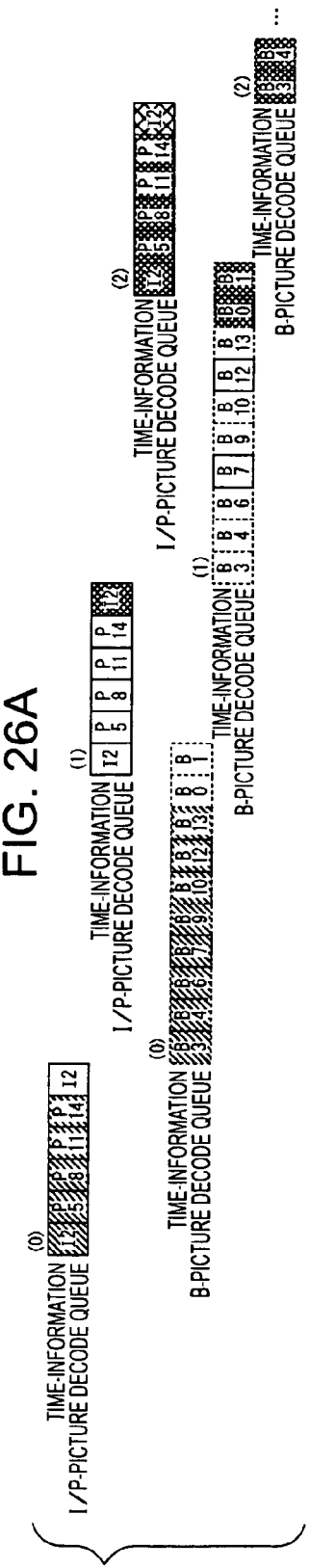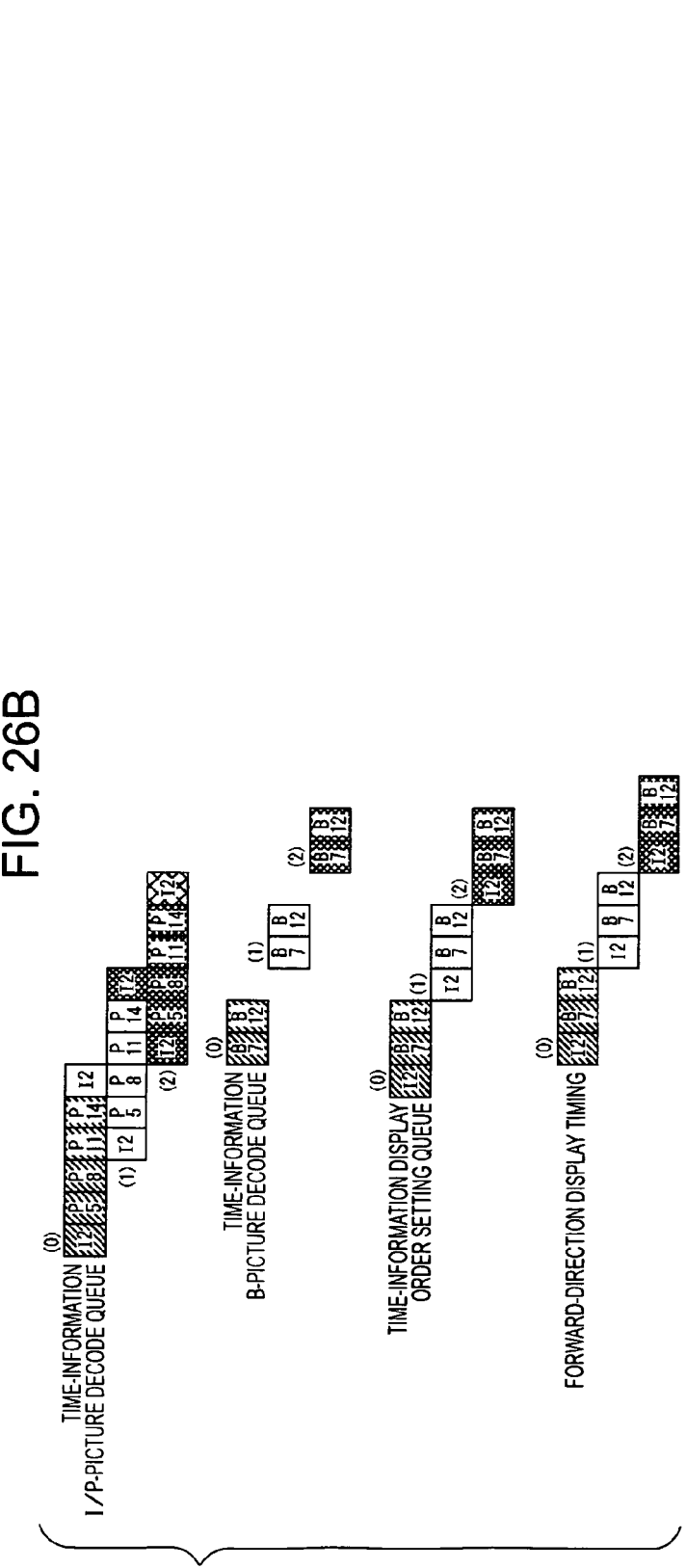
FIG. 26A
FIG. 26B

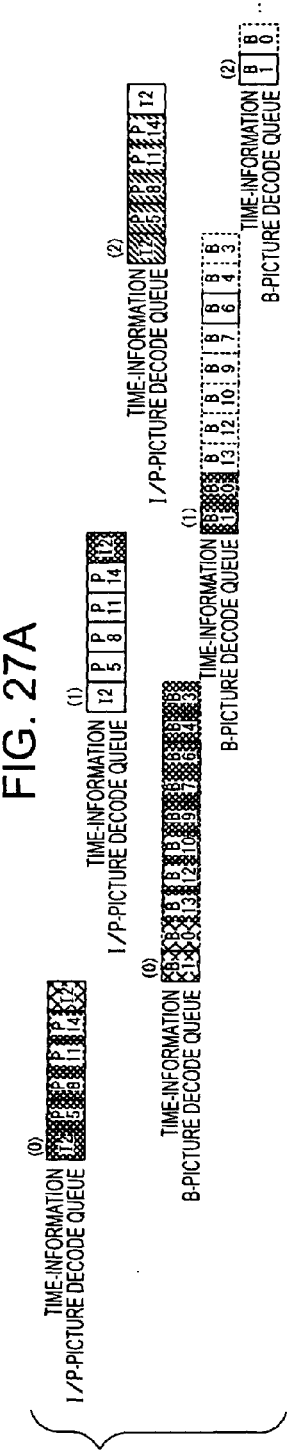
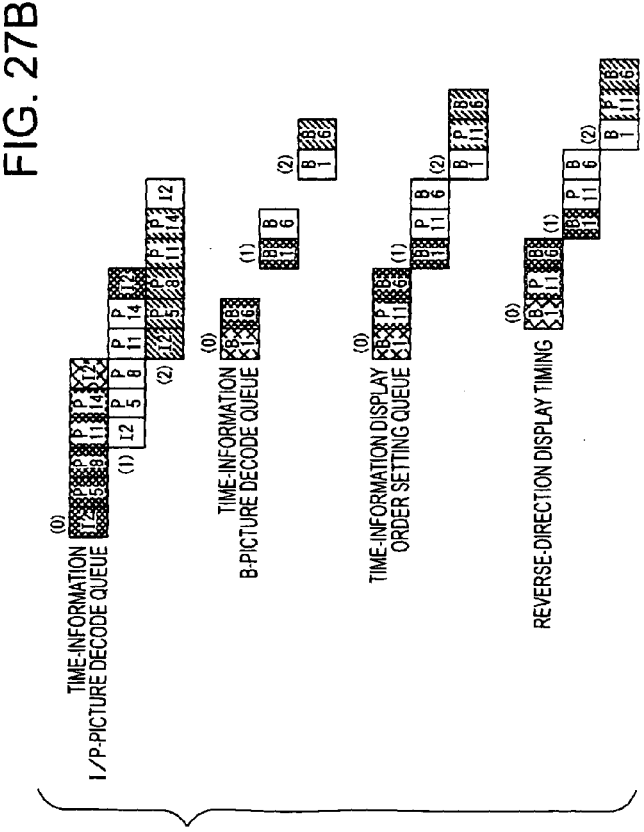
FIG. 27A
FIG. 27B

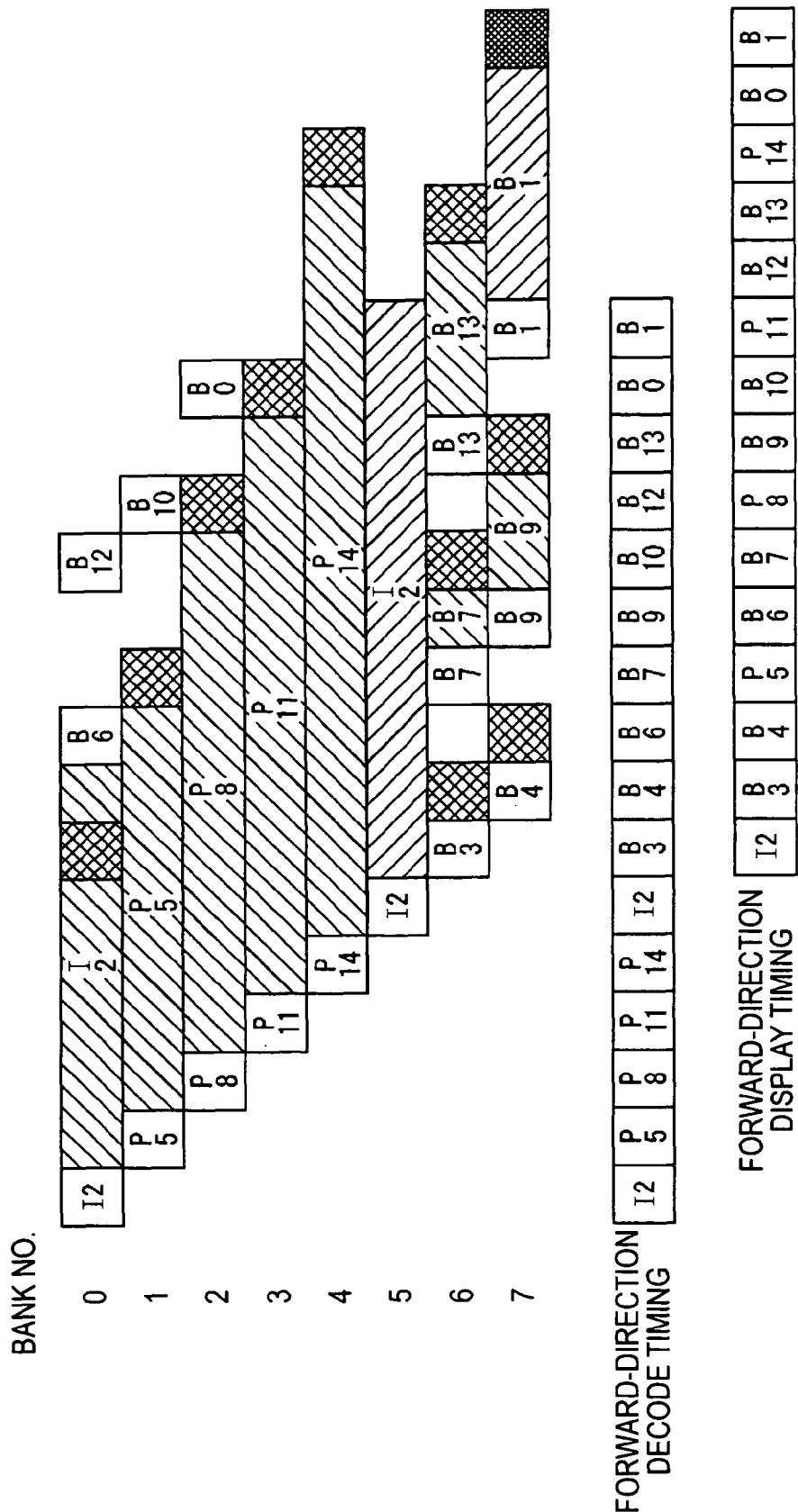

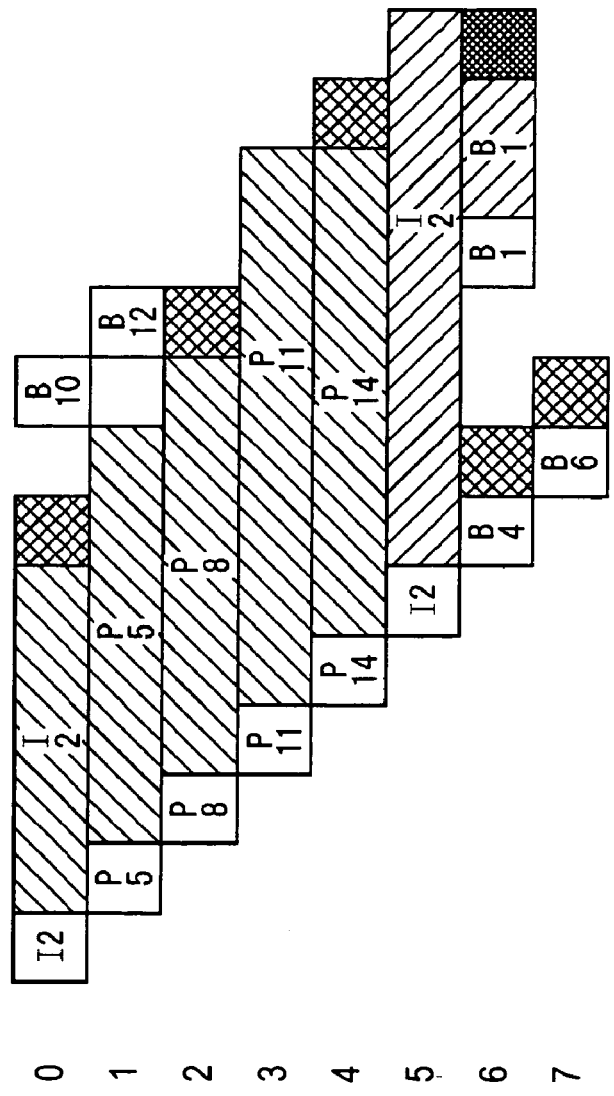

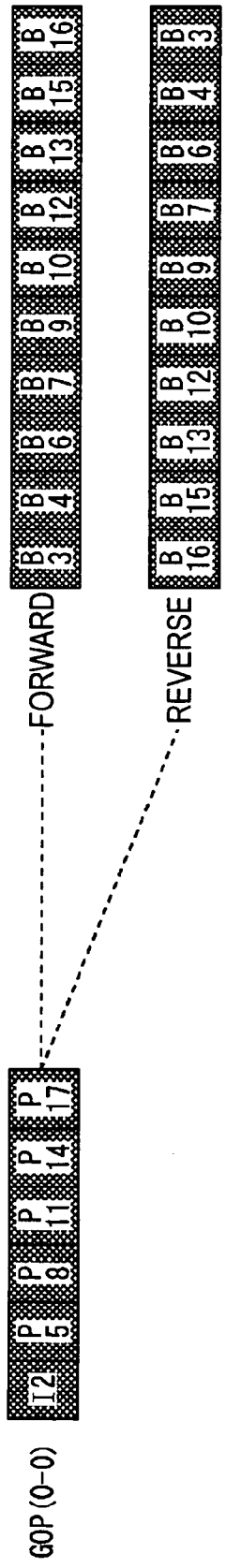
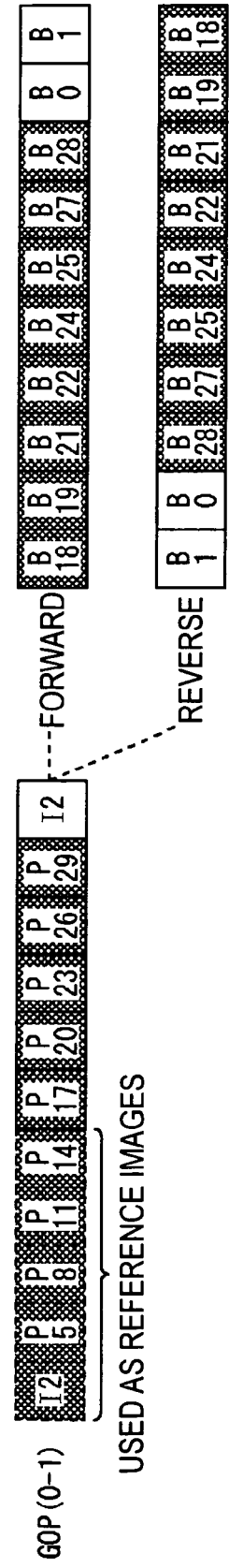
FIG. 36A
FIG. 36B

FORWARD
GOP (0-0) | P5 | I2 | P5 | P8 | I2 | --- | B3 B4 | B0 B1 | B3 B4 | B6 B7 | B0 B1 |

FIG. 40B

REVERSE
GOP (0-0) | I2 | I2 | P5 | P8 | I2 | --- | B1 B0 | B7 B6 | B4 B3 | B1 B0 | B4 B3 |

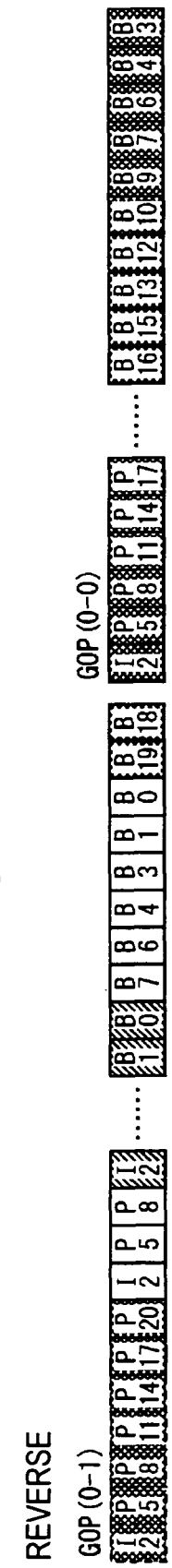
FIG. 43A
FIG. 43B

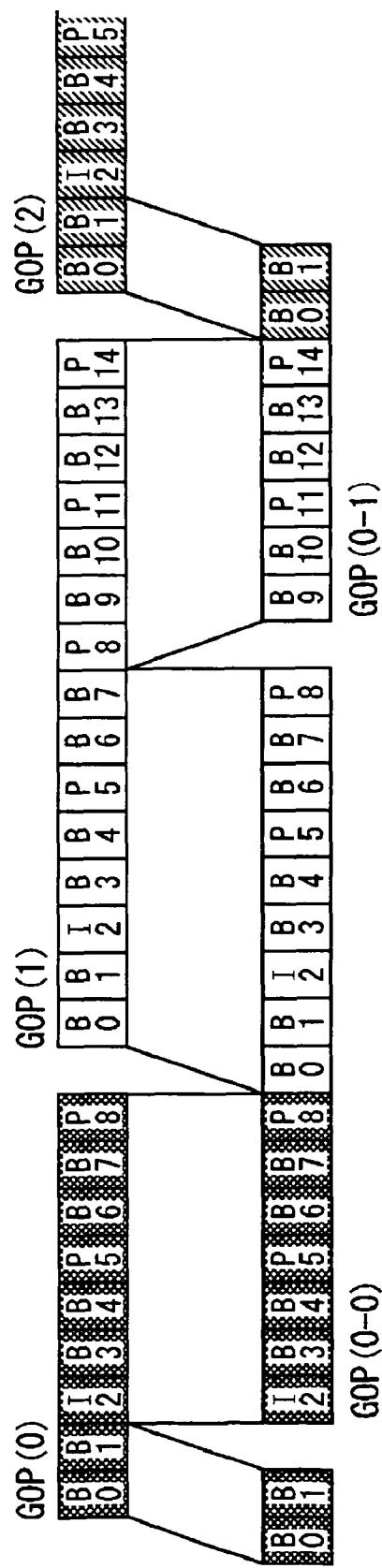

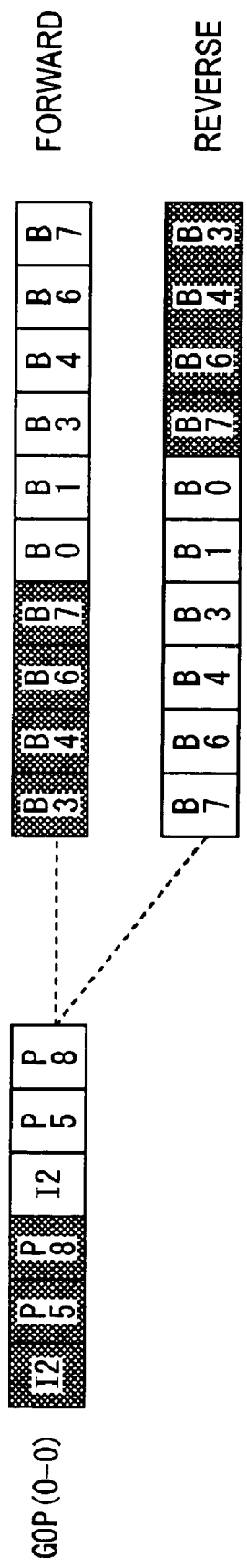
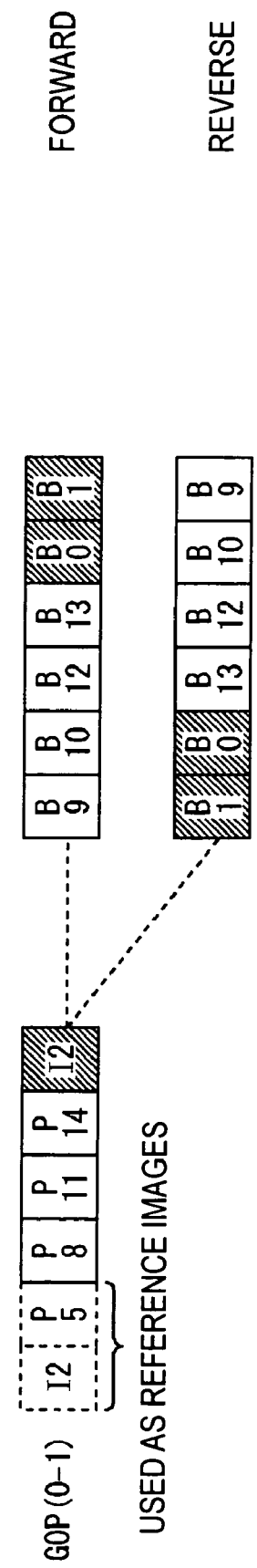
FIG. 45A
FIG. 45B

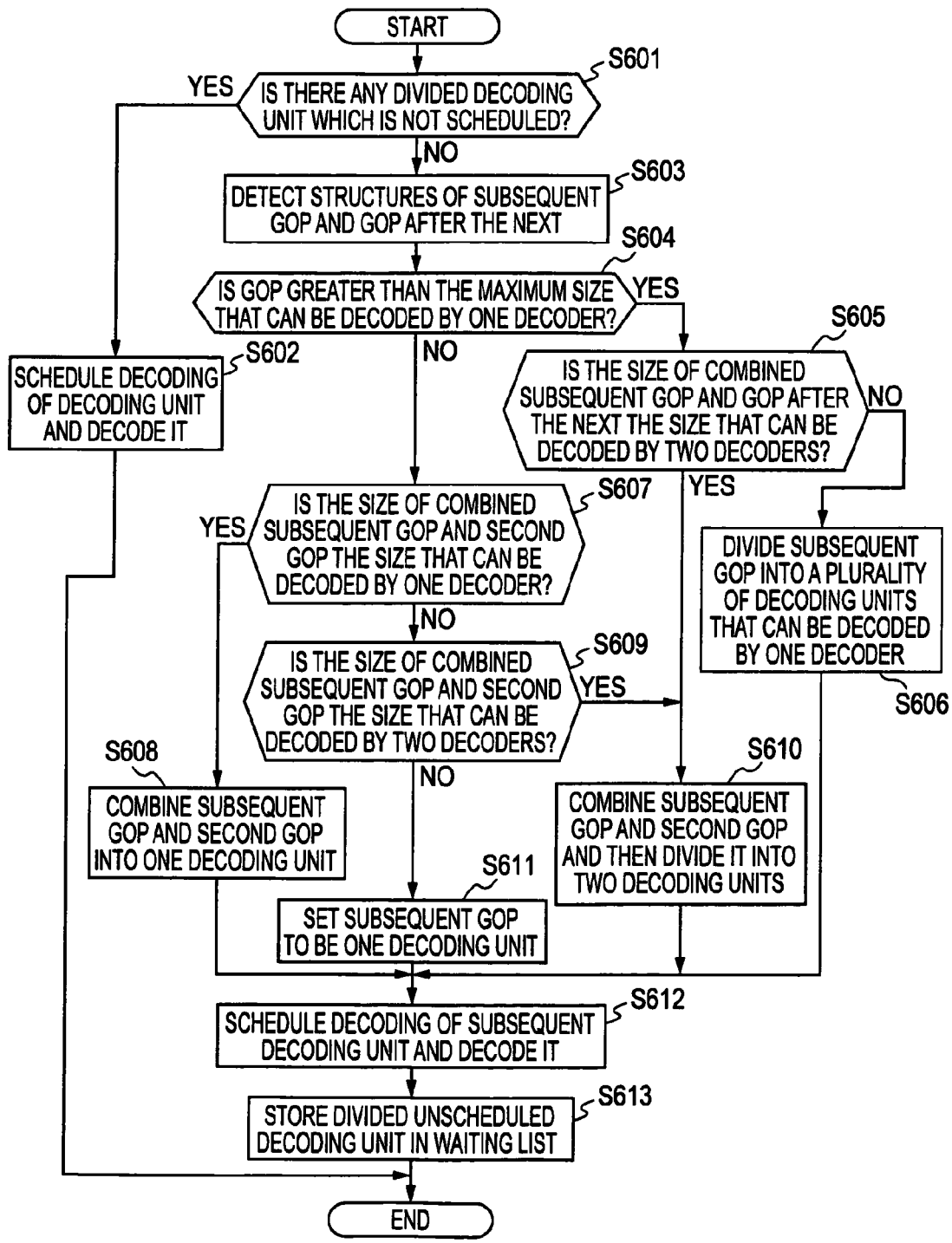

INFORMATION PROCESSING APPARATUS AND METHOD, RECORDING MEDIUM, AND PROGRAM

CROSS REFERENCES TO RELATED APPLICATIONS

The present invention contains subject matter related to Japanese Patent Application JP 2004-311559 filed in the Japanese Patent Office on Oct. 26, 2004 and Japanese Patent Application JP 2005-242160 filed in the Japanese Patent Office on Aug. 24, 2005, the entire contents of which are incorporated herein by reference.

BACKGROUND OF THE INVENTION

1. Field of the Invention

The present invention relates to information processing apparatuses and methods, recording media, and programs. More particularly, the invention relates to an information processing apparatus and method, a recording medium, and a program in which a fast playback operation, a reverse playback operation, or a reverse fast playback operation can be performed by decoding compression-coded video data even if the capacity of a bank memory is small.

2. Description of the Related Art

As video compression techniques, the Moving Picture Coding Group/Moving Picture Experts Group (MPEG) is widely used. Playback operations performed by decoding stream data coded by an MPEG method include, not only a normal playback operation, but also a fast playback operation or a reverse-direction playback operation.

For example, in MPEG long groups of pictures (GOPs), each GOP including 15 pictures, a fast playback operation can be performed at ×-3 to ×3 (the sign "-" in the speed indicates that the playback operation is performed in the reverse direction, and the same applies to the following description) by omitting bidirectionally predictive-coded (B)-pictures before being input into a decoder (for example, see Japanese Unexamined Patent Application Publication No. 8-98142). Additionally, a table indicating picture information to be displayed is provided for each playback speed so that playback operations can be performed at different speeds of the same number as that of tables.

Another playback technique is disclosed in Japanese Unexamined Patent Application Publication No. 8-56334. In this technique, 10 frames of a compression-coded signal are obtained intermittently at intervals of 5 frames. After demodulating all the 10 frames of the compression-coded signal, they are alternately supplied to two decoders, five frames to each decoder, and they are decoded and then written into a memory. The memory reads every other frame so that a ×2 playback signal can be output.

MPEG streams are best suited to a playback operation in the forward direction. For example, in MPEG long GOPs, the coding order of 15 pictures, i.e., intra-coded (I)-pictures, predictive-coded (P)-pictures, and B-pictures, forming one GOP is I(2), B(0), B(1), P(5), B(3), B(4), P(8), B(6), B(7), P(11), B(9), B(10), P(14), B(12), and B(13) (the numbers in parentheses indicate the order when the GOP pictures are rearranged in the display order from the coding order). P-pictures predict from one preceding I-pictures or P-pictures, and B-pictures predict from one preceding I-pictures or P-pictures and two preceding I-pictures or P-pictures in the coding order. Accordingly, by reserving two banks of a reference image memory, both the P-pictures and B-pictures can be decoded, thereby enhancing the efficient use of the memory.

To play back MPEG streams best suited to a forward-direction playback operation in the reverse direction, the following technique has been proposed in Japanese Unexamined Patent Application Publication No. 10-150635. A plurality of decoders are used for performing decoding processing, and a GOP immediately before a GOP to be decoded is added and the two GOPs are supplied to a decoder. This enables the correct use of reference images of pictures to be played back even in the reverse-direction playback operation.

SUMMARY OF THE INVENTION

In the technique disclosed in Japanese Unexamined Patent Application Publication No. 8-98142, although fast playback operations at ×-3 to ×3 can be implemented by omitting B pictures before being input into a decoder, the display interval of pictures becomes irregular, thereby making the displayed image unnatural.

The technique in which a plurality of decoder chips are used for performing decoding processing can be combined with processing for omitting B-pictures which are not to be displayed at the input stage. With this combination, a fast playback operation can be implemented (for example, ×2 with two decoder chips, ×4 with three decoder chips, ×5 with four decoder chips, and ×7 with five decoder chips) at regular intervals. In this case, however, the omission of I-pictures or P-pictures is necessary during output processing, which increases the complexity of the control operation for a baseband memory or processing for selecting data to be displayed from decoded data. Thus, it is difficult to perform a display operation by dynamically changing the playback speed by the use of known techniques.

As stated above, by providing a table indicating picture information to be displayed for each playback speed, playback operations at different speeds of the same number as that of the tables can be implemented. In this processing, however, the playback speed is switched in units of tables, and complicated control is required for smoothly displaying images when switching the speed.

As stated above, MPEG streams are best suited to a forward-direction playback operation. In a reverse-direction playback operation in the input order of MPEG streams, when performing a reverse-direction playback operation after decoding one GOP, a frame memory storing at least one GOP (for example, 15 frames) is necessary, and many reference image data banks should be reserved, thus requiring a large memory capacity.

In view of this background, it is desirable to achieve a fast playback operation, a reverse playback operation, and a reverse-direction fast playback operation by decoding compression-coded video data even if the capacity of a bank memory is small.

According to an embodiment of the present invention, there is provided an information processing apparatus includes: at least one decode means for decoding compression-coded video data; supply control means for controlling the supply of the compression-coded video data to the decode means; and control means for controlling processing executed by the supply control means and the decode means. The decode means includes a bank memory for storing decoded picture data, and the control means controls the timing at which a picture stored in the bank memory is released by changing the value of a first counter indicating the number of times for which the picture stored in the bank memory is referred to when a P-picture or a B-picture is decoded by the decode means.

The control means may release a picture stored in the bank memory by referring to the value of a second counter indicating whether the picture stored in the bank memory has been displayed.

The control means may determine the order of decoding processing for a plurality of pictures contained in a decoding processing unit for the decoding processing performed by the decode means so that I-pictures and P-pictures are decoded before B-pictures.

The bank memory may have the number of banks in accordance with the number of pictures contained in a decoding processing unit for the decoding processing performed by the decode means.

The decode means may include the bank memory storing the number of pictures greater than the number of I-pictures and P-pictures contained in the decoding processing unit by two.

The number of the decode means may be three, and each of the decode means may include the bank memory storing 8 pictures.

The control means may select pictures to be output from the decode means from among pictures contained in a decoding processing unit for the decoding processing performed by the decode means on the basis of a playback speed instruction provided by playback speed instruction means. The decode means may include decode processing execution means for executing decoding processing, and picture supply control means for controlling the supply of pictures to the decode processing execution means. The picture supply control means may supply, under the control of the control means, I-pictures and P-pictures, and B-pictures to be selected as pictures output from the decode means to the decode processing execution means among the pictures contained in the decoding processing unit. The decode processing execution means may decode each of the pictures supplied from the picture supply control means and may also output the pictures selected as pictures to be output from the decode means under the control of the control means.

When the picture at the head of the decoding processing unit is an I-picture or a P-picture among the decoded pictures output from the decode means, the control means may control the decode means so that the decode start timing at which the decode means starts decoding and the display output timing at which the decode means starts outputting the decoded pictures are displaced from each other by a first predetermined number of pictures.

The first predetermined number may be greater than a total number of I-pictures and P-pictures by one.

When the picture at the head of the decoding processing unit is a B-picture among the decoded pictures output from the decode means, the control means may control the decode means so that the decode start timing at which the decode means starts decoding and the display output timing at which the decode means starts outputting the decoded pictures are displaced from each other by a second predetermined number of pictures.

The second predetermined number may be greater than a total number of I-pictures and P-pictures by two.

A plurality of the decode means may be provided. The information processing apparatus may further include output switch means for receiving non-compressed data output from the plurality of decode means and for selectively outputting the received non-compressed data. The control means may further control processing performed by the output switch means.

The decode means may include the bank memory having the number of banks smaller than the number of pictures contained in a decoding processing unit for the decoding processing performed by the decode means.

The compression-coded video data may include GOPs. Upon receiving a GOP including I-pictures or P-pictures having a number greater than the value obtained by subtracting three from the number of banks of the bank memory, the control means may divide the GOP into decoding processing units, each including I-pictures or P-pictures having a number smaller than the value obtained by subtracting two from the number of banks of the bank memory, and may control the supply control means to supply the compression-coded video data of the decoding processing units to the decode means.

The control means may form the decoding processing units such that the total number of the I-pictures or the P-pictures contained in the divided decoding processing units does not become greater by a predetermined number or more than a total number of I-pictures or P-pictures contained in a temporally prior GOP or contained in a temporally prior decoding unit.

The compression-coded video data may include GOPs. Upon receiving a first GOP including I-pictures or P-pictures having a number smaller than the value obtained by subtracting three from the number of banks of the bank memory, the control means may detect the structure of a second GOP temporally continuous from the first GOP, and, if the total number-of the I-pictures or the P-pictures contained in the first GOP and the second GOP is smaller than the value obtained by subtracting three from the number of banks of the bank memory, the control means may combine the first GOP and the second GOP to form a decoding processing unit, and may control the supply control means to supply the compression-coded video data of the decoding processing unit to the decode means.

The control means may form the decoding processing unit such that the total number of the I-pictures or the P-pictures contained in the combined decoding processing unit does not become greater than the total number of I-pictures and P-pictures contained in a temporally prior GOP by a predetermined number or more.

The compression-coded video data may include GOPs. The control means may detect the structure of a first GOP and a structure of a second GOP temporally continuous from the first GOP, and if the total number of I-pictures or P-pictures contained in the first GOP and the second GOP is smaller than a twice a value obtained by subtracting three from the number of banks of the bank memory, the control means may combine the first GOP and the second GOP and then divides the combined GOP to form a first decoding processing unit and a second decoding processing unit, each including the I-pictures or the P-pictures smaller than the value obtained by subtracting two from the number of banks of the bank memory. The control means may control the supply control means to individually supply the compression-coded video data of the first decoding processing unit and the compression-coded video data of the second decoding processing unit to the decode means.

The control means may form the first decoding processing unit and the second decoding processing unit such that the total number of the I-pictures or the P-pictures contained in the first decoding processing unit and the second decoding processing unit does not become greater than the total number of the I-pictures or the P-pictures of a temporally prior decoding processing unit or a temporally prior GOP by a predetermined number or more.

According to another embodiment of the present invention, there is provided an information processing method, a recording medium recording a program thereon, and a program. The information processing method and the program include the steps of: setting a counter indicating the number of times for referring to each of a plurality of pictures including I-pictures, P-pictures, and B-pictures contained in a decoding processing unit for executing decoding processing; determining the order of the decoding processing for the pictures contained in the decoding processing unit so that the I-pictures and the P-pictures are decoded before the B-pictures; controlling the execution of the decoding processing on the basis of the determined order of the decoding processing by using a bank memory having a number of banks which is determined in accordance with the number of pictures contained in the decoding processing unit; and controlling the timing at which a picture stored in the bank memory is released by changing the value of the counter when a P-picture or a B-picture is decoded in the controlled decoding processing.

According to the above-described information processing apparatus, the information processing method, the recording medium, and the program, decoding is performed by using a bank memory. A counter indicating the number of times for which pictures stored in the bank memory are referred to is provided, and the value of the counter is changed when decoding a P-picture or a B-picture. Thus, the timing at which pictures stored in the bank memory are released is controlled. As a result, even if the capacity of the bank memory is small, a fast playback operation, a reverse-direction playback operation, or a fast reverses-direction playback operation can be performed by decoding compression-coded video data.

According to another embodiment of the present invention, there is provided an information processing apparatus including: storage means for storing compression-coded video data; readout means for reading out the compression-coded video data from the storage means; decode means for decoding the compression-coded video data; supply control means for controlling the supply of the compression-coded video data to the decode means; control means for controlling processing executed by the supply control means and the decode means; and playback speed instruction means for providing a playback speed instruction to the control means. The decode means includes a bank memory for storing decoded picture data, and the control means controls the timing at which a picture stored in the bank memory is released by changing the value of a counter indicating the number of times for which the picture stored in the bank memory is referred to when a P-picture or a B-picture is decoded by the decode means.

According to another embodiment of the present invention, there is provided an information processing method, a recording medium recording a program thereon, and a program. The information processing method and the program includes the steps of: reading out compression-coded video data stored in a storage unit; setting a counter indicating the number of times for referring to each of a plurality of pictures including I-pictures, P-pictures, and B-pictures contained in a decoding processing unit for executing decoding processing; determining the order of the decoding processing for the pictures contained in the decoding processing unit so that the I-pictures and the P-pictures are decoded before the B-pictures; controlling the execution of the decoding processing on the basis of the determined order of the decoding processing by using a bank memory having a number of banks in accordance with the number of pictures contained in the decoding processing unit; and controlling the timing at which a picture stored in the bank memory is released by changing the value of the counter when, among the pictures contained in the decoding processing unit of the read compression-coded video data, a P-picture or a B-picture is decoded in the controlled decoding processing.

According to the above-described information processing apparatus, the information processing method, the recording medium, and the program, compression-coded video data stored in the storage unit is read, and in response to a playback speed instruction, the execution of the decoding processing is controlled by using a bank memory. A counter indicating the number of times for which pictures stored in the bank memory are referred to is provided, and the value of the counter is changed when decoding a P-picture or a B-picture. Thus, the timing at which pictures stored in the bank memory are released is controlled. As a result, even if the capacity of the bank memory is small, a fast playback operation, a reverse-direction playback operation, or a fast reverses-direction playback operation can be performed by decoding compression-coded video data.

BRIEF DESCRIPTION OF THE DRAWINGS

FIGS. 9A and 9B illustrate information stored in an input picture queue;

FIGS. 10A and 10B illustrate information stored in a display order information queue;

FIGS. 22A and 22B illustrate decode and display scheduling before and after performing omission of pictures in a ×2 playback operation;

FIGS. 24A and 24B illustrate decode and display scheduling before and after performing omission of pictures in a ×4 playback operation;

FIGS. 25A and 25B illustrate decode and display scheduling before and after performing omission of pictures in a ×−4 playback operation;

FIGS. 26A and 26B illustrate decode and display scheduling before and after performing omission of pictures in a ×5 playback operation;

FIGS. 27A and 27B illustrate decode and display scheduling before and after performing omission of pictures in a ×−5 playback operation;

FIG. 28 illustrates bank control in a ×1 playback operation;

FIG. 29 illustrates bank control in a ×2 playback operation;

FIGS. 35 through 37B illustrate decode units formed by dividing GOPs;

FIGS. 38 through 40B illustrate decode units formed by combining GOPs;

FIGS. 41 through 46B illustrate decode units formed by combining and dividing GOPS;

FIG. 47 is a flowchart illustrating GOP dividing/combining processing;

DESCRIPTION OF THE PREFERRED EMBODIMENTS

Figure 1:
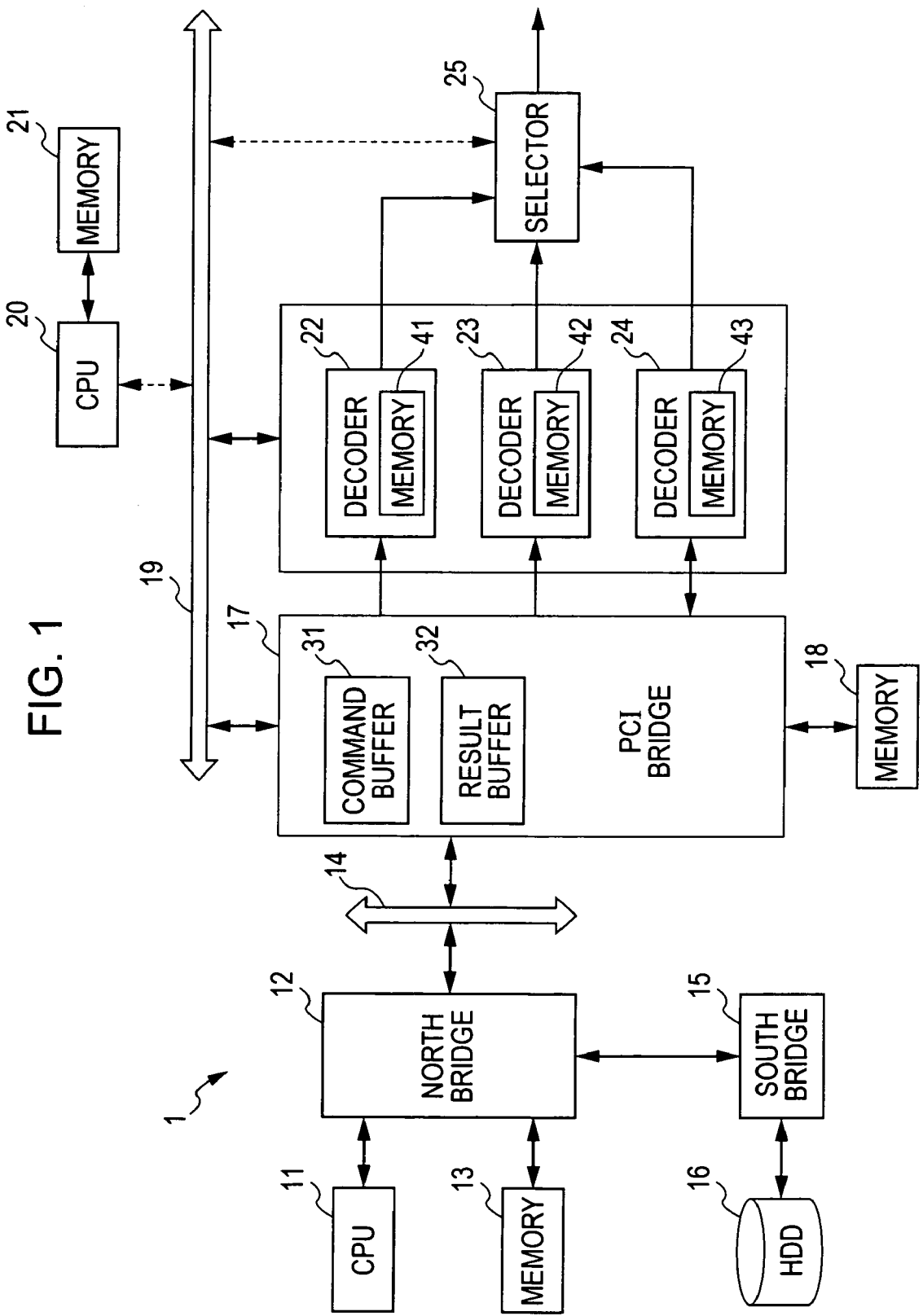
FIG. 1 is a block diagram illustrating the configuration of a playback apparatus according to an embodiment of the present invention.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An information processing apparatus (for example, a playback apparatus 1 shown in FIG. 1) according to an embodiment of the present invention includes: at least one decode means (for example, decoder 22, 23, or 24 shown in FIG. 1) for decoding compression-coded video data; supply control means (for example, PCI bridge 17 shown in FIG. 1) for controlling the supply of the compression-coded video data to the decode means; and control means (for example, a CPU 20 shown in FIG. 1) for controlling processing executed by the supply control means and the decode means. The decode means includes a bank memory for storing decoded picture data, and the control means controls the timing at which a picture stored in the bank memory is released by changing the value of a first counter indicating the number of times for which the picture stored in the bank memory is referred to when a P-picture or a B-picture is decoded by the decode means.

The control means may release a picture stored in the bank memory by referring to the value of a second counter (for example, a self-reference counter) indicating whether the picture stored in the bank memory has been displayed.

The decode means may include a bank memory (for example, a video bank memory 82 shown in FIG. 2) having the number of banks in accordance with the number of pictures contained in a decoding processing unit (for example, in the forward-direction playback operation, a total of 16 pictures including 13 pictures other than first two B-pictures in a first GOP and first three I-, B-, and B-pictures of a second GOP subsequent to the first GOP in the coding order, and in the reverse-direction playback operation, a total of 16 pictures including 13 pictures other than first two B-pictures in the second GOP and first three I-, B-, and B-pictures of a third GOP prior to the second GOP) for the decoding processing performed by the decode means.

The control means may select pictures to be output from the decode means from among pictures contained in a decoding processing unit for the decoding processing performed by the decode means on the basis of a playback speed instructed by playback speed instruction means (for example, a CPU 11 shown in FIG. 1) for providing a playback speed instruction to the control means. The decode means may include decode processing execution means (for example, a decode processor 77 shown in FIG. 2) for executing decoding processing, and picture supply control means (for example, an elementary-stream address determining unit 73 shown in FIG. 2) for controlling the supply of pictures to the decode processing execution means. The picture supply control means may supply, under the control of the control means, I-pictures and P-pictures, and B-pictures to be selected as pictures output from the decode means to the decode processing execution means among the pictures contained in the decoding processing unit. The decode processing execution means may decode each of the pictures supplied from the picture supply control means and may also output the pictures selected as pictures to be output from the decode means under the control of the control means.

A plurality of the decode means may be provided. The information processing apparatus may further include output switch means (for example, a selector 25 shown in FIG. 1) for receiving non-compressed data output from the plurality of decode means and for selectively outputting the received non-compressed data. The control means may further control processing performed by the output switch means.

The first predetermined number (for example, 6) may be greater than a total number of the I-pictures and the P-pictures (for example, 5) by one.

The second predetermined number (for example, 7) may be greater than a total number of the I-pictures and the P-pictures (for example, 5) by two.

Figure 20:
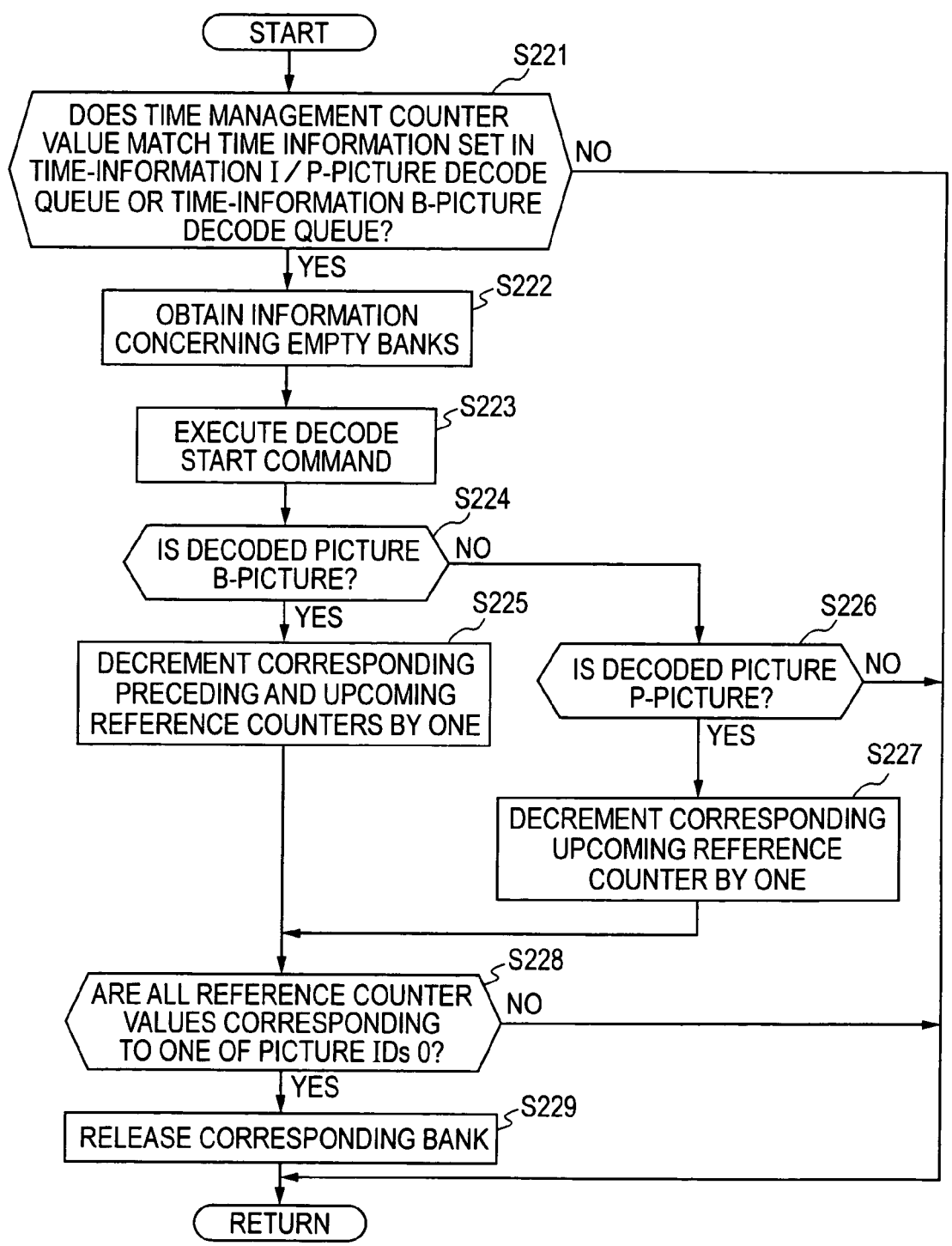
FIG. 20 is a flowchart illustrating decoding processing.
Figure 21:
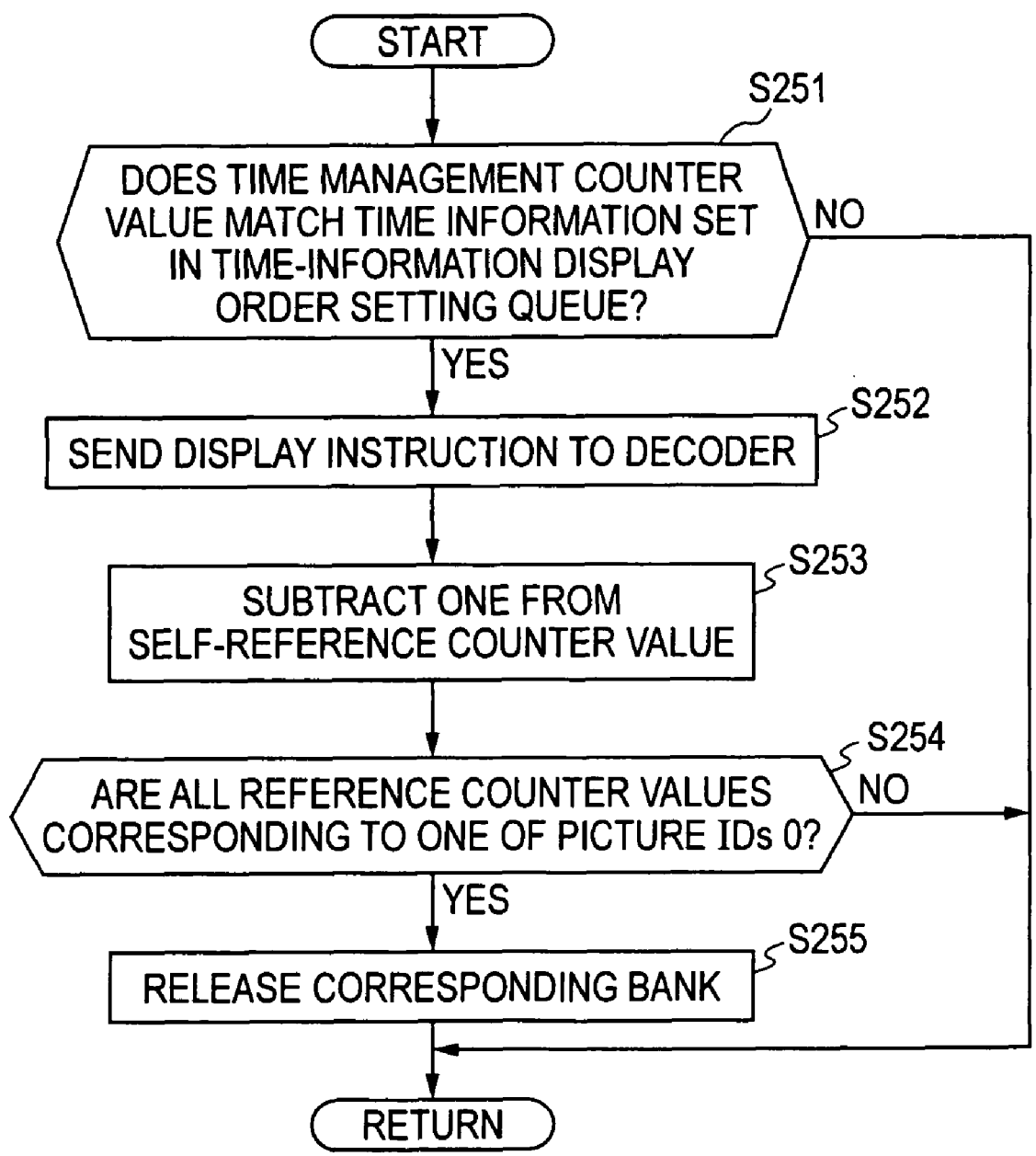
FIG. 21 is a flowchart illustrating display processing.

An information processing method, a program recorded in a recording medium, and a program according to an embodiment of the present invention include the steps of: setting a counter (for example, a preceding reference counter or an upcoming reference counter) indicating the number of times for referring to each of a plurality of pictures including I-pictures, P-pictures, and B-pictures contained in a decoding processing unit (for example, in the forward-direction playback operation, a total of 16 pictures including 13 pictures other than first two B-pictures in a first GOP and first three I-, B-, and B-pictures of a second GOP in the coding order, and in the reverse-direction playback operation, a total of 16 pictures including 13 pictures other than first two B-pictures in the second GOP and first three I-, B-, and B-pictures of a third GOP which is displayed before the second GOP) for executing decoding processing (for example, step S111 shown in FIG. 12); determining the order of the decoding processing for the pictures contained in the decoding processing unit so that the I-pictures and the P-pictures are decoded before the B-pictures (for example, step S127 in FIG. 13); controlling the execution of the decoding processing on the basis of the order of the decoding processing determined in the determining step by using a bank memory (for example, the video bank memory 82 shown in FIG. 2) having a number of banks which is determined in accordance with the number of pictures contained in the decoding processing unit (for example, step S223 in FIG. 20); and controlling the timing at which a picture stored in the bank memory is released by changing the value of the counter when a P-picture or a B-picture is decoded in the decoding processing controlled in the decoding processing execution control step (for example, steps S228 and S229 in FIG. 20 or steps S254 and S255 in FIG. 21).

An information processing apparatus (for example, the playback apparatus 1 shown in FIG. 1) according to another embodiment of the present invention includes: storage means (for example, an HDD 16 shown in FIG. 1) for storing compression-coded video data; readout means (for example, a south bridge 15 shown in FIG. 1) for reading out the compression-coded video data from the storage means; decode means (for example, the decoder 22, 23, or 24 shown in FIG. 1) for decoding the compression-coded video data; supply control means (for example, the PCI bridge 17 shown in FIG. 1) for controlling the supply of the compression-coded video data to the decode means; control means (for example, the CPU 20 shown in FIG. 1) for controlling processing executed by the supply control means and the decode means; and playback speed instruction means (for example, the CPU 11 shown in FIG. 1) for providing a playback speed instruction to the control means. The decode means includes a bank memory for storing decoded picture data, and the control means controls the timing at which a picture stored in the bank memory is released by changing the value of a counter (for example, a preceding reference counter or an upcoming reference counter) indicating the number of times for which the picture stored in the bank memory is referred to when a P-picture or a B-picture is decoded by the decode means.

An information processing method, a program recorded in a recording medium, and a program according to another embodiment of the present invention includes the steps of: reading out compression-coded video data stored in a storage unit (for example, step S1 in FIG. 3); setting a counter (for example, a preceding reference counter or an upcoming reference counter) indicating the number of times for referring to each of a plurality of pictures including I-pictures, P-pictures, and B-pictures contained in a decoding processing unit (for example, in the forward-direction playback operation, a total of 16 pictures including 13 pictures other than first two B-pictures in a first GOP and first three I-, B-, and B-pictures of a second GOP in the coding order, and in the reverse-direction playback operation, a total of 16 pictures including 13 pictures other than first two B-pictures in the second GOP and first three I-, B-, and B-pictures of a third GOP which is displayed before the second GOP) for executing decoding processing (for example, step S111 in FIG. 12); determining the order of the decoding processing for the pictures contained in the decoding processing unit so that the I-pictures and the P-pictures are decoded before the B-pictures (for example, step S127 in FIG. 13); controlling the execution of the decoding processing on the basis of the order of the decoding processing determined in the determining step by using a bank memory (for example, the video bank memory 82 shown in FIG. 2) having a number of banks in accordance with the number of pictures contained in the decoding processing unit (for example, step S223 in FIG. 20); and controlling the timing at which a picture stored in the bank memory is released by changing the value of the counter when, among the pictures contained in the decoding processing unit of the read compression-coded video data, a P-picture or a B-picture is decoded in the controlled decoding processing (for example, steps S228 and S229 in FIG. 20 or steps S254 and S255 in FIG. 21).

The present invention is described in detail below with reference to the accompanying drawings through illustration of a preferred embodiment.

FIG. 1 is a block diagram illustrating the hardware configuration of a playback apparatus 1 according to an embodiment of the present invention.

In the playback apparatus 1, a central processing unit (CPU) 11, which is connected to a north bridge 12, controls the reading of data stored in a hard disk drive (HDD) 16 or generates and outputs commands for providing instructions to start, change, and finish processing, such as controlling the decode scheduling, decoding, and display executed by a CPU 20. The north bridge 12, which is connected to a peripheral component interconnect/interface (PCI) bus 14, receives data stored in the HDD 16 via a south bridge 15 and supplies the received data to a memory 18 via the PCI bus 14 and a PCI bus 17 under the control of the CPU 11. The north bridge 12 is also connected to a memory 13 and sends and receives data required for the processing of the CPU 11.

The memory 13 is a fast-access storage memory, such as a double data rate (DDR), in which data required for the processing executed by the CPU 11 can be stored. The south bridge 15 controls the reading and writing of data from and into the HDD 16 in which compression-coded stream data is stored.

The PCI bridge 17 has a built-in command buffer 31 and result buffer 32, and is connected to the memory 18 in which stream data read from the HDD 16 under the control of the CPU 11 is buffered. The PCI bridge 17 can supply the stream data read from the HDD 16 under the control of the CPU 11 to the memory 18 and stores the stream data therein. The PCI bridge 17 can also read stream data stored in the memory 18 and supplies the stream data to decoders 22, 23, and 24 under the control of the CPU 20. The PCI bridge 17 also controls the sending and receiving of control signals corresponding to commands or results via the PCI bus 14 or a control bus 19.

The command buffer 31 receives commands from the CPU 11 via the north bridge 12 and the PCI bus 14, and also reads out commands from the command buffer 31 to the CPU 20 via the control bus 19. The result buffer 32 receives results from the CPU 20 in response to commands via the control bus 19 and also reads out results stored in the result buffer 32 to the CPU 11 via the PCI bus 14 and the north bridge 12.

The memory 18, which is, for example, a synchronous dynamic random access memory (SDRAM), stores compression-coded stream data read from the HDD 16 under the control of the PCI bridge 17.

The CPU 20 reads commands written into the command buffer 31 of the PCI bridge 17 by the CPU 11 via the control bus 19, and controls processing executed by the PCI bridge 17, the decoders 22 through 24, and a selector 25 according to the read commands. A memory 21 stores data required for the processing executed by the CPU 20.

The decoders 22, 23, and 24 decode the received compression-coded stream data under the control of the CPU 20, and output non-compressed video signals. The decoders 22, 23, and 24 have built-in memories 41, 42, and 43, respectively, to store the received compression-coded stream data and the decoded video signals if necessary. It is not essential that the decoders 22, 23, and 24 be contained in the playback apparatus 1. That is, the decoders 22, 23, and 24 may be provided separately from the playback apparatus 1.

The selector 25 can switch the output of each frame (picture) of non-compressed serial digital interface (SDI) data supplied from the decoder 22, 23, or 24.

The playback apparatus 1 shown in FIG. 1 may be formed as one device or a plurality of devices. For example, the CPU 11, the north bridge 12, the memory 13, the south bridge 15, and the HDD 16 may be provided as components of a personal computer, and the functions of the PCI bus 14, the PCI bridge 17, the memory 18, the control bus 19, the CPU 20, the memory 21, the decoders 22, 23, and 24, and the selector 25 may be provided in an expansion card, such as a PCI card or a PCI-express card, or an expansion board. Then, the expansion card is inserted into the personal computer, thereby implementing the functions of the playback apparatus 1. The above-described elements may be contained in a more number of devices to form the playback apparatus 1.

The operation of the above-configured playback apparatus 1 is described below.

In the HDD 16, video data compressed with the MPEG long GOP method is stored.

The CPU 11 controls the south bridge 15 to read out the compression-coded stream data from the HDD 16 via the north bridge 12 in response to the input from an input operation unit (not shown) by a user, and to supply the read stream data to the memory 18 via the north bridge 12, the PCI bus 14, and the PCI bridge 17 and stores the read data in the memory 18. The CPU 11 also writes information indicating the playback speed and the playback direction and a decode start command or a display start command into the command buffer 31 of the PCI bridge 17 via the north bridge 12 and the PCI bus 14.

The CPU 20 determines the decode and display schedules for the compression-coded stream data on the basis of a command supplied from the CPU 11 and stored in the command buffer 31. More specifically, the CPU 20 selects the decoder 22, 23, or 24 used for decoding, and determines the input timing of the compression-coded stream data into the selected decoder 22, 23, or 24, the decode timing for each frame, the allocation of a bank memory in decoding processing, and the output of decoded pictures, i.e., the display timing.

The CPU 20 then controls the PCI bridge 17 to supply the compression-coded stream data stored in the memory 18 to the selected decoder 22, 23, or 24 based on the determined schedule.

The CPU 20 controls the decoder 22, 23, or 24 to decode the supplied compression-coded stream data. The decoder 22, 23, or 24 then decodes the stream data to generate non-compressed SDI data and output it to the selector 25.

The CPU 20 then controls the selector 25 to switch the output of the non-compressed SDI data output from the decoder 22, 23, or 24.

Figure 2:
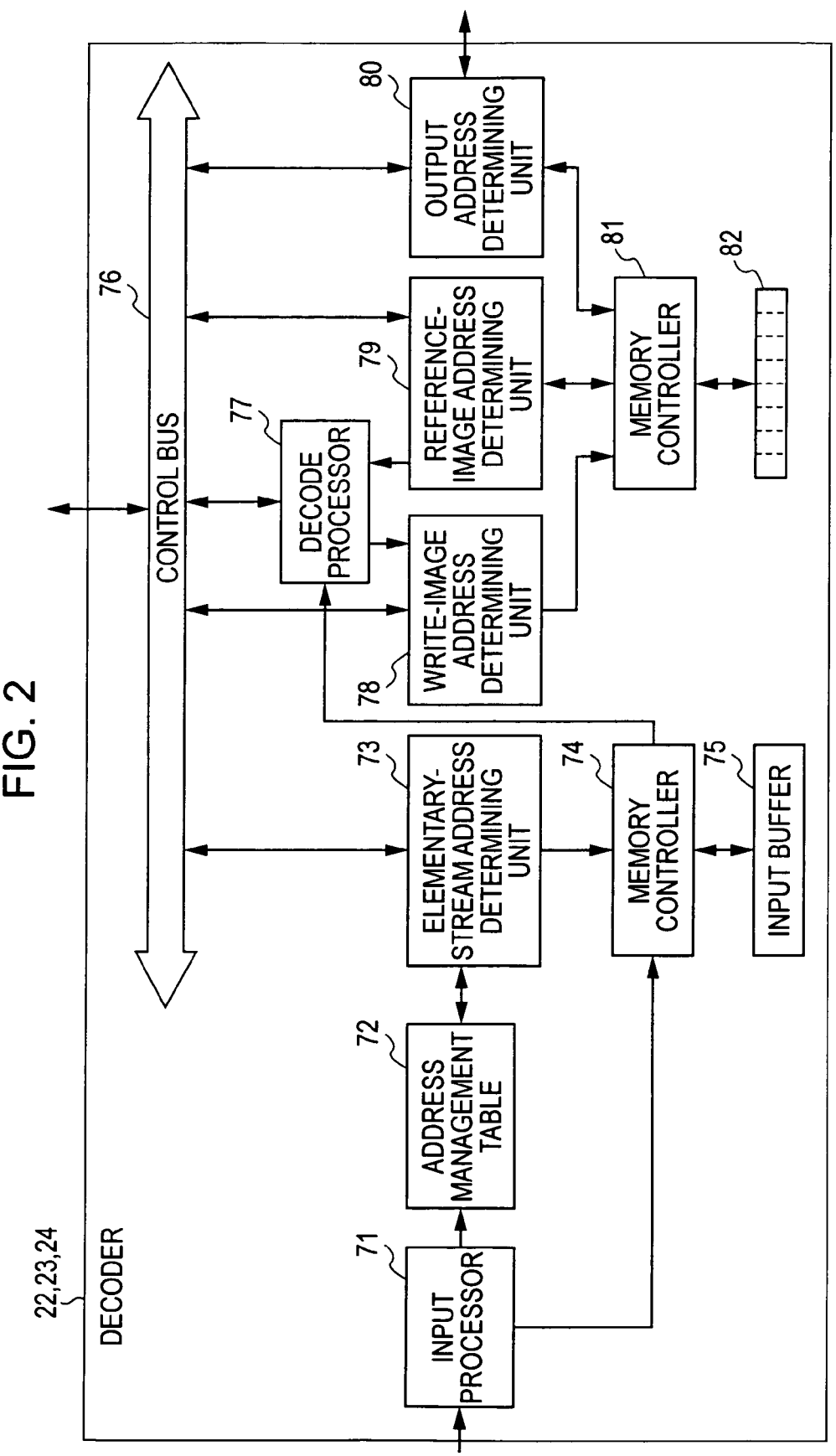
FIG. 2 is a block diagram illustrating a detailed configuration of a decoder shown in FIG. 1.

FIG. 2 is a block diagram illustrating a detailed configuration of the decoder 22, 23, or 24.

An input processor 71 supplies the compression-coded stream data from the PCI bridge 17 to a memory controller 74 and stores the stream data in an input buffer 75. The input processor 71 also obtains the head address, data size, picture header information, picture size information, and Q matrix, of each picture from the supplied stream data, and supplies the obtained information to an address management table 72.

The address management table 72 stores the above-described information supplied from the input processor 71 for each picture as table information that can be identified by the table ID.

An elementary-stream address determining unit 73 reads the head address and picture size information of the corresponding picture from the table information represented by the predetermined table ID stored in the address management table 72 and supplies the read head address and picture size information to the memory controller 74 based on a control signal supplied from the CPU 20 via the control bus 19 so that the stream data stored in the input buffer 75 can be supplied to a decode processor 77 in units of pictures.

The memory controller 74 controls the reading and writing of stream data from and into the input buffer 75. That is, the memory controller 74 writes the stream data supplied from the input processor 71 into the input buffer 75 and also reads out the predetermined picture to the decode processor 77 based on the head address and picture size information of the corresponding picture supplied from the elementary-stream address determining unit 73.

The input buffer 75 corresponds to part of the recording areas of the memories 41, 42, and 43 shown in FIG. 1, which are SDRAMs, and stores stream data under the control of the memory controller 74.

A control bus 76 supplies control signals received from the CPU 20 via the control bus 19 to the elementary-stream address determining unit 73, the decode processor 77, a write-image address determining unit 78, a reference-image address determining unit 79, and an output address determining unit 80, and also supplies information concerning the processing executed within the decoder 22, 23 or 24 to the CPU 20 via the control bus 19.

The decode processor 77 decodes the MPEG video stream read from the input buffer 75 under the control of the memory controller 74 by referring to the corresponding reference image supplied from the reference-image address determining unit 79 if necessary, and supplies the decoded baseband (non-compressed) video signal to the write-image address determining unit 78.

The write-image address determining unit 78 obtains, via the control bus 76, a control signal supplied from the CPU 20 via the control bus 19, and determines based on this control signal the recording position, i.e., the storage bank position, of the baseband video signal decoded and supplied from the decode processor 77 in a video bank memory 82. The write-image address determining unit 78 then stores the baseband video signal at the determined bank position of the video bank memory 82 via a memory controller 81.

The reference-address determining unit 79 obtains, via the control bus 76, a control signal supplied from the CPU 20 via the control bus 19, and controls, based on this control signal, the memory controller 81 to read out frame image data stored as a preceding reference image for a P-picture or frame image data stored as preceding and upcoming reference images for a B-picture from the video bank memory 82, and supplies the read frame image data to the decode processor 77.

The output address determining unit 80 obtains, via the control bus 76, a control signal supplied from the CPU 20 via the control bus 19, and specifies, based on this control signal, the bank for an output image, i.e., the bank for a frame to be displayed, from the frame image data stored in the video bank memory 82, and controls the memory controller 81 to read out the output image.

The memory controller 81 controls the reading and writing of frame images from and into the video bank memory 82. The video bank memory 82 corresponds to part of the recording areas of the memories 41, 42, and 43 shown in FIG. 1, which are SDRAMs, and is an 8-bank frame image bank memory for storing each frame of image data in a prescribed bank under the control of the memory controller 81.

The control processing executed by the CPU 11 is described below with reference to the flowchart of FIG. 3.

In step S1, the CPU 11 controls the north bridge 12 and the south bridge 15 to read out from the HDD 16 a plurality of GOPs of compression-coded stream data, which are to be decoded and output, specified by the user.

In step S2, the CPU 11 supplies the read stream data to the PCI bridge 17 via the PCI bus 14 and transfers the stream data to the memory 18.

In step S3, the CPU 11 sends a data transfer completion message and picture information concerning pictures contained in the GOPs transferred to the memory 18 to the CPU 20 by supplying, via the north bridge 12 and the PCI bus 14, the data transfer completion message and the picture information to the command buffer 31 of the PCI bridge 17. The picture information includes, for example, the picture types, header information concerning the header of each picture, and the picture sizes.

In step S4, the CPU 11 receives a ready message from the CPU 20 and the memory 18. More specifically, the CPU 11 reads, via the PCI bus 14 and the north bridge 12, results in response to the data transfer completion message and the picture information supplied from the CPU 20 to the result buffer 32 via the control bus 19, and also receives a message indicating that the GOP stream data has been stored from the memory 18 via the PCI bridge 17, the PCI bus 14, and the north bridge 12.

In step S5, the CPU 11 receives an instruction to start playback output processing from a user via an operation input unit (not shown), and sends a decode start command to the command buffer 31 via the north bridge 12 and the PCI bus 14 and causes the decoder 22, 23, or 24 to start decoding processing. The decode start command includes display speed information.

In step S6, the CPU 11 sends a display start command to the command buffer 31 via the north bridge 12 and the PCI bus 14. In step S7, the CPU 11 starts displaying one GOP of an SDI signal, i.e., a baseband image signal, decoded by the corresponding decoder.

In step S8, the CPU 11 detects that one GOP has been displayed. More specifically, the CPU 11 checks which picture has been displayed by reading, via the PCI bus 14 and the north bridge 12, results in response to the display start command supplied from the CPU 20 to the result buffer 32 via the control bus 19, i.e., a display completion message written into the result buffer 32 by the CPU 20 in step S194 of FIG. 19, which is discussed below, indicating that each frame has been displayed.

In step S9, the CPU 11 determines whether the displayed GOP is the final GOP of the stream data. If the displayed GOP is found to be the final GOP, the processing is completed.

If it is determined in step S9 that the displayed GOP is not the final GOP, the process proceeds to step S10 to determine based on a signal supplied from an operation input unit (not shown) whether an instruction to change the input stream state, for example, to finish playing back the stream data, change the stream data which is being played back, or change the playback speed or direction, has been input from the user.

If an instruction to change the input stream state is found in step S10, the process proceeds to step S11 in which the CPU 11 sends a command corresponding to the user operation to the command buffer 31 via the north bridge 12 and the PCI bus 14.

If it is determined in step S10 that an instruction to change the input stream state has not been input, or after step S11, the process proceeds to step 12 to determine whether there is any stream data to be displayed in the HDD 16. If it is determined in step S12 that there is no stream data to be displayed, the process returns to step S7 to process stream data transferred to the memory 18.

If it is determined in step S12 that there is stream data to be displayed, the process proceeds to step S13 in which the CPU 11 controls the north bridge 12 and the south bridge 15 to read out the subsequent GOP of the stream data from the HDD 16.

In step S14, the CPU 11 supplies the read GOP to the PCI bridge 17 via the PCI bus 14 and transfers the GOP to the memory 18. That is, basically, in the memory 18, a predetermined number of GOPs are stored, except when the end portion of the stream data to be played back is stored.

In step S15, the CPU 11 sends a data transfer completion message and picture information concerning pictures contained in the GOP transferred to the memory 18 to the CPU 20 by supplying, via the north bridge 12 and the PCI bus 14, the data transfer completion message and the picture information to the command buffer 31. The picture information includes, for example, the type and size of each picture.

In step S16, the CPU 11 receives a ready message from the CPU 20 and the memory 18. More specifically, the CPU 11 reads, via the PCI bus 14 and the north bridge 12, results in response to the data transfer completion message and the picture information supplied from the CPU 20 to the result buffer 32 via the control bus 19, and also receives a message indicating that the GOP stream data has been stored from the memory 18 via the PCI bridge 17, the PCI bus 14, and the north bridge 12.

After step S16, the process proceeds to step S7, and performs the subsequent processing.

According to the above-described processing, by supplying a command to the CPU 20 and receiving a result in response to the supplied command, the CPU 11 can control the decoding of stream data and the display of the decoded data.

In this processing, the decoded data is displayed in units of GOPs. When outputting the SDI signal decoded by the corresponding decoder to an external source, the CPU 11 can perform processing similar to the above-described processing. Accordingly, by supplying a command to the CPU 20 and receiving the result in response to the supplied command, the CPU 11 can control the decoding of the stream data and the output of the decoded data to an external source.

The CPU 20 then controls the decoding processing performed by a plurality of decoders (decoders 22, 23, and 24 in FIG. 1) on the basis of the command supplied from the CPU 11. More specifically, the CPU 20 selects the decoder 22, 23, or 24 used for decoding, i.e., the decoder 22, 23, or 24 to which compression-coded video data is supplied. The CPU 20 also controls the PCI bridge 17, the decoders 22, 23, and 24, and the selector 25 based on the input timing of the stream data to the selected decoder, the decode timing for each picture, the allocation of the bank memory in decoding processing, and the output timing of the decoded pictures, i.e., the display timing. The decoding and display output control operation performed by the CPU 20 is discussed below with reference to FIGS. 4 through 34.

The memory 21 has a plurality of registers and information queues for storing various types of information to allow the CPU 20 to control the decoding processing by the decoders

22, 23, and 24 and the selection processing of the SDI signal output from the selector 25. The information queues are first-in first-out (FIFO) queues in which commands supplied from the CPU 11, the picture IDs associated with the picture type information, and information accompanying the picture IDs can be stored at a predetermined depth according to the decode timing schedule or the decode/display control purpose. The information accompanying the picture IDs includes, for example, time information, decoding of other frames, and a counter for counting the number of pictures referred to by the corresponding picture.

The CPU 20 controls the decode and display timing by using the information stored in the corresponding information queues. That is, instead of queuing pictures in the memory 21, the picture IDs are stored in the corresponding information queues under the control of the CPU 20, thereby allowing the CPU 20 to perform computation for controlling the decode and display timing.

The information queues storing various types of information and used for various control operations by the CPU 20 includes: a command queue storing commands obtained from the command buffer 31 via the control bus 19; an input picture queue in which the pictures IDs of input pictures corresponding to a queue are stored in the coding order; a display order information queue in which the picture IDs stored in the input picture queue reordered in the display order are stored; an I/P-picture decode queue in which I-pictures and P-pictures extracted from the picture IDs stored in the display order information queue and rearranged in the decoding order are stored; a time-information I/P-picture decode queue in which, in addition to the picture IDs set in the I/P-picture decode queue, time information corresponding to the picture IDs are stored; a B-picture decode queue in which B-pictures extracted from the picture IDs stored in the display order information queue and rearranged in the decoding order are stored; a time-information B-picture decode queue in which, in addition to the picture IDs set in the B-picture decode queue, time information corresponding to the picture IDs are stored; a display order setting queue in which pictures IDs are set in the display order; and a time-information display order setting queue in which, in addition to the picture IDs set in the display order setting queue, time information associated with the picture IDs is stored. Details of the information stored in the individual queues, the depths of the queues, and processing executed by using the information are discussed below.

The processing performed on each frame is described below with reference to the flowchart of FIG. 4. This processing routine is repeated for each frame until stream data to be displayed has been processed or until an instruction to finish a displaying operation is provided.

Figure 5:
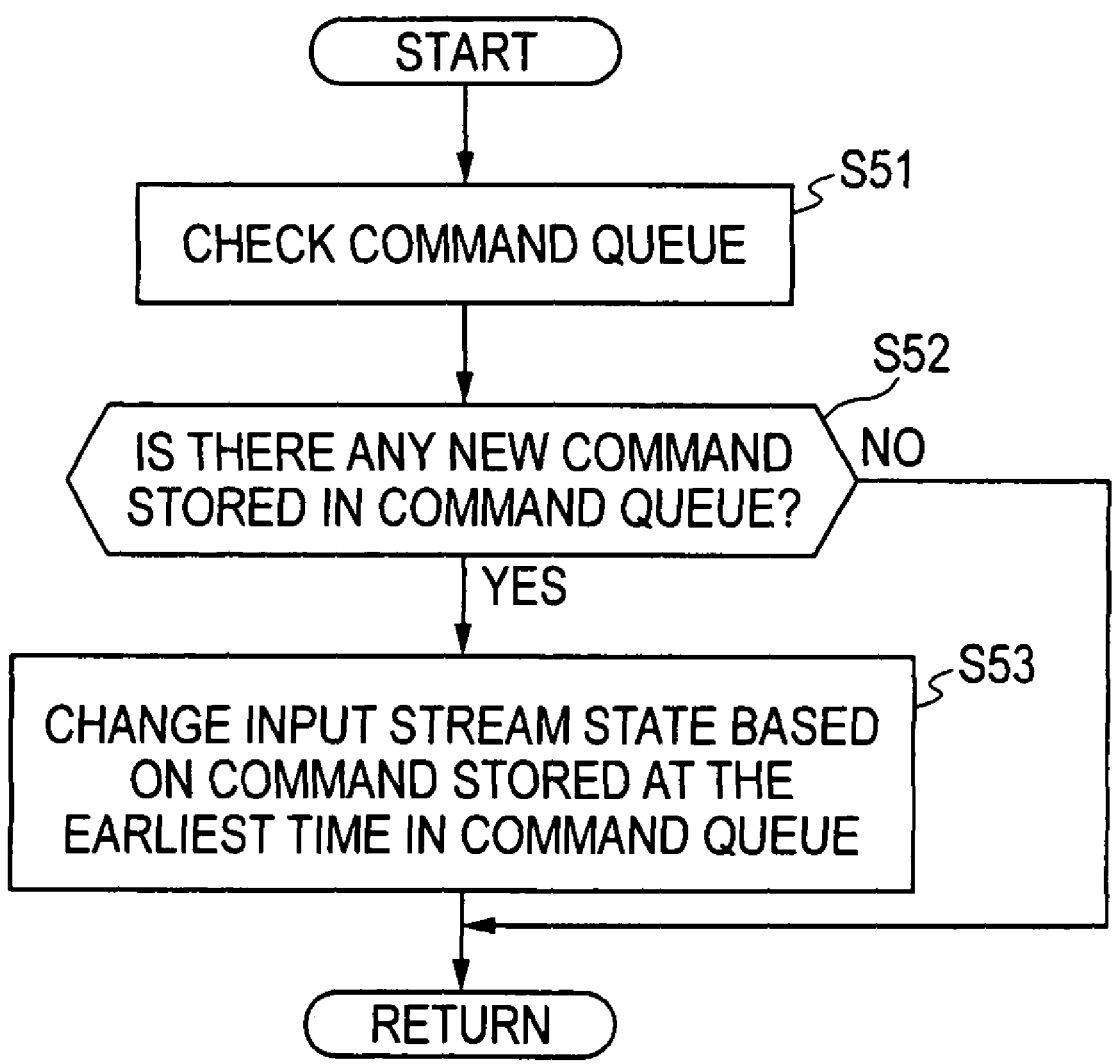
FIG. 5 is a flowchart illustrating input-stream state changing processing.

In step S31, input stream state changing processing, which is described in detail below with reference to FIG. 5, is executed. In the input stream state changing processing, the CPU 20 checks for a new command issued from the CPU 11.

Figure 6:
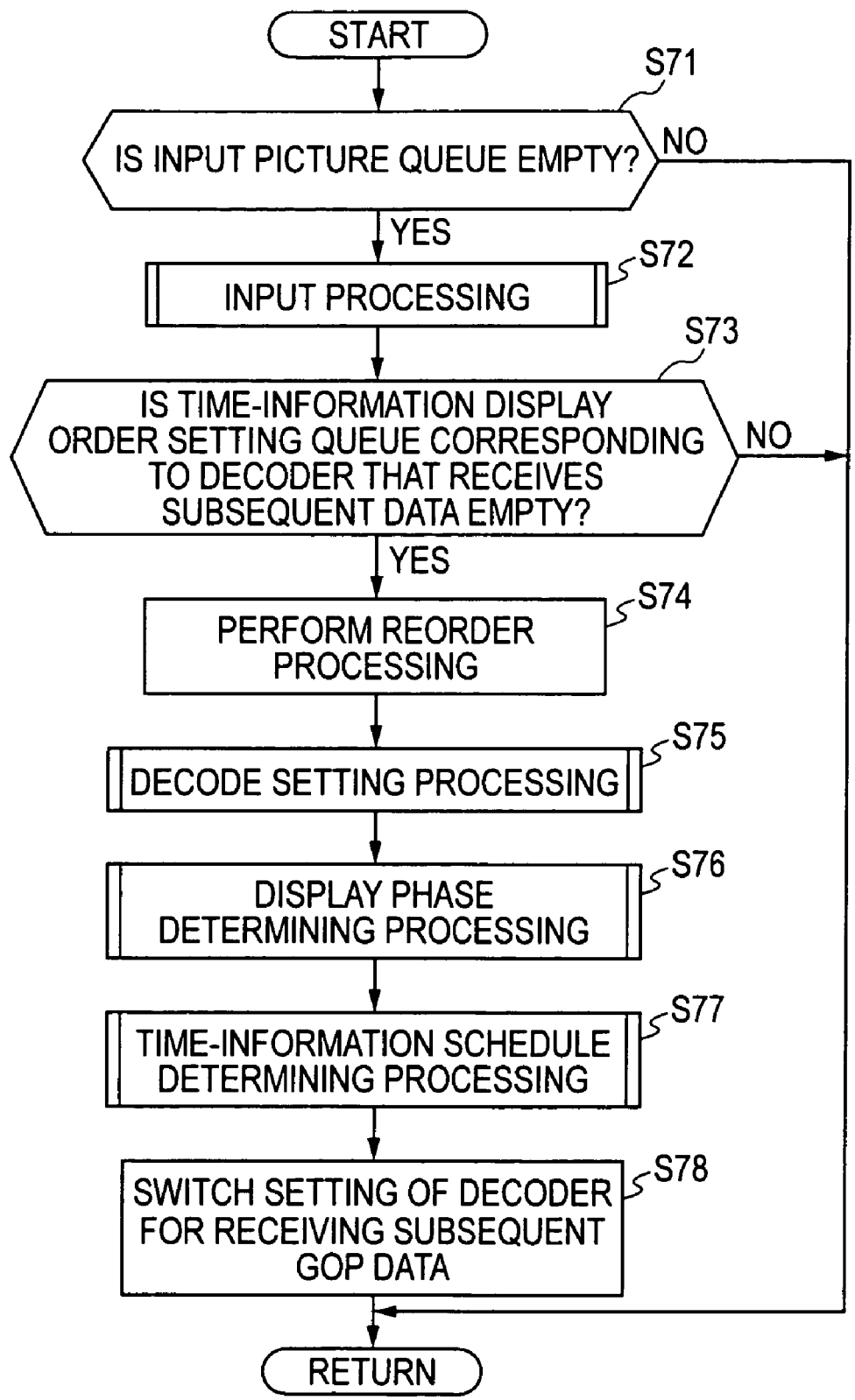
FIG. 6 is a flowchart illustrating decode schedule processing.

In step S32, decode schedule processing, which is described in detail below with reference to FIG. 6, is executed. In the decode schedule processing, the decode timing is scheduled.

Figure 19:
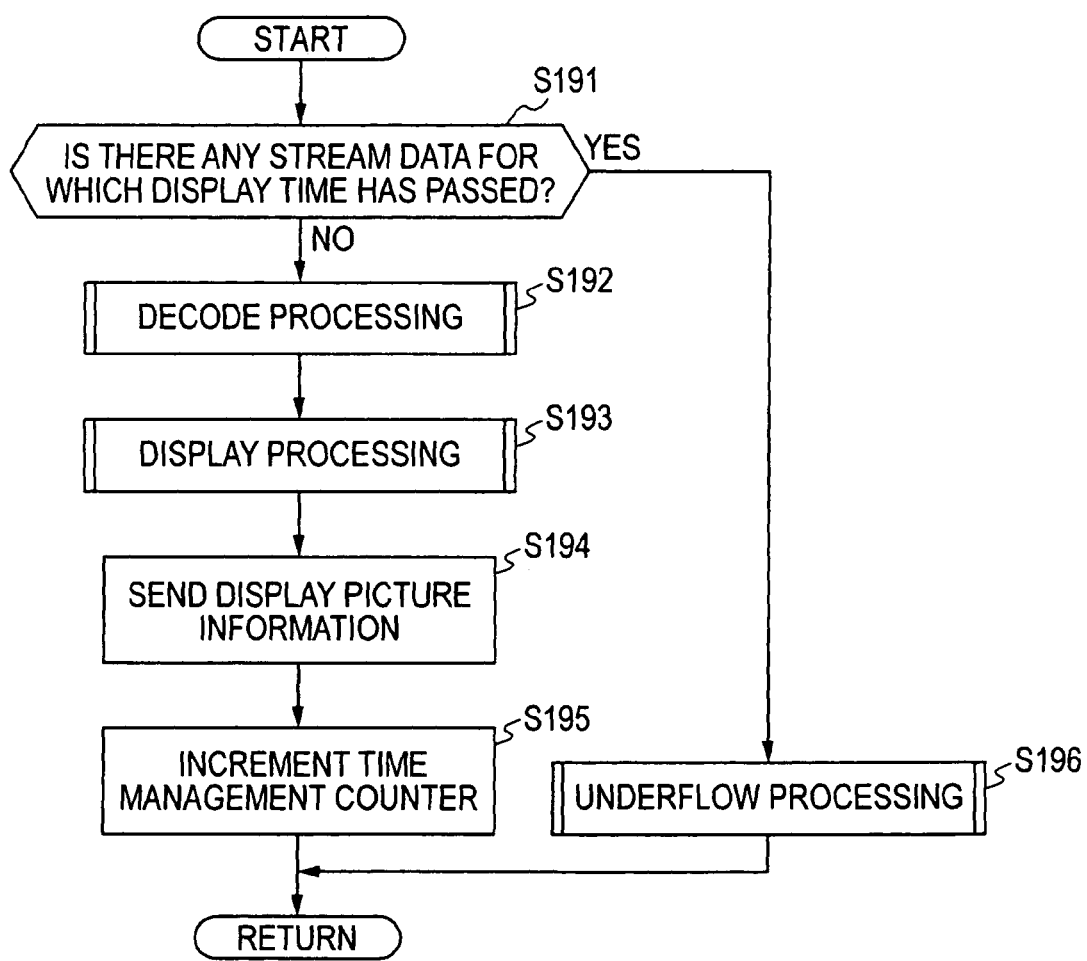
FIG. 19 is a flowchart illustrating frame control processing.

In step S33, frame control processing, which is described in detail below with reference to FIG. 19, is executed. In the frame control processing, a subject frame is decoded.

In step S34, the CPU 20 determines whether all frames have been processed. If it is determined in step S34 that not all frames have been processed, the process proceeds to step S35 in which the CPU 20 increments the time counter in units of frames. Then, the process returns to step S31, and the subsequent processing is repeated.

If it is determined in step S34 that all frames have been processed, the processing is completed.

Figure 4:
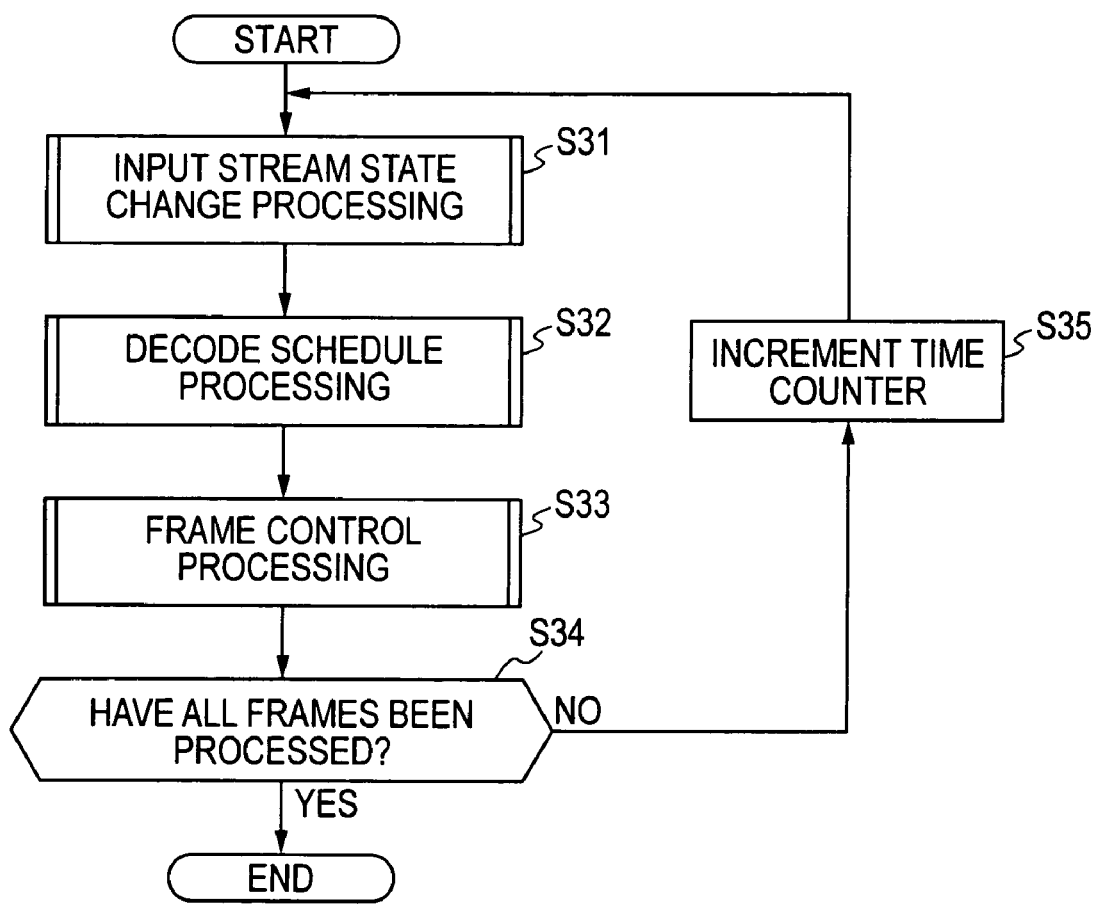
FIG. 4 is a flowchart illustrating frame processing performed on each frame.

According to the processing shown in FIG. 4, the CPU 20 increments the time counter for each frame, and schedules the decoding processing in accordance with the playback speed instructed by the user and allows the corresponding decoder to decode each frame.

Details of the input stream state changing processing in step S31 of FIG. 4 are discussed below with reference to the flowchart of FIG. 5.

In step S51, the CPU 20 checks the command queue storing commands from the command buffer 31.

In step S52, the CPU 20 determines whether a new command to change the input stream state, such as to change the playback speed and the playback direction or to finish the playback operation, is stored in the command queue.

If it is determined in step S52 that a new command is stored, the process proceeds to step S53 in which the CPU 20 changes the input stream state, for example, the playback speed and the playback direction, based on the command stored at the earliest time in the command queue. If it is determined in step S52 that a new command is not stored in the command queue, or after step S53, the process returns to step S31 in FIG. 4.

According to this processing, the command stored at the earliest time in the command queue storing commands obtained from the command buffer 31 is checked, and based on this command, the input stream state is changed.

Details of the decode schedule processing executed in step S32 of FIG. 5 are described below with reference to the flowchart of FIG. 6.

In step S71, the CPU 20 refers to the input picture queue to determine whether the input picture queue is empty. The input picture queue is an information queue, which is set in the input processing performed in step S72, storing the picture IDs of input pictures for which decode scheduling is to be conducted and pictures required for the scheduling.

Figure 7:
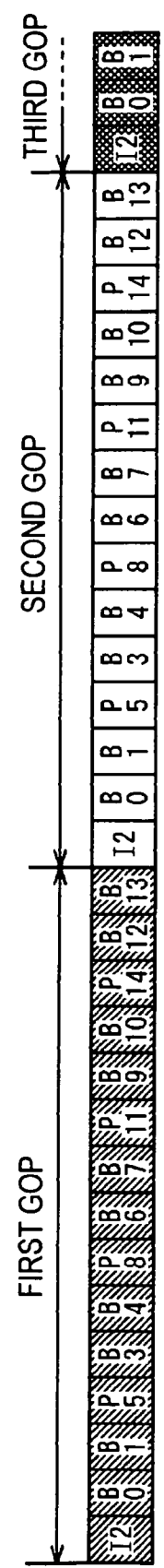
FIG. 7 illustrates an MPEG long GOP.

It is now assumed that stream data handled in the playback apparatus 1 is MPEG long GOP stream data, each GOP including 15 pictures, such as that shown in FIG. 7. Each of the decoders 22, 23, and 24, which performs decoding processing for each group of 15 pictures, receives a total of 16 pictures, i.e., 13 pictures, except for the first two B-pictures in the display order, of one GOP and the first three IBB-pictures of the subsequent GOP (in the case of the forward-direction playback operation) or the first three IBB-pictures of the subsequent GOP (in the case of the reverse-direction playback operation).

Figure 8A:
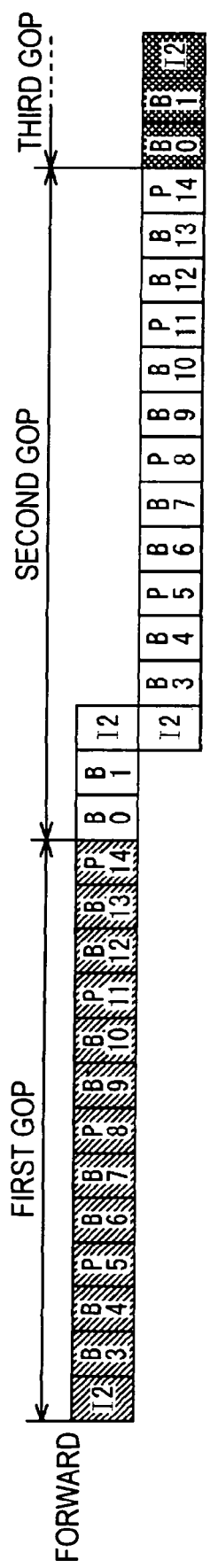
FIGS. 8A and 8B illustrate the decoding processing unit for decoding processing performed by one decoder.
Figure 8B:
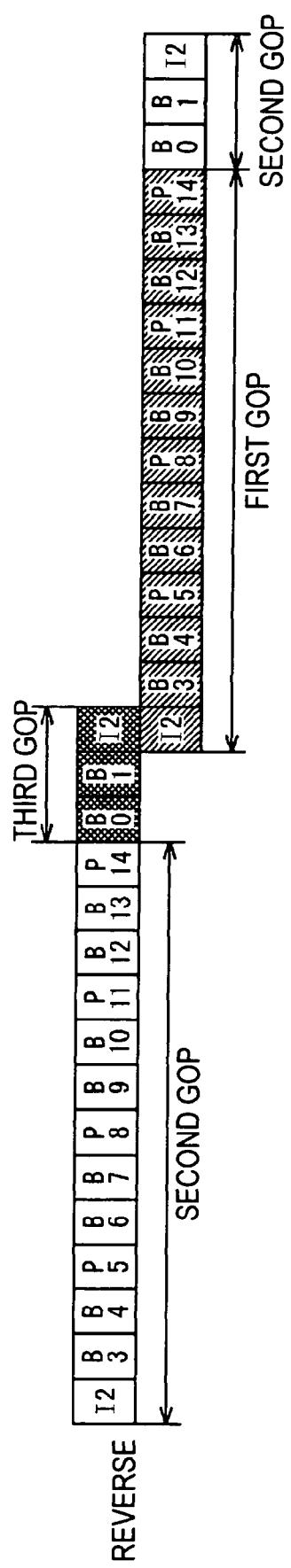

The decode units assigned to the decoders 22, 23, and 24 are discussed below with reference to FIGS. 8A and 8B. In FIGS. 8A and 8B, the arrangements of the pictures supplied to the decoders 22, 23, and 24 are shown in the display order. In the playback apparatus 1, each GOP having 15 pictures is decoded in one of the decoders 22, 23, and 24. As stated above, each of the decoders 22, 23, and 24 receives a total of 16 pictures, i.e., 13 pictures, except for the first two B-pictures in the display order, of one GOP and the first three pictures of the previous or subsequent GOP. That is, if the playback direction is forward, as shown in FIG. 8A, a first decoder selected from the decoders 22, 23, and 24, receives the 13 pictures, except for the first two B-pictures, of the first GOP and the first three pictures of the second GOP, and a second decoder receives the 13 pictures, except for the first two B-pictures in the display order, of the second GOP and the first three pictures of the third GOP. Similarly, a third decoder receives the 13 pictures, except for the first two pictures, of the third GOP and the first three pictures of the fourth GOP. If the playback direction is reverse, as shown in FIG. 8B, the first decoder selected from the decoders 22, 23, and 24 receives the 13 pictures, except for the first two B-pictures, of the second GOP and the first three pictures of the third GOP, and the second decoder receives the 13 pictures, except for the first two B-pictures, of the first GOP and the first three pictures of the second GOP.

In the input picture queue, the picture IDs of the input pictures for which decode scheduling is to be conducted and the pictures required for the scheduling are set. That is, in the input picture queue, the picture IDs of a total of 18 pictures, i.e., the picture IDs of 15 pictures of one GOP and the first three IBB-pictures of the previous or subsequent GOP of MPEG long GOP stream data are stored.

FIG. 9A illustrates the picture IDs of the 15 pictures of the first GOP and the first three IBB-pictures of the second GOP, which is subsequent to the first GOP, of the MPEG long GOP stream data stored in the input picture queue to perform a forward-direction playback operation. FIG. 9B illustrates the picture IDs of the 15 pictures of the second GOP and the first three IBB-pictures of the third GOP, which is prior to the second GOP, of the MPEG long GOP stream data stored in the input picture queue to perform a reverse-direction playback operation.

If it is determined in step S71 that the input picture queue is not empty, the process returns to step S32 in FIG. 4. That is, in the decode schedule processing, a total of 16 pictures, i.e., the 13 pictures from the third picture to the 15-th picture of a GOP and the first three pictures of the subsequent GOP, are processed as the processing unit.

Figure 11:
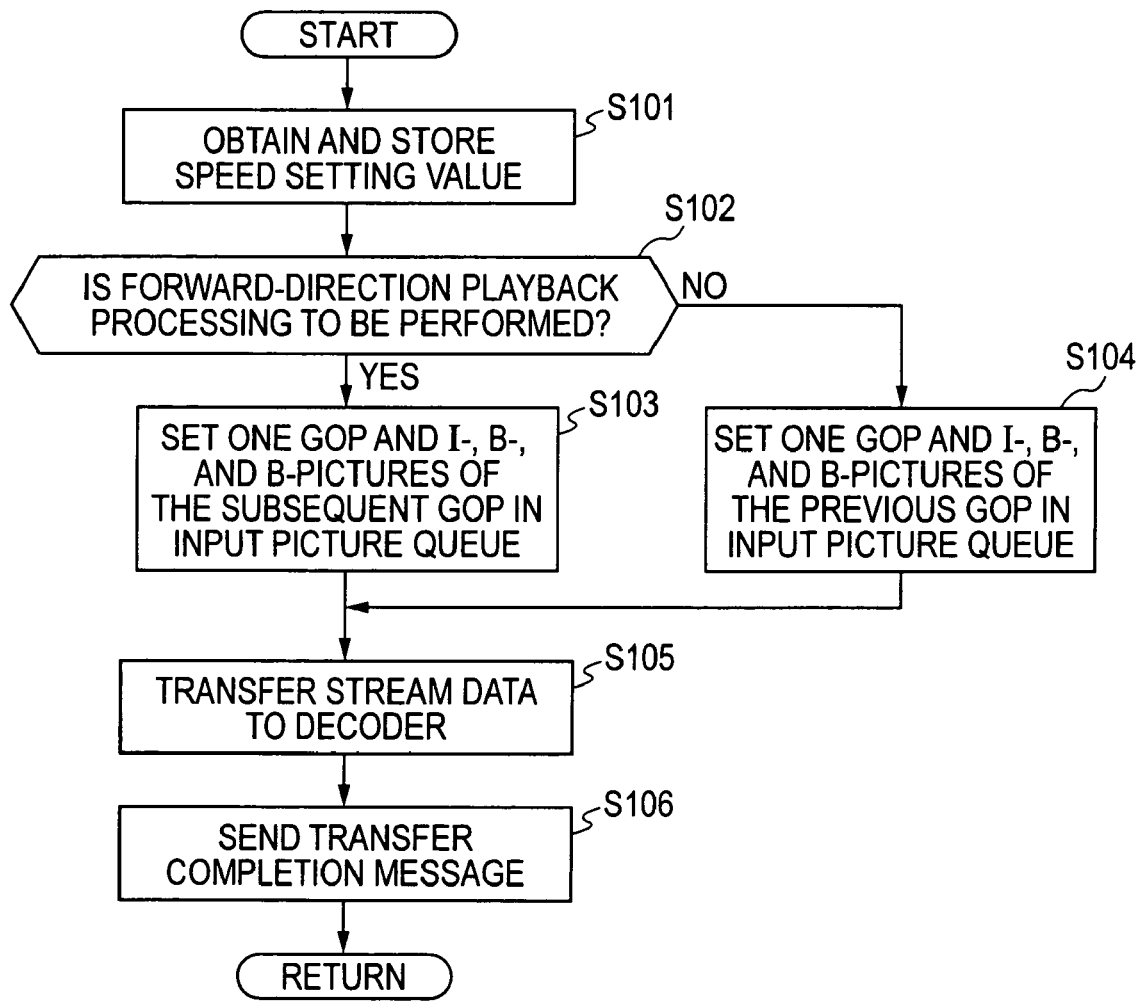
FIG. 11 is a flowchart illustrating input processing.

If it is determined in step S71 that the input picture queue is empty, the input processing in step S72, which is discussed below with reference to the flowchart of FIG. 11, is performed.

In step S73, the CPU 20 determines based on the register value indicating the decoder that receives the subsequent data whether the time-information display order setting queue, which is set in accordance with the decoder that receives the subsequent data, is empty. The time-information display order setting queue is a queue set in the time-information schedule determining processing in step S77 for each of a plurality of decoders (decoders 22, 23, and 24 in FIG. 1). Details of the time-information schedule determining processing are given below with reference to the flowchart of FIG. 18.

If it is determined in step S73 that the time-information display order setting queue corresponding to the decoder that receives the subsequent data is not empty, that is, if the decoding processing or display processing is being executed on each frame of the pictures of the scheduled GOP, the process returns to step S32 in FIG. 4.

If it is determined in step S73 that the time-information display order setting queue is empty, the process proceeds to step S74 in which the CPU 20 performs reorder processing. In the reorder processing, the picture IDs of the 18 pictures arranged in the coding order set in the input picture queue are rearranged in the display order and are set in the display order information queue.

Accordingly, if the playback direction is forward, the picture IDs set in the input picture queue, as discussed with reference to FIG. 9A, rearranged in the display order as shown in FIG. 10A are set in the display order information queue. If the playback direction is reverse, the picture IDs set in the input picture queue, as discussed with reference to FIG. 9B, rearranged in the display order as shown in FIG. 10B are set in the display order information queue.

When the reorder processing is executed to set the picture IDs in the display order information queue in step S74, all the picture IDs queued in the input picture queue are output and the input picture queue becomes empty. That is, if it is determined in step S71 that the input picture queue is empty, it means that the picture IDs queued in the input picture queue are reordered. If it is determined in step S71 that the input picture queue is not empty, it means that the reorder processing in step S74 is not executed since the time-information display order setting queue corresponding to the decoder that receives the subsequent data is not empty after executing the input processing in step S72 in the previous decode schedule processing.

Figure 12:
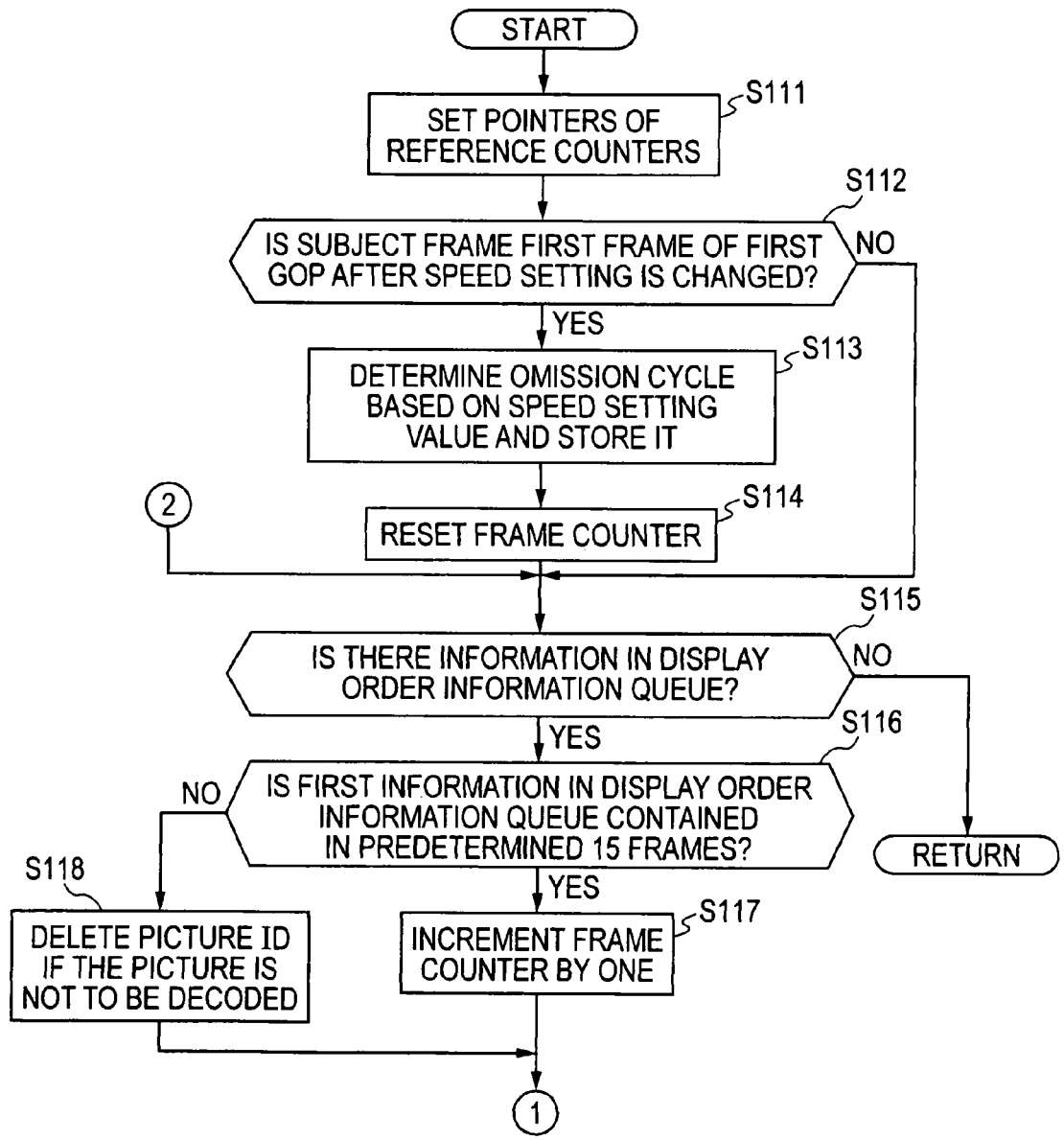
FIGS. 12 and 13 are flowcharts illustrating decode setting processing.
Figure 13:
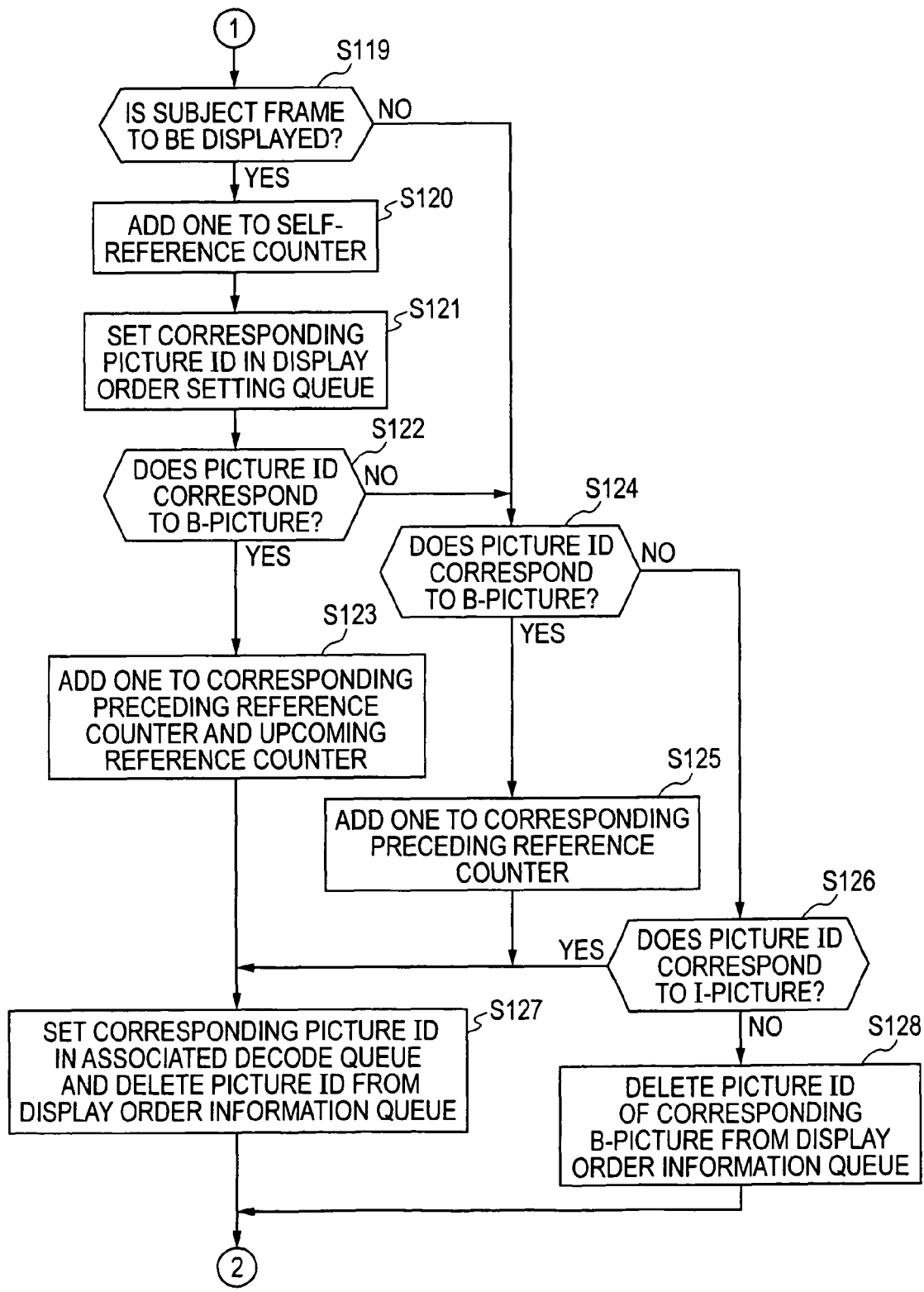

In step S75, decode setting processing, which is discussed below with reference to FIGS. 12 and 13, is executed. In the decode setting processing, reference counters for each picture are set, and pictures to be displayed are selected based on the display speed setting, and the decoding order of I-pictures and P-pictures, and B-pictures to be displayed is set.

Figure 17:
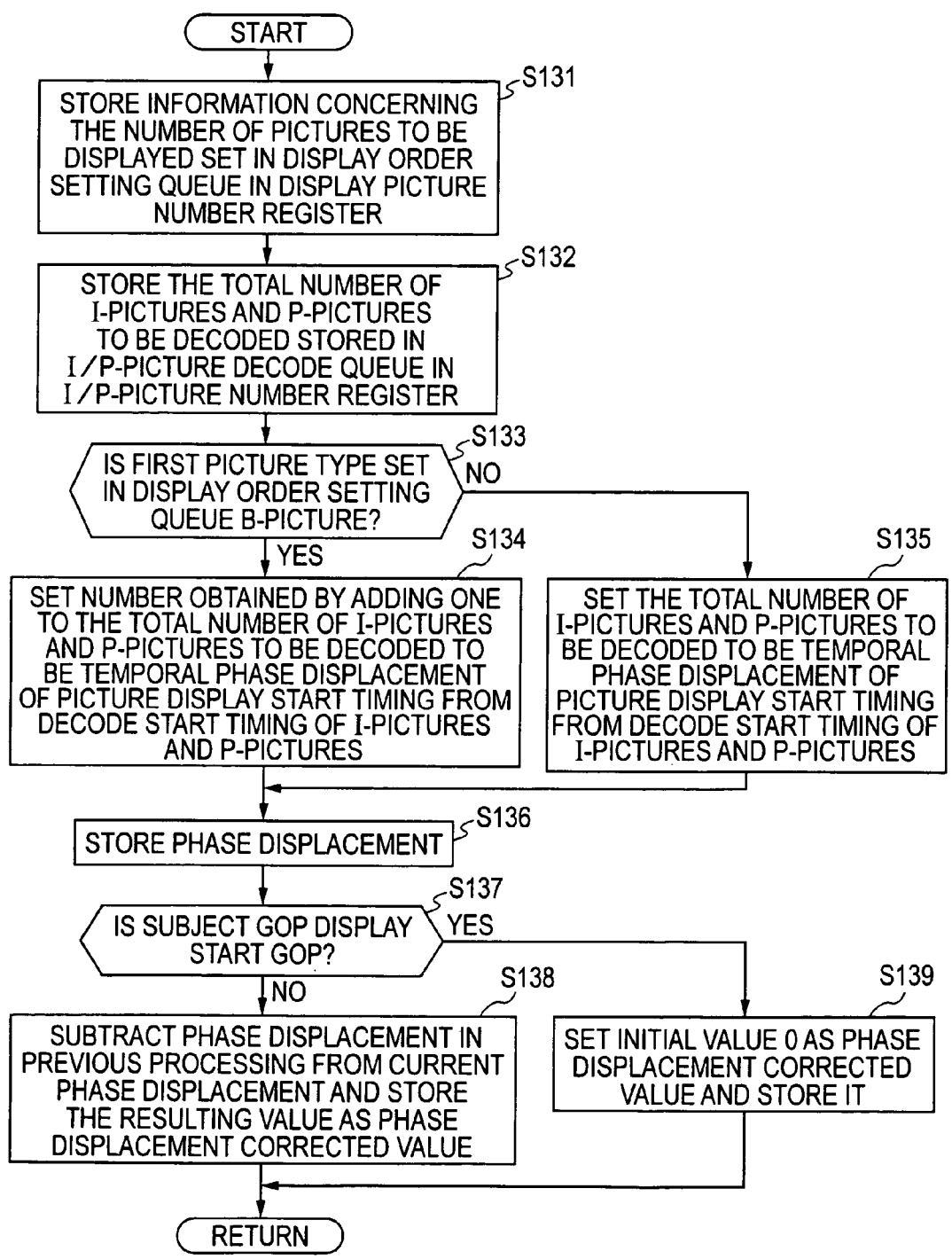
FIG. 17 is a flowchart illustrating display phase determining processing.

In step S76, display phase determining processing, which is discussed below with reference to FIG. 17, is executed. In the display phase determining processing, a displacement between the decode start timing and the display start timing in the processing unit, which is equal to one GOP including 15 frames and one frame, is determined.

Figure 18:
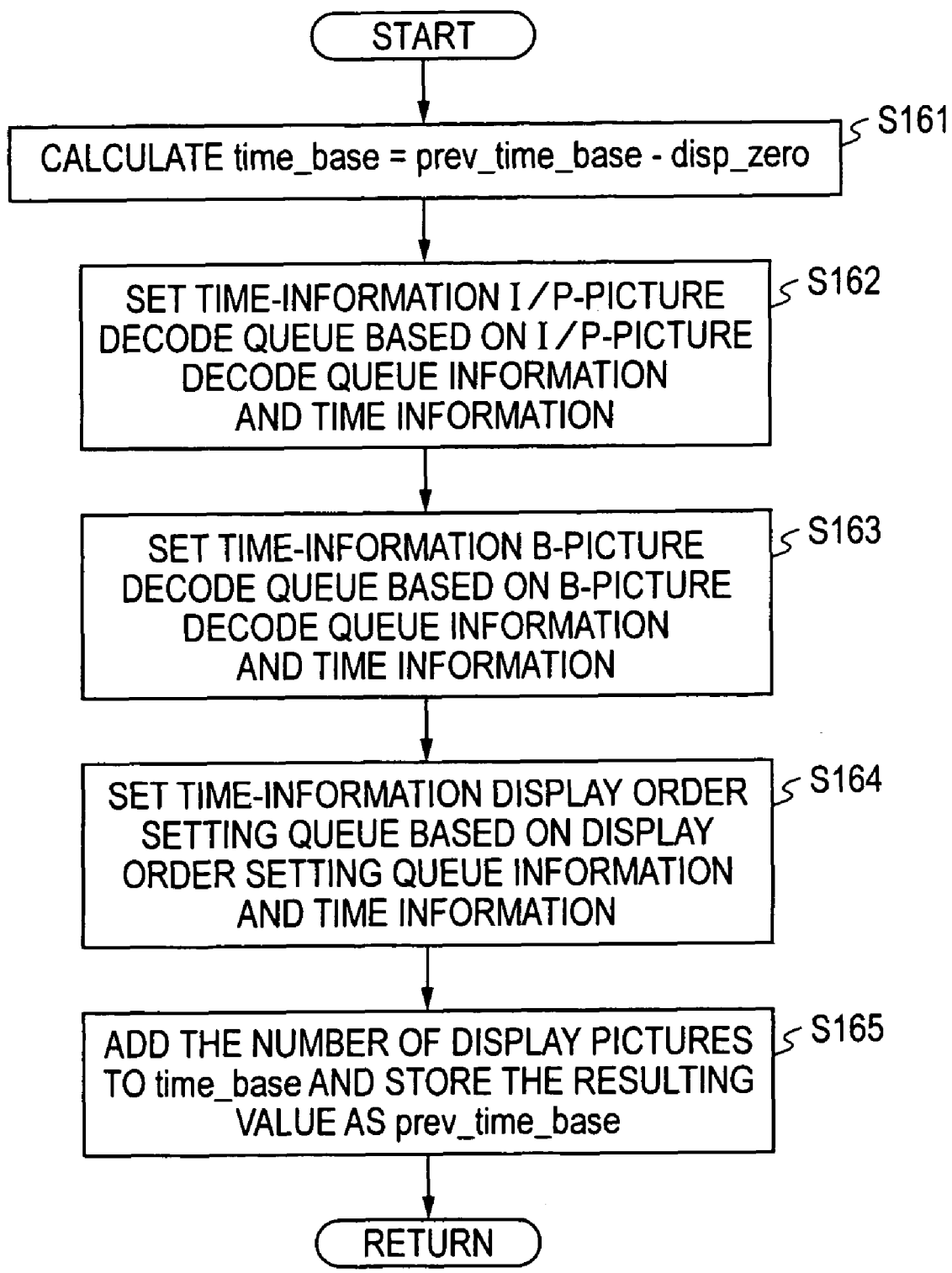
FIG. 18 is a flowchart illustrating time-information schedule determining processing.

In step S77, time-information schedule determining processing, which is discussed below with reference to the flowchart of FIG. 18, is executed. In the time-information schedule determining processing, to control the decode timing for each frame, the decode scheduling is conducted, and the time information is set in the predetermined information queue in association with the picture IDs.

In steps S76 and S77, the decode timing and the display timing are scheduled. More specifically, after decoding an I-picture and a P-picture, a B-picture is decoded. When the head of the display image is an I-picture or a P-picture, such as when the playback operation type and the playback speed is normal and forward, the decode timing and the display timing are set so that the display start timing is displaced from the decode start timing by 6 pictures. When the head of the display image is a B-picture, such as when the playback direction is reverse, in other words, when the speed setting indicates a negative value, the decode timing and the display timing are set so that the display start timing is displaced from the decode start timing by 7 pictures. That is, the decode timing of B-pictures is displaced from the display timing of B-pictures by one frame.

In step S78, the CPU 20 switches the decoder that receives the subsequent data. More specifically, when the register value indicating the decoder that receives the subsequent data is equal to the value smaller than the number of decoders (3 in the playback apparatus 1 shown in FIG. 1) by one (i.e., 2 in the playback apparatus 1 shown in FIG. 1), the CPU 20 sets the register value to be 0. When the register value is smaller than the number of decoders by two or more, the CPU 20 increments the register value by one. After step S78, the process returns to step S32 in FIG. 4.

According to the above-described processing, the decode timing and the display timing are scheduled.

A description is now given of the input processing executed in step S72 in FIG. 6 with reference to the flowchart of FIG. 11.

Figure 3:
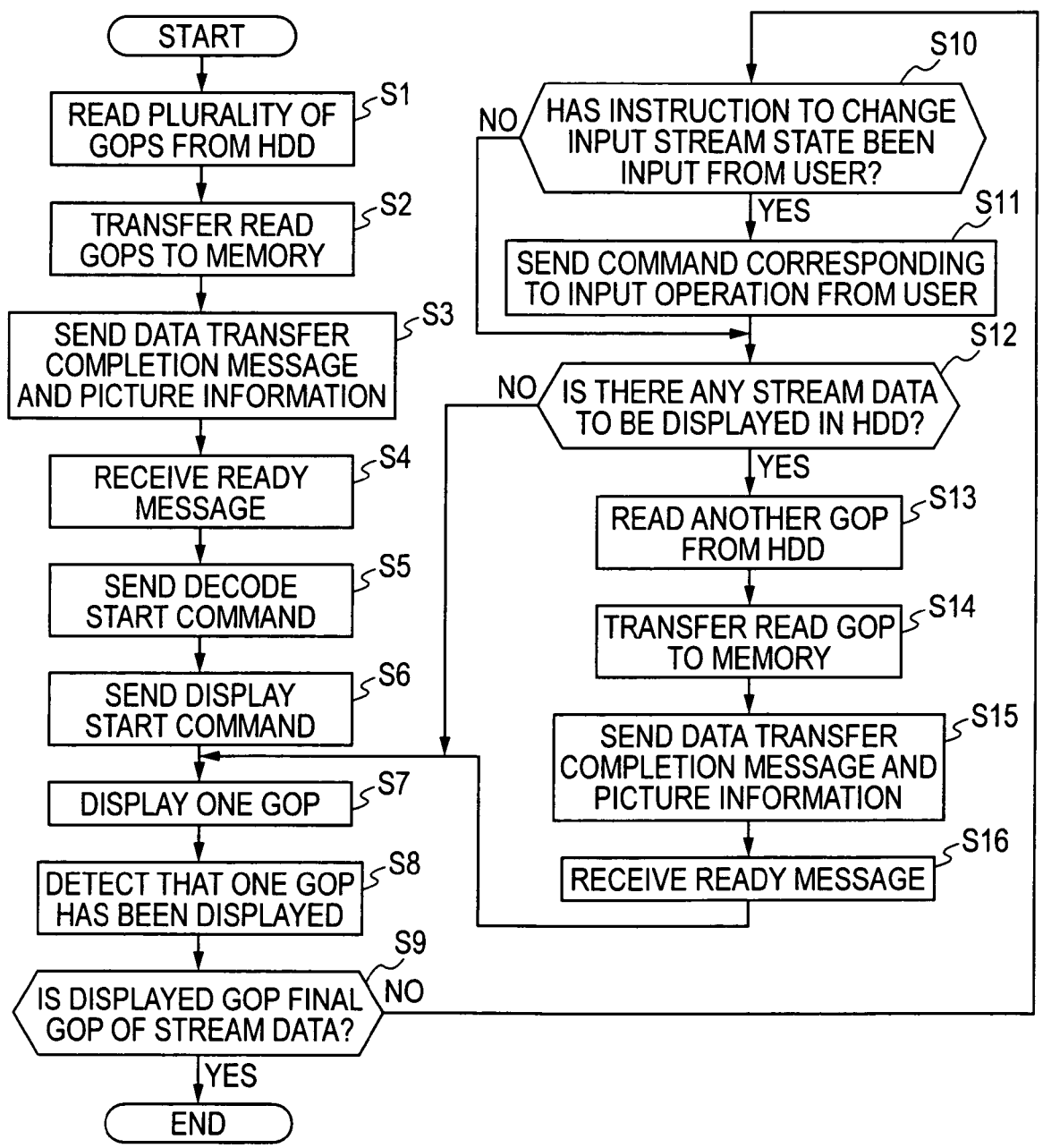
FIG. 3 is a flowchart illustrating control processing.

In step S101, the CPU 20 obtains the display speed information contained in the decode start command sent to the command buffer 31 by the CPU 11 in step S5 in FIG. 3 or obtains the speed setting value from the command sent to the command buffer 31 by the CPU 11 in response to the input from the user in step S11 in FIG. 3, and stores the obtained information in the memory 21. If the speed setting value is positive, the playback direction is forward, and if the speed setting value is negative, the playback direction is reverse.

The speed setting values are determined as follows. If the speed setting value is 1, the normal playback operation is performed. If the speed setting value is greater than 1, the fast playback operation is performed. If the speed setting value is a positive value smaller than 1, the low-speed playback operation is performed. If the speed setting value is −1, the normal-speed reverse-direction playback operation is performed. If the speed setting value is smaller than −1, the fast reverse-direction playback operation is performed. If the speed setting value is a negative value smaller than the absolute value 1, the low-speed reverse-direction playback operation is performed.

The CPU 11 then determines in step S102 whether the processing to be performed is a forward-direction playback operation or a reverse-direction playback operation according to whether the speed setting value obtained in step S101 is positive or negative.

If the playback direction is found to be forward in step S102, the process proceeds to step S103. In step S103, the CPU 20 sets the picture IDs of the 13 frames from the head of a GOP to be decoded and the I-, B-, and B-pictures of the subsequent GOP in the input picture queue discussed with reference to FIG. 9A.

If it is determined in step S102 that the playback direction is not forward, that is, the playback direction is reverse, the process proceeds to step S104. In step S104, the CPU 20 sets the picture IDs of the 13 frames from the end of a GOP to be decoded and the I-, B-, and B-pictures of the previous GOP in the input picture queue discussed with reference to FIG. 9B.

After step S103 or S104, in step S105, the CPU 20 controls the PCI bridge 17 to transfer the 16-frame compressed image data discussed with reference to FIGS. 8A and 8B among the stream data stored in the memory 18 to the predetermined decoder selected from the decoders 22, 23, and 24 on the basis of the setting of the input picture queue and the register value indicating the decoder that receives the subsequent data. In this case, for the first GOP of the stream data, the register value is the value determined in the initial setting, and for the second or subsequent GOP, the register value is the value determined in step S78 of FIG. 6.

In the decoder 22, 23, or 24, the input processor 71 supplies the 16 frame data to the memory controller 74 and stores the data in the input buffer 75. The input processor 71 also supplies information concerning, for example, the head address, data size, picture size information, and Q matrix, of each picture to the address management table 72 and stores the information for each picture as table information that can be identified by the table ID.

In step S106, the CPU 20 sends a stream transfer completion message to the CPU 11 by supplying a result indicating that one GOP stream has been transferred to the predetermined decoder to the result buffer 32 of the PCI bridge 17 via the control bus 19. The process then returns to step S72 in FIG. 6.

According to the input processing, the 16 frame data, which serves as the decoding processing unit, discussed with reference to FIGS. 8A and 8B, is supplied to the decoder 22, 23, or 24.

A description is now given of the decode setting processing executed in step S75 of FIG. 6 with reference to the flowcharts of FIGS. 12 and 13.

In step S111, the CPU 20 sets the pointers of the reference counters based on the pictures IDs set in the display order information queue. The reference counters include a self-reference counter, a preceding reference counter, and an upcoming reference counter, each counter being set in accordance with each picture in the display order. The pointers of the reference counters are set as follows. If, for example, the picture IDs are stored in the display order information queue, such as in B(0), B(1), I(2), B(3), B(4), P(5), B(6), B(7), P(8), B(9), B(10), P(11), B(12), B(13), P(14), B(15), B(16), and I(17), from the viewpoint of the B picture (3), the pointer 3 indicating the display order of the B picture is set as the self-reference pointer, the pointer 2 indicating the display order of the I(2), which is the preceding reference image, is set as the preceding reference pointer, and the pointer 5 indicating the display order of the P(5), which is the reference image in the upcoming, is set as the upcoming reference pointer.

In step S112, the CPU 20 determines whether the subject frame is the first frame of the first GOP after the speed setting is changed.

If the subject frame is found to be the first frame of the first GOP in step S112, the process proceeds to step S113 in which the CPU 20 determines an omission cycle based on the speed setting value, and stores the determined omission cycle in the register.

More specifically, when the playback speed is ×2 or ×−2, the CPU 20 sets the omission cycle to be ½ and stores it in the register. When the playback speed is ×3 or ×−3, the CPU 20 sets the omission cycle to be ⅓ and stores it in the register.

In step S114, the CPU 20 resets the frame counter for counting the number of frames regardless of the decoding processing unit.

If it is determined in step S112 that the subject frame is not the first frame of the first GOP after the speed setting is changed, or after step S114, the process proceeds to step S115 to determine whether there is information in the display order information queue.

If it is determined in step S115 that there is no information in the display order information queue, the process returns to step S75 in FIG. 6. If there is information in the display order information queue in step S115, the process proceeds to step S116 to determine whether the information at the head of the display order information queue is contained in the predetermined 15 frames to be set in the information order setting queue, which is described below, and more specifically, if pictures IDs are stored, such as, B(0), B(1), I(2, B(3), B(4), P(5), B(6), B(7), P(8), B(9), B(10), P((11), B(12), B(13), P(14), B(15), B(16), and I(17), in the display order information queue, it is determined whether the information is contained in the I(2), B(3), B(4), P(5), B(6), B(7), P(8), B(9), B(10), P(1), B(12), B(13), P(14), B(15), and B(16).

If it is determined in step S116 that the information at the head of the display order information queue is contained in the predetermined 15 frames, the process proceeds to step S117 in which the CPU 20 increments the frame counter by one.

If it is determined in step S116 that the information is not contained in the predetermined 15 frames, the process proceeds to step S118. In step S118, if the picture of the picture ID at the head of the display order information queue is a picture which is not to be decoded, and more specifically, if the picture IDs are stored in the display order information queue, such as in B(0), B(1), I(2), B(3), B(4), P(5), B(6), B(7), P(8), B(9), B(10), P(11), B(12), B(13), P(14), B(15), B(16), and I(17), and if the picture is one of the first two pictures B(0) and B(1), the picture ID is deleted from the information order information queue.

After step S117 or S118, in step S119 in FIG. 13, the CPU 20 determines whether the subject frame is to be displayed based on the omission cycle stored in the register in step S113 and the frame counter value. More specifically, if the frame counter indicates 2n (n is a positive integer) when the omission cycle is ½, the CPU 20 determines that the subject frame is to be displayed, and in other cases, the CPU 20 determines that the subject frame is not displayed. If the frame counter indicates 3n (n is a positive integer) when the omission cycle is ⅓, the CPU 20 determines that the subject frame is to be displayed, and in other cases, the CPU 20 determines that the subject frame is not displayed. If it is determined in step S119 that the subject frame is not displayed, i.e., the subject frame is to be omitted, the process proceeds to step S124.

If it is determined in step S119 that the subject frame is to be displayed, i.e., that the subject frame is not omitted, the process proceeds to step S120 in which the CPU 20 adds one to the self-reference counter. That is, the CPU 20 adds one to the self-reference counter indicating the display order of the subject frame represented by the pointer of the self-reference counter.

In step S121, the CPU 20 sets the picture ID of the picture to be displayed in the display order setting queue.

In step S122, the CPU 20 determines whether the picture ID set in the display order setting queue in step S121 is a B-picture.

If the picture ID is found to be a B-picture in step S122, the process proceeds to step S123 in which the CPU 20 adds one to the preceding reference counter and the upcoming reference counter on the basis of the pointers of the reference counters. More specifically, in step S123, if the subject frame is B(3), the pointer 2 is set as the preceding reference pointer and the pointer 5 is set as the upcoming reference pointer, as stated above, and the CPU 20 thus adds one to the preceding reference counter I(2) and the upcoming reference counter P(5).

If it is determined in step S119 that the subject frame is not displayed, i.e., the subject frame is to be omitted, or if it is determined in step S122 that the picture ID is not a B-picture, the process proceeds to step S124 to determine whether the picture ID of the subject frame is a P-picture.

If the picture ID is found to be a P-picture in step S124, the process proceeds to step S125 in which the CPU 20 adds one to the preceding reference counter based on the pointers of the reference counters. More specifically, in step S125, if the subject frame is P(5), the pointer 2 is set as the preceding reference pointer. The CPU 20 thus adds one to the preceding reference counter I(2).

If it is determined in step S124 that the picture ID is not a P-picture, the process proceeds to step S126 to determine whether the picture ID is an I-picture.

After step S123 or S125, or if the picture ID is found to be an I-picture in step S126, the process proceeds to step S127 in which the CPU 20 sets the picture ID in the corresponding decode queue and deletes it from the display order information queue. More specifically, in step S127, the CPU 20 sets the picture ID of a B-picture to be displayed in the B-picture decode queue, or the picture ID of an I-picture or a P-picture in the I/P-picture decode queue regardless of whether it is displayed. The process then returns to step S115, and the corresponding processing is repeated.

The I/P-picture decode queue is a queue in which the picture IDs of I-pictures and P-pictures decoded prior to B-pictures are set in the decoding order. The B-picture decode queue is a queue in which the picture IDs of B-pictures that are to be displayed, i.e., B-pictures that are not omitted, are set in the decoding order.

If it is determined in step S126 that the picture ID is not an I-picture, the process proceeds to step S128 in which the picture ID of the corresponding B-picture, which is not displayed, is deleted from the display order information queue. The process then returns to step S115, and the corresponding processing is repeated.

According to the decode setting processing, the reference counters are set, corresponding pictures are omitted according to the playback speed, and the display order setting queue, the I/P-picture decode queue, and the B-picture decode queue are set.

Figure 14A:
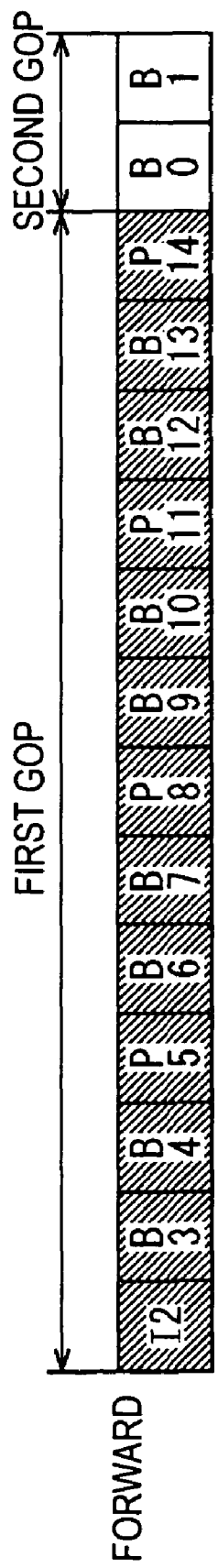
FIGS. 14A and 14B illustrate information stored in a display order setting queue.
Figure 14B:
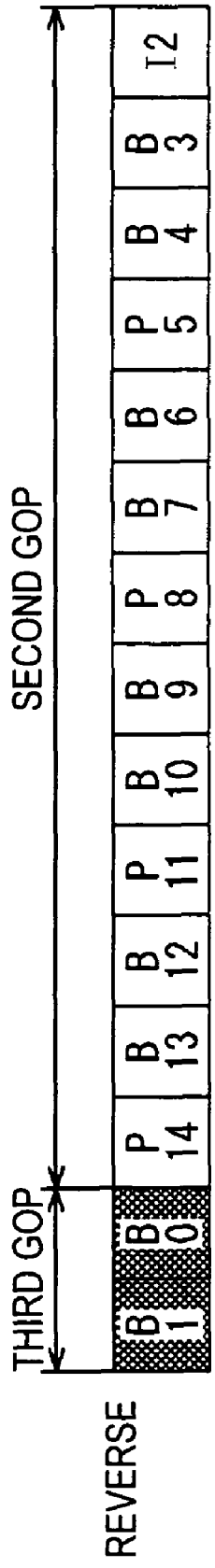

FIGS. 14A and 14B respectively illustrate the display order setting queue when the normal-speed forward-direction playback operation and the normal-speed reverse-direction playback operation are performed without omitting pictures. In the display order setting queue when the forward-direction playback operation is performed, the 18 picture IDs queued in the display order information queue shown in FIG. 10A, except for the first two B-pictures and the final I picture, namely, the 15 picture IDs, i.e., the 16 picture IDs shown in FIG. 8A supplied to one of the decoders 22, 23, and 24, except for the final I-picture, are set in the display order, as shown in FIG. 14A.

In the display order setting queue when the reverse-direction playback operation is performed, the 18 picture IDs queued in the display order information queue shown in FIG. 10B, except for the first two B-pictures and the final I picture, namely, the 15 picture IDs, i.e., the 16 picture IDs shown in FIG. 8B supplied to one of the decoders 22, 23, and 24, except for the final I-picture, are set in the display order, as shown in FIG. 14B.

When the fast forward-direction or reverse-direction playback operation is performed, the picture IDs of the pictures that are determined not to be displayed based on the omission cycle and the frame counter are not set in the display order setting queue shown in FIGS. 14A and 14B. That is, when the fast forward-direction or reverse-direction playback operation is performed, 15 or less picture IDs are set in the display order setting queue.

Figure 15A:
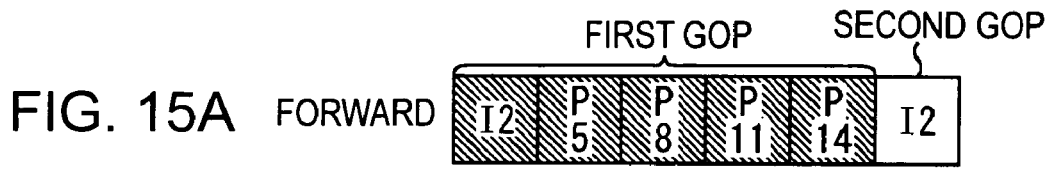
FIGS. 15A and 15B illustrate information stored in an I/P-picture decode queue.
Figure 15B:
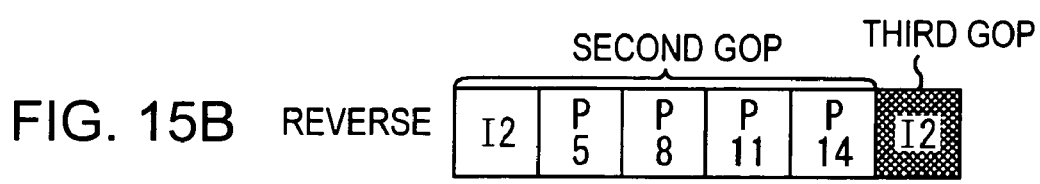

FIGS. 15A and 15B respectively illustrate the I/P-picture decode queue when the fast forward-direction playback operation and the reverse-direction playback operation are performed. In the I/P-picture decode queue when the forward-direction playback operation is performed, as shown in FIG. 15A, the picture IDs of 6 pictures corresponding to the I-pictures and P-pictures of the picture IDs set in the display order information queue shown in FIG. 10A are set. In the I/P-picture decode queue when the reverse-direction playback operation is performed, as shown in FIG. 15B, the picture IDs of 6 pictures corresponding to the I-pictures and P-pictures of the picture IDs set in the display order information queue shown in FIG. 10B are set.

Figure 16A:
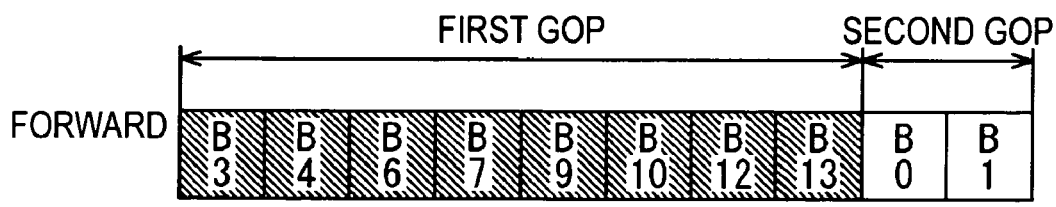
FIGS. 16A and 16B illustrate information stored in a B-picture decode queue.
Figure 16B:
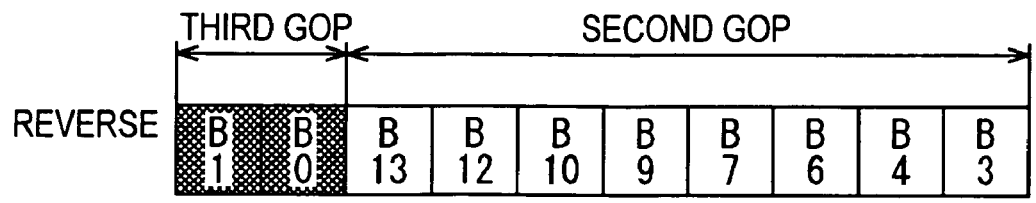

FIGS. 16A and 16B respectively illustrate the B-picture decode queue when the normal-speed forward-direction playback operation and the normal-speed reverse-direction playback operation are performed without omitting pictures. In the B-picture decode queue when the forward-direction playback operation is performed, as shown in FIG. 16A, the picture IDs of 10 pictures corresponding to the B-pictures to be displayed of the picture IDs set in the display order information queue shown in FIG. 10A are set. In the B-picture decode queue when the reverse-direction playback operation is performed, as shown in FIG. 16B, the picture IDs of 10 pictures corresponding to the B-pictures to be displayed of the picture IDs set in the display order information queue shown in FIG. 10B are set.

When the fast forward-direction or reverse-direction playback operation is performed, the picture IDs of the pictures that are determined not to be displayed based on the omission cycle and the frame counter are not set in the B-picture decode queue shown in FIG. 16A or 16B. That is, when the fast forward-direction or reverse-direction playback operation is performed, 10 or less picture IDs are set in the B-picture decode queue.

By performing the decode setting processing, only B-pictures to be displayed are decoded, and B-pictures to be omitted are not supplied to the decode processor 77. I-pictures or P-pictures to be omitted are not displayed although they are decoded.

The frame counter is continuously incremented without being reset, independent of the GOP, until the speed setting is changed, i.e., until the input stream state is changed. The positions of the pictures that are not displayed are sometimes changed depending on the GOP since the denominator of the omission cycle is a value that cannot divide the number of frames forming one GOP, for example, when one GOP includes 15 frames and when the playback speed is ×2, ×4, ×–2 or ×–4. Even in this case, it can be easily determined based on the omission cycle whether the subject picture is displayed by using the frame counter value indicating the frame order in the input stream.

In this manner, B-pictures are omitted before being input into the decoder, and I-pictures and P-pictures are omitted at regular intervals without being displayed after being decoded, thereby implementing a fast playback operation by following a dynamic change in the speed. Since I-pictures and P-pictures may be used as reference images by other pictures during decoding, this method is effective in performing a fast playback operation by omitting pictures at regular intervals with a minimum number of banks in the memory.

The display phase determining processing for setting the phase that delays the display start timing with respect to the decode start timing executed in step S76 of FIG. 6 is described below with reference to the flowchart of FIG. 17.

In step S131, the CPU 20 stores information concerning the number of pictures to be displayed set in the display order setting queue shown in FIGS. 14A and 14B in the display picture number register. Since the picture IDs of the 15 pictures are set in the display order setting queue in FIGS. 14A and 14B, 15 is set in the display picture number register.

In step S132, the CPU 20 stores the total number of I-pictures and P-pictures to be decoded, which are stored in the I/P-picture decode queue shown in FIGS. 15A and 15B, in the I/P-picture number register. Since the picture IDs of the 6 pictures are set in the I/P-picture decode queue shown in FIGS. 15A and 15B, 6 is stored in the I/P-picture number register.

In step S133, the CPU 20 determines whether the picture type of picture ID set at the head of the display order setting queue is a B-picture. In other words, it is determined in step S133 whether the playback direction is forward or reverse when calculating a phase displacement in the normal-speed forward-direction or reverse-direction playback operation. After performing omission of pictures in a fast playback operation, even if the picture type of picture ID at the head of the display order setting queue is a B-picture, the playback direction may be forward or reverse depending on the playback speed.

If the picture type of the picture ID at the head of the display order setting queue is found to be a B-picture in step S133, the process proceeds to step S134. In step S134, the CPU 20 sets the number obtained by adding one to the total number of I-pictures and P-pictures to be decoded as the temporal phase displacement disp_phase of the display start timing of the pictures of the picture IDs set in the display order setting queue from the decode start timing of the I-pictures and P-pictures of the picture IDs set in the I/P-picture decode queue.

For example, when the playback speed is ×–1, the picture type of picture ID at the head of the display order setting queue is a B-picture. After decoding the I-pictures and P-pictures, the B-pictures are decoded so that the display timing of the B-picture is displaced from the decode timing of the I-pictures and P-pictures by 7 pictures, with the result that the display timing of the B-picture is displaced from the decode timing of the B-picture by one frame.

If it is determined in step S133 that the picture type of picture ID at the head of the display order setting queue is not a B-picture, the process proceeds to step S135. In step S135, the CPU 20 sets the total number of I-pictures and P-pictures to be decoded as the temporal phase displacement disp_phase of the display start timing of the pictures of the picture IDs set in the display order setting queue from the decode start timing of the I-pictures and P-pictures of the picture IDs set in the I/P-picture decode queue.

For example, when the playback speed is ×1, the picture type of the picture ID at the head of the display order setting queue is not a B-picture but an I-picture. After decoding the I-pictures and P-pictures, the B-pictures are decoded so that the display timing of the I-picture is displaced from the decode timing of the I-pictures and P-pictures by 6 pictures, with the result that the display timing of the B-picture is displaced from the decode timing of the B-picture by one frame.

After step S134 or S135, in step S136, the CPU 20 stores the display phase displacement disp_phase determined in step S134 or S135 in a built-in register.

In step S137, the CPU 20 determines whether the subject GOP is the display start GOP (including the case where the subject GOP is located at the position where the playback operation is restarted after the playback speed is changed).

If it is determined in step S137 that the subject GOP is not a display start GOP, the process proceeds to step S138. In step S138, the CPU 20 subtracts the phase displacement prev_disp_phase in the previous GOP in the previous processing from the display phase displacement disp_phase determined in step S134 or S135, and stores the resulting value as the displacement corrected value disp zero in the built-in register. The CPU 20 also substitutes the display phase displacement disp_phase determined in step S134 or S135 into the display phase displacement prev_disp_phase in the previous GOP. The process then returns to step S76 in FIG. 6.

If it is determined in step S137 that the subject GOP is a display start GOP, the process proceeds to step S139 in which the CPU 20 sets the initial value 0 as the displacement corrected value disp_zero in the built-in register. The process then returns to step S76 in FIG. 6.

According to the display phase determining processing, the phase that delays the display start timing with respect to the decode start timing can be determined.

The time-information schedule determining processing executed in step S77 of FIG. 6 is described below with reference to the flowchart of FIG. 18.

In step S161, the CPU 20 calculates the decode start time information time_base indicating the timing at which the first frame of 16 pictures, which is the decoding processing unit, to be decoded in one of the decoders 22, 23, and 24 by using the decode start time information prev_time_base of the previous decoding processing unit and the phase displacement corrected value disp_zero according to equation (1).

Decode start time information time_base=decode start time information prev_time_base of the previous GOP−phase displacement corrected value disp_zero       (1)

To calculate the decode start time information for the display start GOP by using equation (1), the decode start time information prev_time_base of the previous GOP is set to be zero.

In step S162, the CPU 20 sets the time-information I/P-picture decode queue for the decoder that receives the subsequent data.

In the time-information I/P-picture decode queue, the decode start time information time_base of the first picture to be decoded and the count value of the time counter for counting each frame are set in association with the picture IDs set in the I/P-picture decode queue discussed with reference to FIGS. 15A and 15B. The time-information I/P-picture decode queue is provided for each of the decoders 22, 23, and 24 of the playback apparatus 1.

More specifically, the CPU 20 sets the time-information I/P-picture decode queue for the decoder that receives the subsequent data by referring to the register value indicating the decoder that receives the subsequent data. The CPU 20 uses the decode start time information time_base as information indicating the timing at which the frame corresponding to the first picture ID of the picture IDs queued in the I/P-picture decode queue is decoded, and uses the count value of the time counter as information indicating the timing at which the frames corresponding to the other picture IDs are decoded.

When the time-information I/P-picture decode queue is set in step S162, the I/P-picture decode queue becomes empty since all the picture IDs queued in the I/P-picture decode queue are output.

In step S163, the CPU 20 sets the time-information B-picture picture decode queue for the decoder that receives the subsequent data.

In the time-information B-picture decode queue, information concerning the decode start time time_base for the first picture to be decoded, the number of I-pictures and P-pictures, and time information calculated from the count value of the time counter for counting each frame are set in association with the picture IDs set in the B picture decode queue discussed with reference to FIGS. 16A and 16B. The time-information B-picture decode queue is provided for each of the decoders 22, 23, and 24 of the playback apparatus 1.

More specifically, the CPU 20 sets the time-information B-picture decode queue for the decoder that receives the subsequent data by referring to the register value indicating the decoder that receives the subsequent data. The CPU 20 uses the value obtained by adding the number of I-pictures and P-pictures to the decode start time information time_base as information indicating the timing at which the frame corresponding to the first picture ID of the picture IDs queued in the B-picture decode queue is decoded, and also uses the count value of the time counter as information indicating the timing at which the frames corresponding to the other picture IDs are decoded.

When the time-information B-picture decode queue is set in step S163, the B-picture decode queue becomes empty since all the picture IDs queued in the B-picture decode queue are output.

In step S164, the CPU 20 sets the time-information display order setting queue for the decoder that receives the subsequent data.

In the time-information display order setting queue, the value obtained by subtracting one from the phase displacement of the display timing with respect to the decode start timing for the first picture to be displayed and the count value of the time counter are set in association with the picture IDs set in the display order setting queue discussed with reference to FIGS. 14A and 14B. The time-information display order setting queue is provided for each of the decoders 22, 23, and 24 of the playback apparatus 1.

More specifically, the CPU 20 sets the time-information display order setting queue for the decoder that receives the subsequent data by referring to the register value indicating the decoder that receives the subsequent data. The CPU 20 uses, as the reference time information, the value obtained by subtracting one from the phase displacement disp_phase indicating the display timing of the first frame in the display order determined in the display phase determining processing, and uses the count value of the time counter as information indicating the timing at which the frames corresponding to the other picture ID are decoded.

When the time-information display order setting queue is set in step S164, the display order setting queue becomes empty since all the picture IDs queued in the display order setting queue are output.

In step S165, the CPU 20 stores in the register the value obtained by adding the number of pictures to be displayed, which are stored in the display picture number register in step S131 of FIG. 17, to the decode start time information time_base as the decode start time information prev_time_base of the previous GOP. The process then returns to step S77 in FIG. 6.

According to the time-information schedule determining processing, the decoding processing timing for 16 frames, which is the decoding processing unit, is set.

According to the display phase determining processing and the time-information schedule determining processing discussed with reference to FIGS. 17 and 18, respectively, the decode phase and display phase are set as time information on the basis of the numbers of I-pictures and P-pictures, the number of pictures to be displayed, and whether the first picture to be displayed is a B-picture. Accordingly, decoded images can be continuously displayed by dynamically changing the speed in accordance with a change in the number of pictures to be decoded and displayed in each decoder, which occurs when fast forward and reverse playback operations are performed by using a plurality of decoders. Even if the omission cycle is changed in response to an instruction to change the playback speed from a certain picture, the playback speed can be continuously changed for each frame within the corresponding speed range by increasing or decreasing the number of pictures to be displayed.

According to the processing discussed with reference to FIGS. 6 through 18, the decode schedule processing in step S32 of FIG. 4 can be executed.

The frame control processing executed in step S33 of FIG. 4 is discussed below with reference to the flowchart of FIG. 19.

In step S191, the CPU 20 determines whether there is any stream data for which the display time has passed by referring to the time-information I/P-picture decode queue and a time management counter for managing the timing of each processing executed in the playback apparatus 1. If it is determined in step S191 that there is stream data for which the display time has passed, the process proceeds to step S196.

If it is determined in step S191 that there is no stream data for which the display time has passed, the process proceeds to step S192 in which decoding processing, which is discussed below with reference to FIG. 20, is executed.

In step S193, display processing, which is discussed below with reference to FIG. 21, is executed.

In step S194, the CPU 20 sends display picture information to the CPU 11 by writing the display picture information into the result buffer 32 of the PCI bridge 17 via the control bus 19 in response to the display start command sent from the CPU 11 in step S6 of FIG. 3. This enables the CPU 11 to understand which picture of which GOP to be displayed by referring to the display picture information stored in the result buffer 32.

In step S195, the CPU 20 increments the time management counter, and the process returns to step S33 in FIG. 4.

Figure 32:
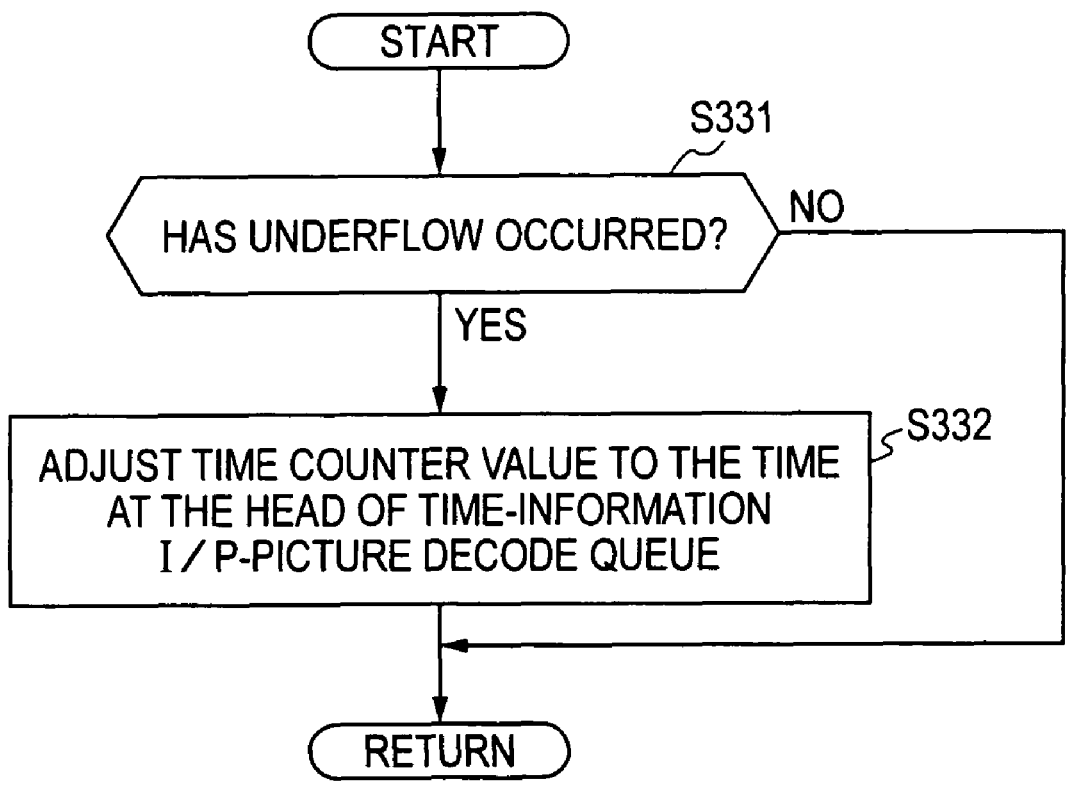
FIG. 32 is a flowchart illustrating underflow processing.

If it is determined in step S191 that there is stream data for which the display time has passed, the process proceeds to step S196 in which underflow processing, which is described below with reference to FIG. 32, is executed. The process then returns to step S33 in FIG. 4.

According to the frame control processing, if there is no stream data for which the display time has passed, one frame is decoded based on the decode schedule, and the display picture information is sent to the CPU 11, and certain pictures are omitted. If there is stream data for which the display time has passed, the underflow processing, which is described below, is executed.

A description is now given of the decoding processing executed in step S192 in FIG. 19 with reference to the flowchart of FIG. 20.

In step S221, the CPU 20 determines whether the value of the time management counter matches the time information which is associated with the picture ID of the picture to be subsequently decoded and which is set in the time-information I/P-picture decode queue or the time-information B-picture decode queue. If it is determined in step S221 that the value of the time management counter does not match the time information, the process returns to step S192 in FIG. 19.

If it is determined in step S221 that the value of the time management counter matches the time information, the process proceeds to step S222. In step S222, the CPU 20 obtains from the corresponding decoder 22, 23, or 24 information concerning empty banks in the video bank memory 82 of the decoder 22, 23, or 24 via the control bus 19.

In step S223, the CPU 20 controls the corresponding decoder 22, 23, or 24 via the control bus 19 to decode the I-picture, P-picture, or B-picture whose time information matches the value of the time management counter, and deletes the picture ID of the decoded picture from the time-information I/P-picture decode queue or the time-information B-picture decode queue.

More specifically, the CPU 20 refers to the register value indicating the decoder that receives the subsequent data, and controls the elementary-stream address determining unit 73 of the corresponding decoder to allow the memory controller 74 to read from the input buffer 75 the data of the picture corresponding to the picture ID whose time information matches the value of the time management counter among the picture IDs set in the time-information I/P-picture decode queue or the time-information B-picture decode queue and to supply the read data to the decode processor 77.

If the picture to be decoded is an I-picture, the CPU 20 controls the decode processor 77 to decode the I-picture supplied from the memory controller 74, and also controls the write-image address determining unit 78 to supply the decoded frame data to the memory controller 81 and to store the decoded I-picture in the bank that has become empty at the earliest time among the empty banks of the video bank memory 82 based on the empty bank information obtained in step S222. If the picture to be decoded is a P-picture, the CPU 20 controls the reference-image address determining unit 79 to read the preceding reference image stored in the video bank memory 82 under the control of the memory controller 81 and to supply the read reference image to the decode processor 77, and controls the decode processor 77 to decode the P-picture supplied from the memory controller 74. The CPU 20 also controls the write-image address determining unit 78 to supply the decoded frame data to the memory controller 81 and to store the decoded P-picture in the bank that has become empty at the earliest time among the empty banks of the video bank memory 82 based on the empty bank information obtained in step S222.

The CPU 20 receives the information concerning the bank position at which the decoded I-picture or P-picture is stored from the write-image address determining unit 78 via the control bus 76 and the control bus 19. When decoding the P-picture, by specifying the bank position of the preceding reference image, the CPU 20 can control the reference-image address determining unit 79 to allow the memory controller 81 to read the preceding reference image stored in the video bank memory 82 and to supply the read reference image to the decode processor 77.

If the picture to be decoded is a B-picture, the CPU 20 controls the reference-image address determining unit 79 to allow the memory controller 81 to read the preceding and upcoming reference images stored in the video bank memory 82 and to supply the read reference images to the decode processor 77, and controls the decode processor 77 to decode the B-picture supplied from the memory controller 74. The CPU 20 also controls the write-image address determining unit 78 to supply the decoded frame data to the memory controller 81 and to store the decoded B-picture in the bank that has become empty at the earliest time among the empty banks of the video bank memory 82 based on the empty bank information obtained in step S222.

The CPU 20 receives the information concerning the bank positions at which the decoded I-pictures and P-picture are stored from the write-image address determining unit 78 via the control bus 76 and the control bus 19. When decoding the B-picture, by specifying the bank positions of the preceding and upcoming reference images, the CPU 20 can control the reference-image address determining unit 79 to read the preceding and upcoming reference images stored in the video bank memory 82 under the control of the memory controller 81 and to supply the read reference image to the decode processor 77.

In step S224, the CPU 20 determines whether the picture decoded by the decode start command executed in step S223 is a B-picture.

If the decoded picture is found to be a B-picture in step S224, the process proceeds to step S225 in which the CPU 20 decrements the preceding and upcoming reference counters by one based on the pointers of the reference counters.

For example, if the decoded picture is B(3), the pointer 2 is set as the preceding reference pointer and the pointer 5 is set as the upcoming reference counter. Accordingly, the CPU 20 decrements the preceding reference counter of I(2) and the upcoming reference counter of P(5) by one.

If it is determined in step S224 that the decoded picture is not a B-picture, the process proceeds to step S226 to determine whether the decoded picture is a P-picture.

If the decoded picture is found to be a P-picture in step S226, the process proceeds to step S227 in which the CPU 20 decrements the corresponding preceding reference counter by one based on the pointers of the reference counters.

For example, if the decoded picture is P(5), the pointer 2 is set as the preceding reference pointer. Accordingly, the CPU 20 decrements the preceding reference counter of I(2) by one.

After step S225 or S227, the process proceeds to step S228 in which the CPU 20 determines whether all the reference counter values corresponding to one of the picture IDs become 0.

If it is determined in step S228 that there is one picture ID whose reference counter values become 0, the process proceeds to step S229 in which the bank for the corresponding picture ID is released.

If it is determined in step S226 that the decoded picture is not a P-picture, i.e., the decoded picture is an I-picture, or if it is determined in step S228 that no picture ID is found, or after step S229, the process returns to step S192 in FIG. 19.

According to the decoding processing, if all the reference counter values become 0 since the value of the corresponding preceding or upcoming reference counter is decremented by one after decoding the I-picture, P-picture, or B-picture based on the determined schedule, that is, if there is a picture which has been displayed and which has been used by being referred to by other pictures, the bank storing that picture is released.

The display processing executed in step S193 in FIG. 19 is described below with reference to the flowchart of FIG. 21.

In step S251, the CPU 20 determines whether the value of the time management counter matches the time information associated with the current first picture ID set in the time-information display order setting queue. The time information set in the time-information display order setting queue is the value obtained by subtracting one from the phase displacement disp_phase determined in the display phase determining processing, which indicates the display timing of the first frame among the 15 frames in the display order, or is the count value of the time counter associated with the picture IDs of the frames other than the first frame in the display order.

If it is determined in step S251 that the value of the time management counter matches the time information set in the time-information display order setting queue, the process proceeds to step S252. In step S252, the CPU 20 sends a display instruction to display the picture corresponding to the picture ID whose time information matches the value of the time management counter to the corresponding decoder 22, 23, or 24 via the control bus 19. In this case, the output address determining unit 80 of the decoder receives the control signal from the CPU 20 via the control bus 76 and controls the memory controller 81 to read the corresponding picture from the video bank memory 82 and to supply the read picture to the selector 25.

The CPU 20 then controls the selector 25 to output the decoded frame based on the register value which indicates the decoder that receives the subsequent data and which is set in step S78 of FIG. 6.

In step S253, the CPU 20 decrements the self-reference counter corresponding to the picture ID of the displayed picture by one.

As a result of sending the display instruction to the decoder and decrementing the self-reference counter by one, the picture ID of the current first picture set in the time-information display order setting queue is output from the time-information display order setting queue, and the picture ID of the subsequent picture becomes the first picture ID in the time-information display order setting queue or the time-information display order setting queue becomes empty.

In step S254, the CPU 20 determines whether all the reference counter values corresponding to one of the picture IDs become 0.

If a picture ID whose reference counter values become 0 is found in step S254, the process proceeds to step S255 in which the CPU 20 releases the bank for the corresponding picture ID.

If it is determined in step S251 that the value of the time management counter does not match the time information set in the time-information display order setting queue, or if it is determined in step S254 that no corresponding picture ID is found, or after step S255, the process returns to step S193 in FIG. 19.

According to the display processing, if all the reference counter values become 0 since the decoded data is displayed and the self-reference counter value is decremented based on the time information set in the time-information display order setting queue, that is, if there is a picture which has been displayed and has been used by being referred to by other pictures, the bank storing that picture is released.

In the fast forward-direction or reverse-direction playback processing, the setting of the time-information display order setting queue when pictures are omitted is described below with reference to FIGS. 22A through 27B. FIGS. 22A, 23A, 24A, 25A, 26A, and 27A illustrate the schedule condition before performing frame omission, frames to be omitted being indicated by the broken lines. FIGS. 22B, 23B, 24B, 25B, 26B, and 27B illustrate the schedule condition after performing frame omission. In FIGS. 22A through 27B, the number 0, 1, or 2 in parenthesis indicates to which decoder 22, 23, or 24 the information stored in the information queue corresponds to, or by which decoder 22, 23, or 24 the information stored in the information queue is executed.

For example, in the ×2 fast playback operation, as shown in FIGS. 22A and 22B, the decode start timing of the B-picture of the first GOP is later than the decode start timing of the I-picture by 6 frames. Since the first picture is an I-picture, the display start timing of the B-picture is later than the decode start timing of the I-picture by 6 frames. The decode start timing of the I-picture of the subsequent GOP is calculated to be 7 frames according to equation (1) since the number of display pictures of the previous GOP is 8 and the phase displacement corrected value disp_zero is 1. The decode start timing of the B-picture is later than the decode start timing of the I-picture by 6 frames, and the since the first picture is a B-picture, the display start timing of the B-picture is later than the decode start timing of the I-picture by 7 frames.

Figure 23A:
FIGS. 23A and 23B illustrate decode and display scheduling before and after performing omission of pictures in a ×−2 playback operation.
Figure 23B:
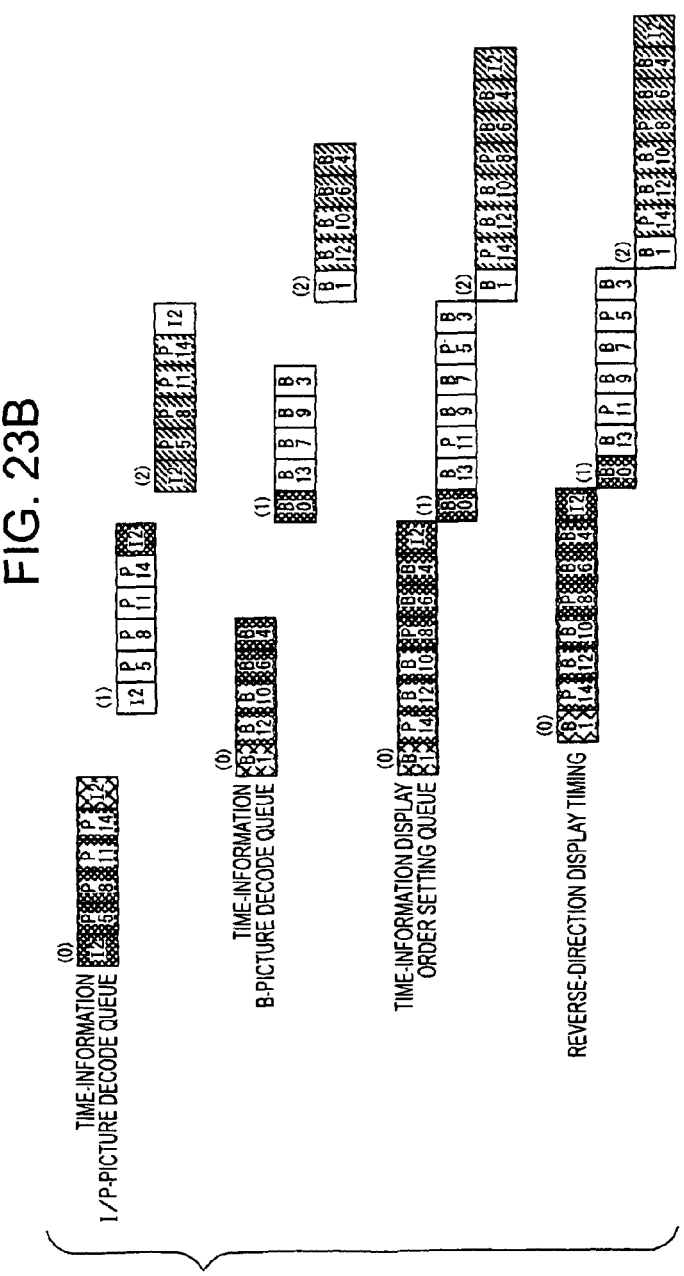

For example, in the ×−2 fast playback operation, as shown in FIGS. 23A and 23B, the decode start timing of the B-picture of the first GOP is later than the decode start timing of the I-picture by 6 frames. Since the first picture is a B-picture, the display start timing of the B-picture is later than the decode start timing of the I-picture by 7 frames. The decode start timing of the I-picture of the subsequent GOP is calculated to be 8 frames according to equation (1) since the number of display pictures of the previous GOP is 8 and the phase displacement corrected value disp_zero is 0. The decode start timing of the B-picture is later than the decode start timing of the I-picture by 6 frames, and the since the first picture is a B-picture, the display start timing of the B-picture is later than the decode start timing of the I-picture by 7 frames.

For example, in the ×4 fast playback operation, as shown in FIGS. 24A and 24B, the decode start timing of the B-picture of the first GOP is later than the decode start timing of the I-picture by 6 frames. Since the first picture is an I-picture, the display start timing of the B-picture is later than the decode start timing of the I-picture by 6 frames. The decode start timing of the I-picture of the subsequent GOP is calculated to be 3 frames according to equation (1) since the number of display pictures of the previous GOP is 4 and the phase displacement corrected value disp_zero is 1. The decode start timing of the B-picture is later than the decode start timing of the I-picture by 6 frames, and the since the first picture is a B-picture, the display start timing of the B-picture is later than the decode start timing of the I-picture by 7 frames.

For example, in the x–4 fast playback operation, as shown in FIGS. 25A and 25B, the decode start timing of the B-picture of the first GOP is later than the decode start timing of the I-picture by 6 frames. Since the first picture is a B-picture, the display start timing of the B-picture is later than the decode start timing of the I-picture by 6 frames. The decode start timing of the I-picture of the subsequent GOP is calculated to be 4 frames according to equation (1) since the number of display pictures of the previous GOP is 4 and the phase displacement corrected value disp_zero is 0. The decode start timing of the B-picture is later than the decode start timing of the I-picture by 6 frames, and the since the first picture is a B-picture, the display start timing of the B-picture is later than the decode start timing of the I-picture by 7 frames.

For example, in the x5 fast playback operation, as shown in FIGS. 26A and 26B, the decode start timing of the B-picture of the first GOP is later than the decode start timing of the I-picture by 6 frames. Since the first picture is an I-picture, the display start timing of the B-picture is later than the decode start timing of the I-picture by 6 frames. The decode start timing of the I-picture of the subsequent GOP is calculated to be 3 frames according to equation (1) since the number of display pictures of the previous GOP is 3 and the phase displacement corrected value disp_zero is 0. The decode start timing of the B-picture is later than the decode start timing of the I-picture by 6 frames, and the since the first picture is an I-picture, the display start timing of the B-picture is later than the decode start timing of the I-picture by 6 frames.

For example, in the x–5 fast playback operation, as shown in FIGS. 27A and 27B, the decode start timing of the B-picture of the first GOP is later than the decode start timing of the I-picture by 6 frames. Since the first picture is a B-picture, the display start timing of the B-picture is later than the decode start timing of the I-picture by 7 frames. The decode start timing of the I-picture of the subsequent GOP is calculated to be 3 frames according to equation (1) since the number of display pictures of the previous GOP is 3 and the phase displacement corrected value disp_zero is 0. The decode start timing of the B-picture is later than the decode start timing of the I-picture by 6 frames, and the since the first picture is a B-picture, the display start timing of the B-picture is later than the decode start timing of the I-picture by 7 frames.

The setting of the video bank memory 82 is described below with reference to FIGS. 28 through 31.

FIG. 28 illustrates the pictures stored in 8 banks of the video bank memory 82 shown in FIG. 2 when a x1 playback operation is performed.

In banks No. 0 through No. 5, decoded I-pictures and P-pictures are sequentially stored in the decoding order. When the first I2 picture is displayed, B3 picture is stored in bank No. 6 at the same time, and when B3 picture is displayed, B4 picture is stored in bank No. 7 at the same time. When B4 picture is displayed, bank No. 6 storing B3 picture that has been displayed and bank No. 0 storing I2 picture that has been used as a reference image are released, and B6 picture is stored in bank No. 0. Thereafter, the banks storing the I-pictures and P-pictures are released after they have been displayed and after they have been used as reference images. B-pictures are sequentially stored in the banks in the chronological order in which the banks are released. The banks storing the B-pictures are released after they have been displayed. That is, the banks storing pictures whose self-reference counters, preceding reference counters, preceding reference counters, and upcoming reference counters become 0 are sequentially released. B-pictures are sequentially stored from the banks released at the earlier time and are released after they have been displayed.

FIG. 29 illustrates the pictures stored in 8 banks of the video bank memory 82 shown in FIG. 2 when a x2 playback operation is performed.

In banks No. 0 through No. 5, decoded I-pictures and P-pictures are sequentially stored in the decoding order. When the first I2 picture is displayed, B4 picture is stored in bank No. 6 at the same time, and when B4 picture is displayed, B6 picture is stored in bank No. 7 at the same time. Then, bank 0 storing I2 picture, which has been displayed and which has been used as a reference image, is released. When B6 picture is displayed, bank No. 6 storing B4 picture that has been displayed and bank No. 1 storing P5 picture that has been used as a reference image are released. Thereafter, the banks storing the I-pictures and P-pictures are released after they have been displayed and after they have been used as reference images. B-pictures, which are not omitted, are sequentially stored in the banks released at the earlier time and are released after they have been displayed. That is, the banks storing pictures whose self-reference counters, preceding reference counters, and upcoming reference counters become 0 are sequentially released. B-pictures are sequentially stored from the banks released at the earlier time, and are released after they have been displayed.

Figure 30:
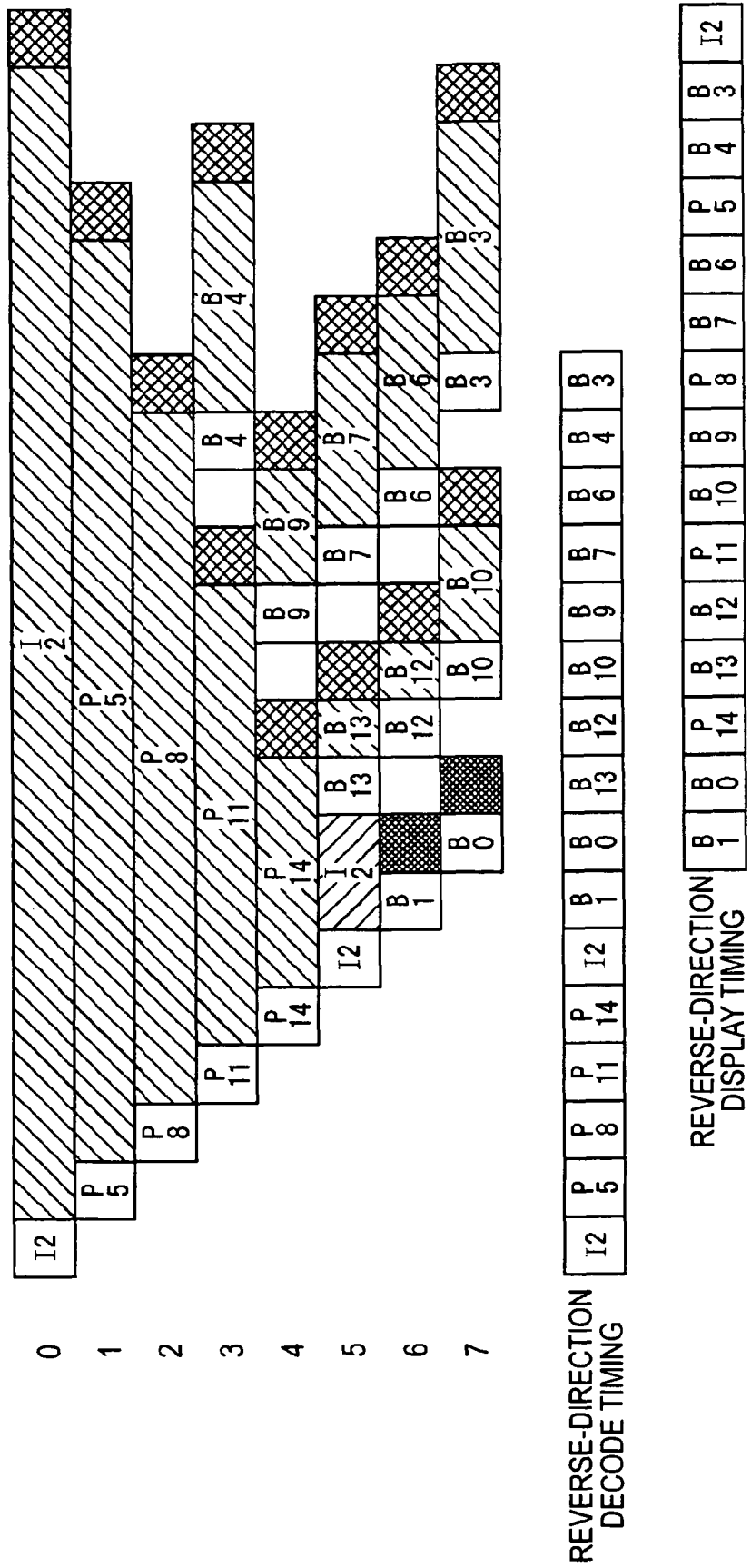
FIG. 30 illustrates bank control in a ×−1 playback operation.

FIG. 30 illustrates the pictures stored in 8 banks of the video bank memory 82 shown in FIG. 2 when a x–1 playback operation is performed.

In banks No. 0 through No. 5, decoded I-pictures and P-pictures are sequentially stored in the decoding order. After I2 picture is stored in bank No. 5, B1 picture is stored in bank No. 6, and when B1 picture is displayed, B0 picture is stored in bank No. 7 at the same time. When B0 picture is displayed, bank No. 6 storing B1 picture that has been displayed is released. Thereafter, the banks storing the I-pictures and P-pictures are released after they have been displayed and after they have been used as reference images. B-pictures are sequentially stored in the banks in the chronological order in which the banks are released. The banks storing the B-pictures are released after they have been displayed. That is, the banks storing pictures whose self-reference counters, preceding reference counters, and upcoming reference counters become 0 are sequentially released. In the example shown in FIG. 30, since the reverse-order playback operation is performed, I2 picture first stored in bank No. 0 is displayed at the last time. Accordingly, bank No. 0 storing I2 picture is not released until this GOP has been displayed.

Figure 31:
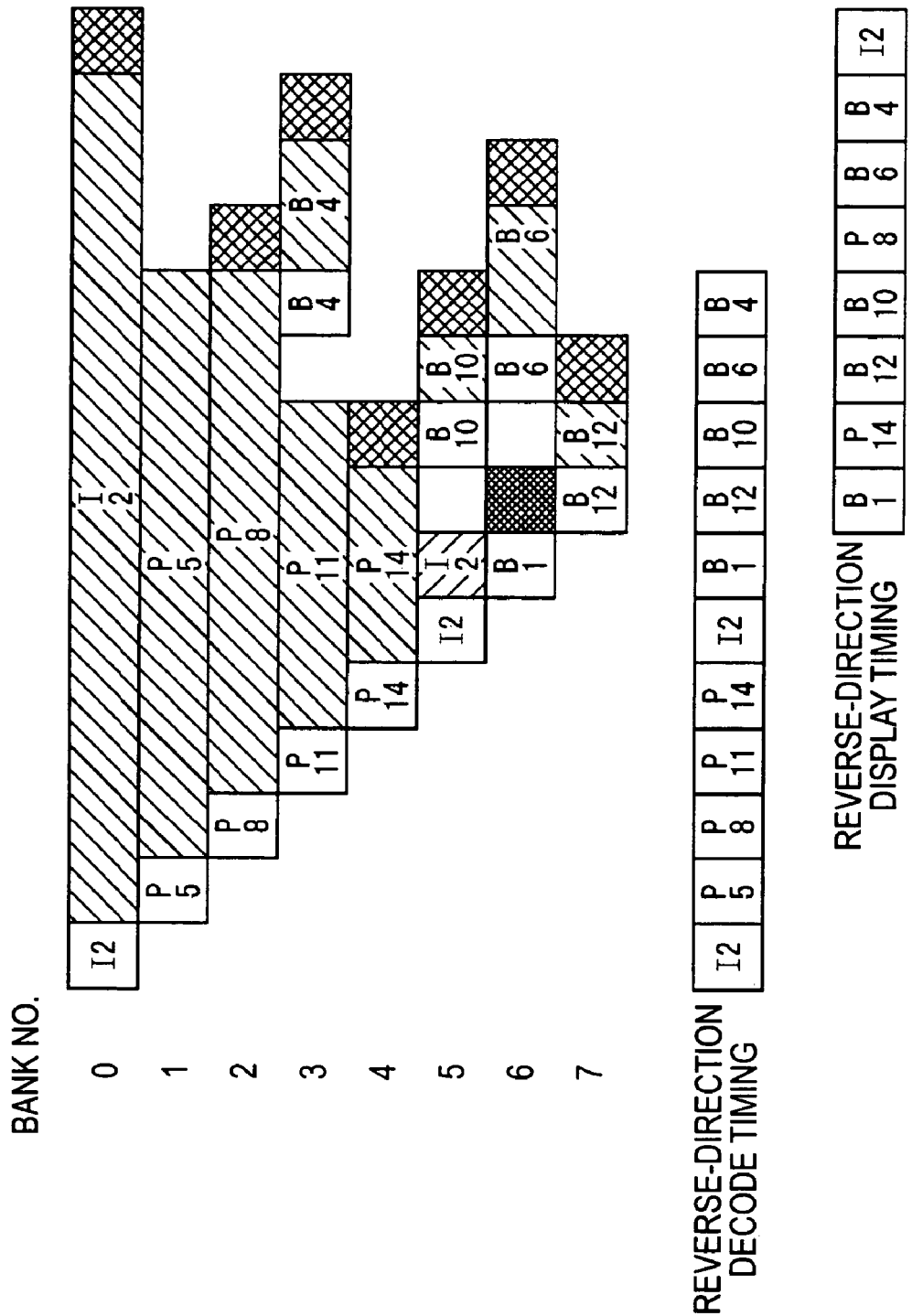
FIG. 31 illustrates bank control in a ×−2 playback operation.

FIG. 31 illustrates the pictures stored in 8 banks of the video bank memory 82 shown in FIG. 2 when a x–2 playback operation is performed.

In banks No. 0 through No. 5, decoded I-pictures and P-pictures are sequentially stored in the decoding order. After I2 picture is stored in bank No. 5, B1 picture is stored in bank No. 6, and when B1 picture is displayed, B12 picture is stored in bank No. 7 at the same time. Then, bank No. 5 storing I2 picture that has been used as a reference image is released. When P14 picture is displayed, B10 picture is stored in the released bank No. 5, and bank No. 6 storing B1 picture that has been displayed is released. The banks storing I-pictures and P-pictures are released after they have been displayed and after they have been used as reference images. B-pictures, which are not omitted, are sequentially stored from the banks released at the earlier time, and after B-pictures have been displayed, the corresponding banks are released. That is, the banks storing pictures whose self-reference counters, preceding reference counters, and upcoming reference counters become 0 are sequentially released. In the example shown in FIG. 31, since the reverse-order playback operation is performed, I2 picture first stored in bank No. 0 is displayed at the last time. Accordingly, bank No. 0 storing I2 picture is not released until this GOP has been displayed.

As described above, when performing a reverse-direction playback operation or a fast playback operation on image data compressed by using bidirectional inter-frame prediction, which is generally used in the image compression method, such as MPEG, I-pictures and P-pictures are decoded first, and reference pointers are used for a bank control operation when decoding B-pictures. It is thus possible to implement an efficient reverse-direction playback operation and fast reverse-direction playback operation with a minimum number of banks without requiring a complicated bank control operation.

More specifically, it is sufficient that the number of banks for storing frames is the total number of the number of I-pictures and P-pictures contained in the decoding processing unit and two banks for storing B-pictures. In this case, by decoding I-pictures and P-pictures, which are anchor frames, first, and by using reference pointers for a bank control operation when B-pictures are decoded, a fast playback operation or a reverse-direction playback operation can be implemented without requiring a complicated bank control operation.

For example, in an MPEG long GOP stream when N is 15 (N is the number of frames in one GOP), and M is 3 (M is an interval between I-pictures, P-pictures, or an I-picture and a P-picture), as in this embodiment, a video bank memory having a total of 8 banks, i.e., 5 banks for I, P, P, P, and P pictures, one bank for the subsequent I picture, and two banks for B-pictures, is prepared. With this arrangement, by decoding I-pictures and P-pictures first and by using reference pointers for a bank control operation when decoding B-pictures, a fast playback operation, a reverse-direction playback operation, or a fast reverse-direction playback operation can be implemented without requiring a complicated bank control operation.

To improve a response to an instruction to change the speed from a user, the decoding or display of B-pictures are sometimes suspended for changing the speed in units of frames. In this case, although the decode timing and display timing of B-pictures are separately managed, bank control can be simply performed. For example, even if an error occurs in predicting pictures by referring to other pictures when input streams are shifted, it restores the correct frame (underflow processing described below). Thus, the speed can be changed in units of frames.

The underflow processing executed in step S196 in FIG. 19 is described below with reference to the flowchart of FIG. 32.

In step S331, the CPU 20 determines by referring to the time management counter and the time counter whether the supply of stream data is delayed with respect to the display processing, i.e., whether underflow has occurred. If it is determined in step S331 that underflow has not occurred, the process returns to step S196 in FIG. 19, and proceeds to step S34 in FIG. 4.

If it is determined in step S331 that underflow has occurred, the process proceeds to step S332 in which the CPU 20 adjusts the value of the time counter to the time at the head of the time-information I/P-picture queue. The process then returns to step S196 in FIG. 19, and proceeds to step S34 in FIG. 4.

Figure 33:
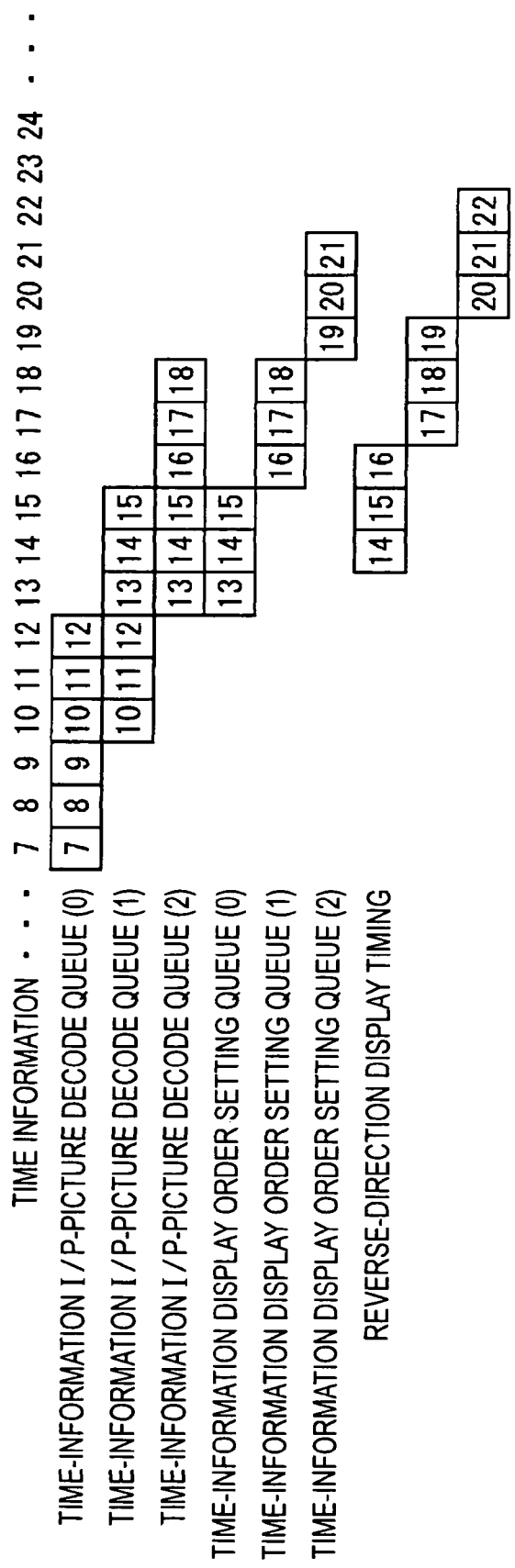
FIG. 33 illustrates a time counter when underflow does not occur.
Figure 34:
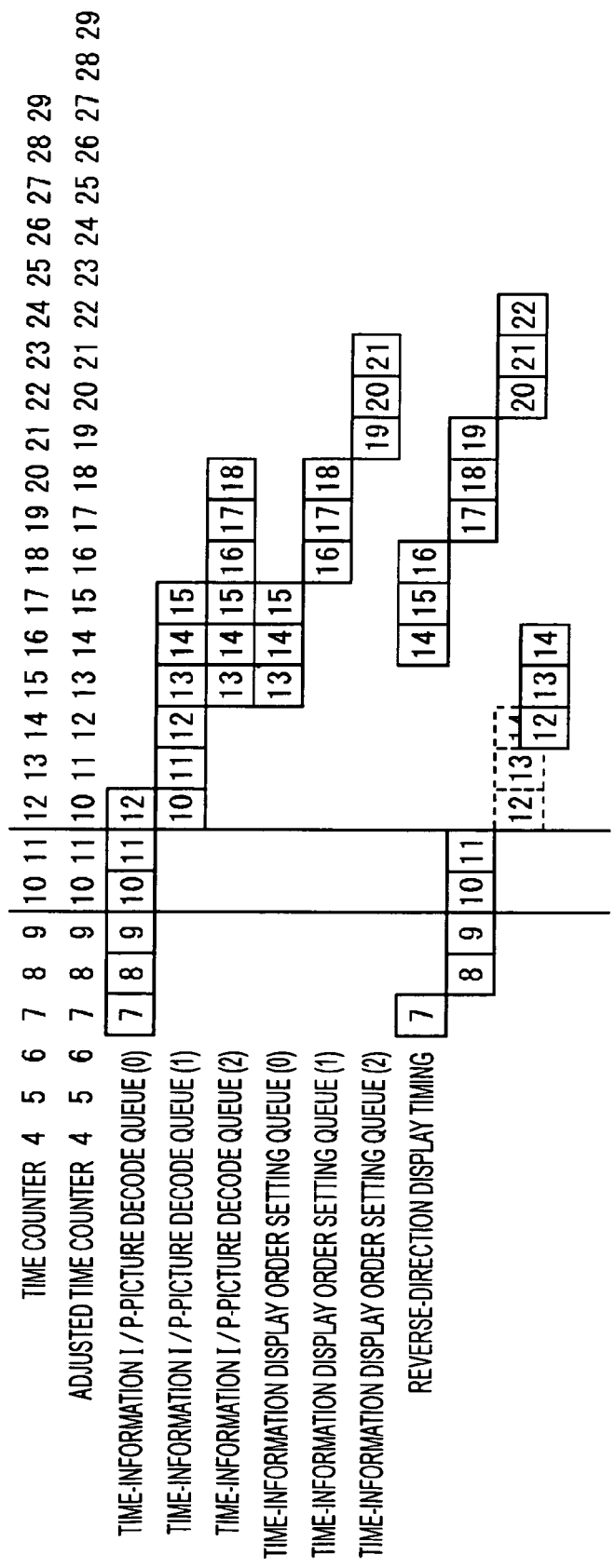
FIG. 34 illustrates the adjustment of a time counter when underflow occurs.

The adjustment of the time counter when underflow occurs is described below with reference to FIGS. 33 and 34. In FIGS. 33 and 34, the number 0, 1, or 2 in parenthesis indicates to which decoder 22, 23, or 24 the information stored in the information queue corresponds or by which decoder 22, 23, or 24 the information stored in the information queue is executed.

FIG. 33 illustrates information stored in the information queues and decode timing and display timing with respect to the time counter when underflow does not occur in the x–5 playback operation as performed in FIGS. 27A and 27B. In FIG. 33, the time counter of the decode start timing of the I-picture of a GOP indicates 7 by way of example.

If, for example, underflow occurs by the amount of two frames, the time counter is delayed for two frames, as shown in FIG. 34, and the processing is restarted by referring to the adjusted time counter, thereby allowing the subsequent scheduling, decoding, and display control without any delay.

According to this processing, even if the supply of streams is delayed due to, for example, the reduced throughput of the HDD 16 when a fast playback operation is performed, the underflow caused by the delay of the supply of streams can be detected and the counting of time information is delayed for the time for which underflow has occurred, thereby restarting the playback processing without being interrupted.

If it is determined in step S34 in FIG. 4 that not all the frames have been processed, the process proceeds to step S35 in which the time counter is incremented. The process then returns to step S31, and the corresponding processing is repeated.

The phase displacement between the decode timing and display timing is determined based on the number of I-pictures and P-pictures contained in the decoding processing unit. Alternatively, the phase displacement between the decode timing and display timing may be determined based on the number of frames to be displayed among the frames contained in the decoding processing unit.

When the fast forward-direction or reverse-direction playback operation is performed, in the decode scheduling in the second and subsequent decoding processing units, before determining frames to be displayed and frames not to be displayed, i.e., before performing frame omission, coding parameters, such as the picture type to be displayed at the head of the decoding processing unit, may be detected in advance.

For example, before determining frames to be displayed and frames not to be displayed, the picture type to be displayed at the head of the decoding processing unit is detected in advance, for example, based on the frame counter counted in the scheduling of the previous decoding processing unit and the calculated omission cycle.

With this arrangement, the decode schedule processing can be executed more precisely and more quickly.

The decoding processing has been described above when one GOP includes 15 pictures. When the number of anchor frames (I-pictures and P-pictures) contained in one GOP is 6 or more or 4 or less, if decoding is performed for each GOP in a manner similar to the decoding processing performed for each GOP including 15 pictures by the playback apparatus 1 shown in FIG. 1, some pictures are not decoded or the decoding of some pictures is delayed.

To deal with the situation where the number of pictures in a GOP is other than 15 in the playback apparatus 1 shown in FIG. 1, the following measure can be taken. After detecting the structure of each GOP, the decode unit, which serves as the decoding processing unit, including anchor frames corresponding to the number of banks of the video bank memory 82 of the decoder 22, 23, or 24 may be reconstructed by dividing or combining the GOPs. More specifically, if the video bank memory 82 has 8 banks, the decoding processing unit may be reconstructed by dividing one GOP or combining a plurality of GOPs so that the anchor frames contained in one GOP is 5 or less. Then, decoding is performed on the decoding processing unit including anchor frames required for decoding all P-pictures and B-pictures contained in the decoding processing unit.

The dividing of a GOP containing 30 frames and the decoding the divided GOPs are discussed below with reference to FIGS. 35 through 37B.

Figure 35:
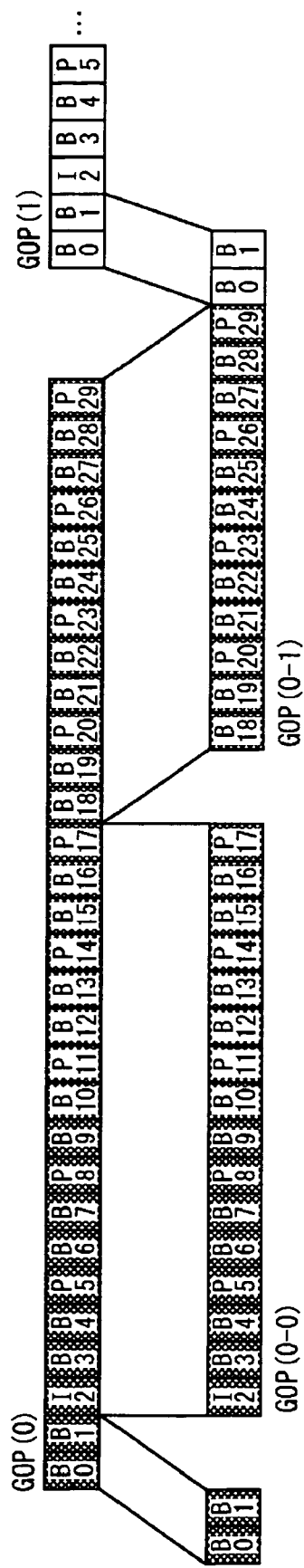

GOP(0) is formed of 30 frames, i.e., B0 through P29, as shown in FIG. 35, followed by GOP(1). In each decoding processing unit, the first two B-pictures are decoded together with the previous GOP.

Since there are 10 anchor frames in GOP(0), errors occur if decoding is performed on the GOP(0) in a manner similar to that when one GOP includes 15 pictures. Accordingly, GOP (0) is divided into two decoding processing units, as indicated in the bottom section of FIG. 35, so that the number of anchor frames becomes 6 or less.

GOP(0) is divided into two decoding processing units GOP (0-0) including I2 through P17 and GOP(0-1) including B18 through P29 and B0 and B1, as shown in FIGS. 36A and 36B, and GOP(0-0) and GOP(0-1) are decoded by different decoders. The final anchor frame P17 of GOP(0-0) is required for decoding the two B pictures B18 and B19 at the head of GOP(0-1). That is, P17 also serves as the anchor frame of GOP(0-1). The anchor frames of GOP(0-0) are required for decoding the anchor frames of GOP(0-1). Accordingly, after decoding the anchor frames of GOP(0-0), the anchor frames of GOP(0-1) and the first I-picture of the subsequent GOP are decoded.

Thus, in either decoder for decoding GOP(0-0) or GOP(0-1), the decoding order of anchor frames is unchanged regardless of whether the playback direction is forward or reverse or whether the playback speed is normal or fast. In contrast, in both the GOP(0-0) and GOP(0-1), the decoding order of B-pictures are different depending on the playback direction or playback speed. In FIGS. 36A and 36B, the decoding orders at the ×1 and ×−1 forward and reverse playback speeds are shown.

Figures 37A, 37B:
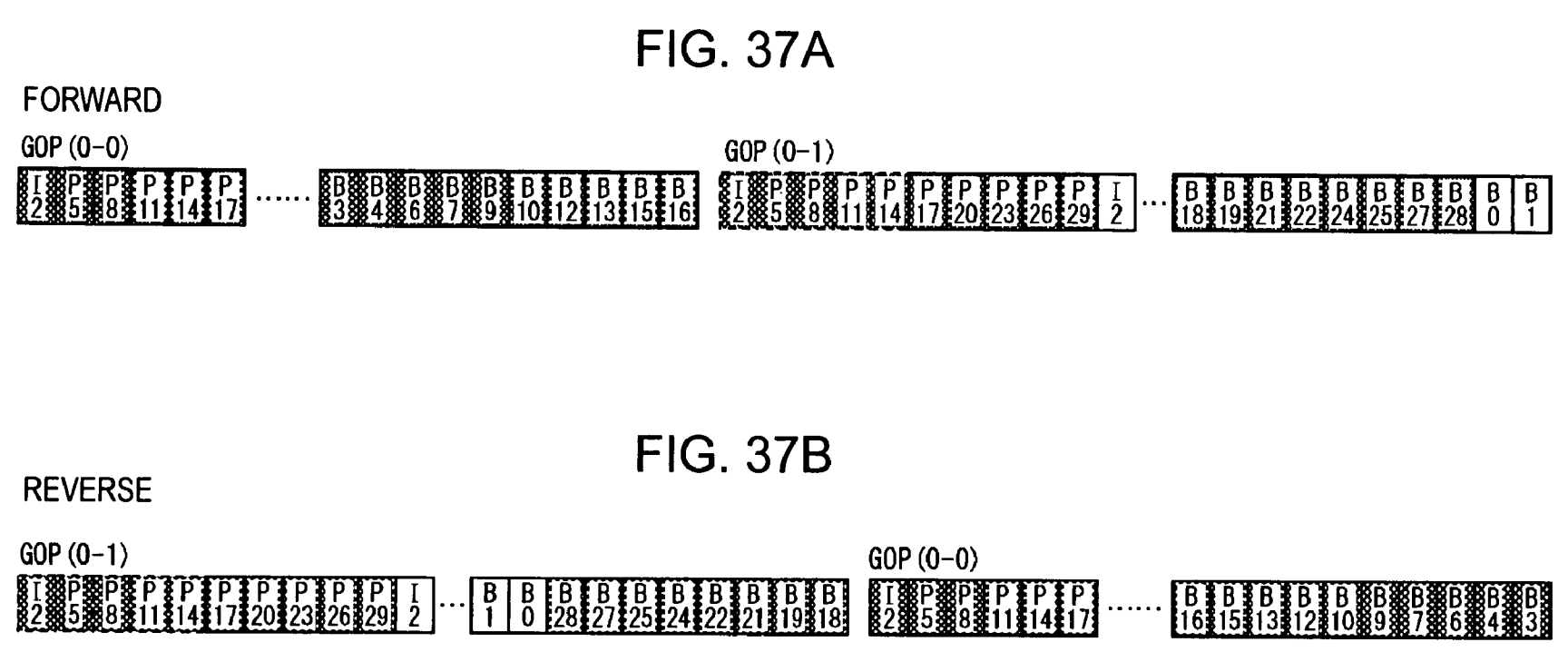

In the ×1 playback operation, as shown in FIG. 37A, in one decoder, after decoding the anchor frames I2 through P17 of GOP(0-0), B-pictures B3 through B16 of GOP(0-0) are decoded. Meanwhile, in the other decoder, after decoding the anchor frames I2 through P14, the anchor frames P17 through P29 of GOP(0-1) and the first I2 picture of GOP(1) are decoded by using the anchor frames I2 through P14 as reference images, and then, B pictures B18 through B28 of GOP (0-1) and B0 and B1 of GOP(1) are decoded.

In the ×−1 playback operation, as shown in FIG. 37B, in one decoder, after decoding the anchor frames I2 through P14, the anchor frames P17 through P29 of GOP(0-1) and the first I2 frame of GOP(1) are decoded by using the anchor frames I2 through P14 as reference images, and then, B1 and B0 of GOP(1) and B-pictures B28 through B18 of GOP(0-1) are decoded. In the other decoder, after the anchor frames I2 through P17 of GOP(0-0) are decoded, B-pictures B16 through B3 of GOP(0-0) are decoded.

Next, the setting of the decoding processing unit and the decoding processing when GOPs, each including 4 or less anchor frames, are continued are described below with reference to FIGS. 38 through 40B.

Figure 38:
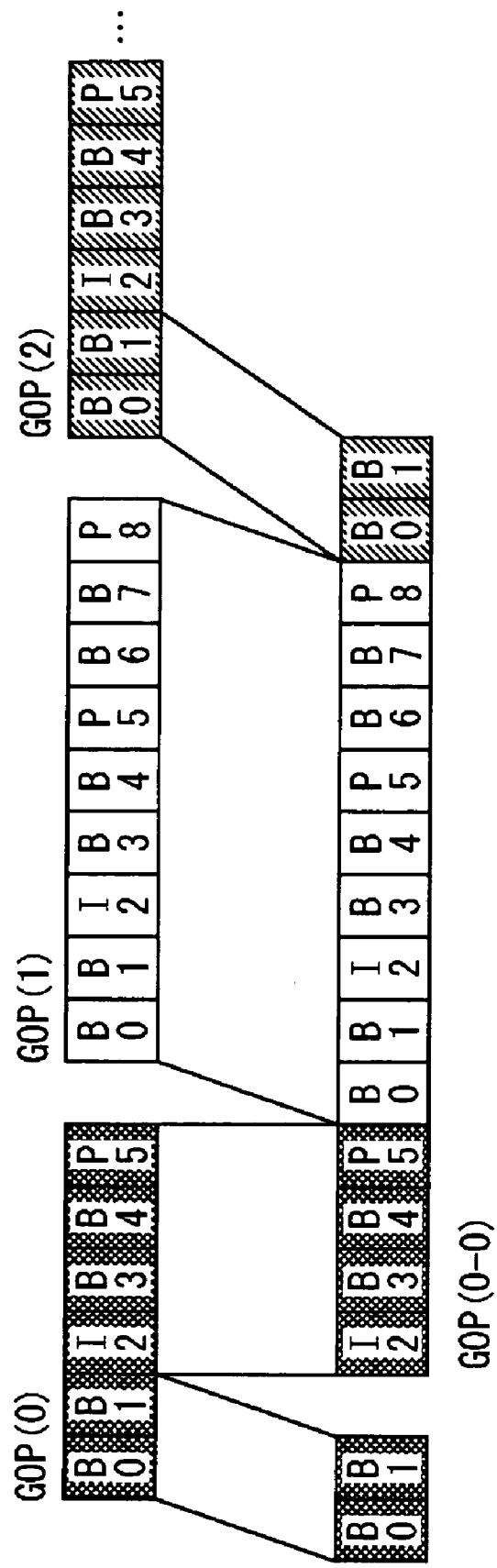

As shown in FIG. 38, GOP(0) is formed of 6 frames B0 through P5, GOP(1) is formed of 9 frames B0 3through P8, followed by GOP(2). In each decoding processing unit, the first two B-pictures are decoded together with the previous GOP.

There are two anchor frames in GOP(0) and there are three anchor frames in GOP(1). Accordingly, GOP(0) and GOP(1) are combined, as indicated in the bottom section of FIG. 38, so that the number of anchor frames becomes 4.

Figure 39:
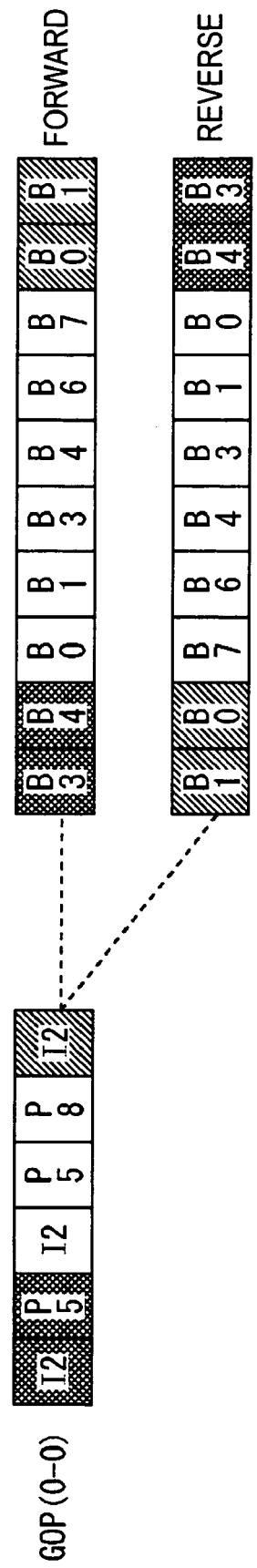

In this case, the first two B-frames B0 and B1 of GOP(0) are decoded together with the previous GOP, and I2 through P5 of GOP(0), GOP(1), and the first two B-pictures B0 and B1 of GOP(2) are decoded as the same decoding processing unit GOP(0-0). The decoding order of anchor frames is unchanged, as shown in FIG. 39, regardless of whether the playback direction is forward or reverse or whether the playback speed is normal or fast. In contrast, the decoding order of B-pictures is different depending on the playback direction or playback speed. In FIG. 39, the decoding orders at the ×1 or ×−1 forward and reverse playback speeds are shown.

In the ×1 forward-direction playback operation, as shown in FIG. 40A, in either decoder, the anchor frames of GOP(0-0) and the first I2 frame of GOP(2) are decoded, and then, B-pictures B3 through B7 of GOP(0-0) are decoded. Then, in the ×−1 reverse-direction playback operation, as shown in FIG. 40B, in either decoder, to perform the reverse-direction playback operation, the anchor frames of GOP(0-0) and the first I2 frame of GOP(2) are decoded, and then, B-pictures B7 through B3 of GOP(0-0) are decoded.

There may be the case where a GOP including 6 or more anchor frames and a GOP having 4 or less anchor frames are continued. In this case, the setting of the decoding processing units by combining such GOPs and then re-dividing them to equally distribute the load to decoders is described below with reference to FIGS. 41 through 43B.

Figure 41:
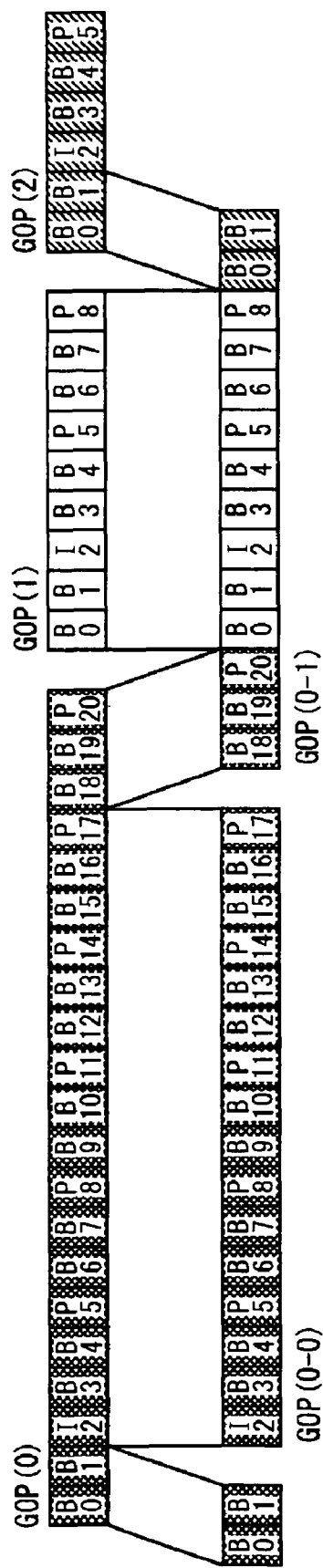

As shown in FIG. 41, GOP(0) includes 21 frames B0 through P20, and GOP(1) includes 9 frames B0 through P8, followed by GOP(2). In each decoding processing unit, the first two B-pictures are decoded together with the previous GOP.

Since there are 7 anchor frames in GOP(0), errors occur if decoding is performed on GOP(0) in a manner similar to that when one GOP includes 15 pictures. In this case, GOP(0) may be divided into two decoding processing units so that the number of anchor frames becomes 6 or less. However, since the number of frames of the following GOP is small, GOP(0) and GOP(1) are combined and are re-divided, as indicated in the bottom section of FIG. 41, so that two decoding processing units GOP(0-0) and GOP(0-1) are generated from GOP (0) and GOP(1), and decoding is then performed based on those decoding processing units.

Figure 42A:
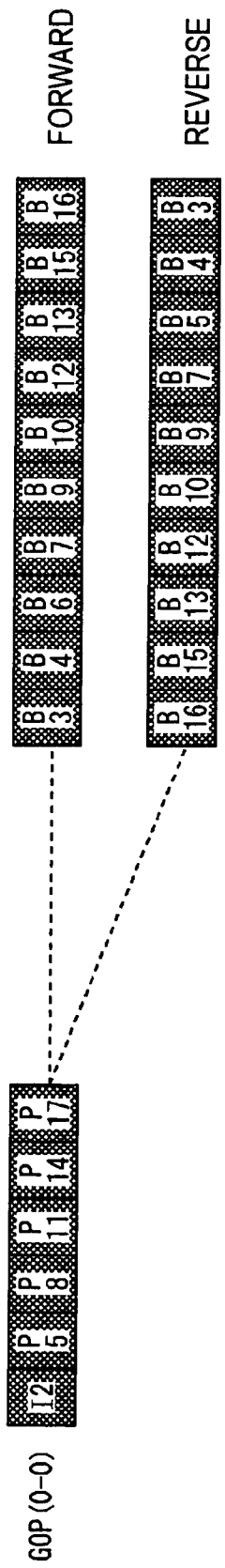
Figure 42B:
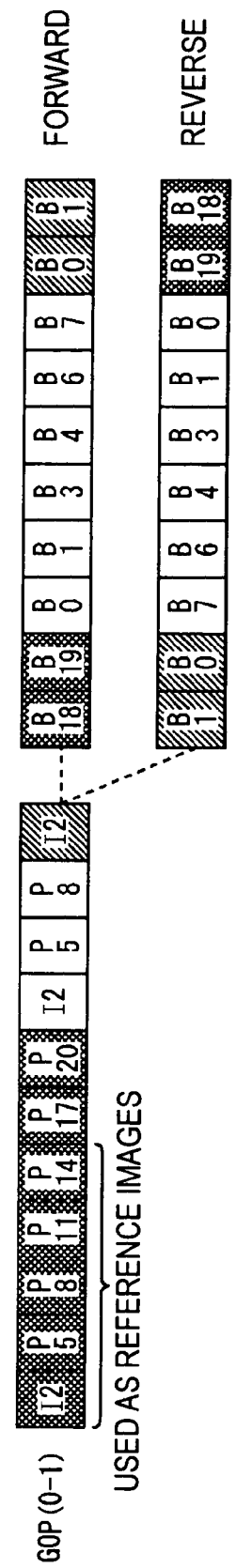

After combining GOP(0) and GOP(1), I2 through P17 of GOP(0) are set, as shown in FIG. 42A, to be a first decoding processing unit GOP(0-0), and B18 through P20 of GOP(0), the entire GOP(1), and B1 and B2 of GOP(2) are set, as shown in FIG. 42B, to be a second decoding processing unit, and the first and second decoding processing units are decoded in different decoders. The final anchor frame P17 of G(0-0) is required for decoding the first two B-pictures B18 and B19 of GOP(0-1). That is, P17 also serves as the anchor frame of GOP(0-1). The anchor frames of GOP(0-0) are required for decoding the anchor frames of GOP(0-1). Accordingly, after decoding the anchor frames of GOP(0-0), the anchor frames of GOP(0-1) and the first I-picture of the subsequent GOP are decoded.

Thus, in either decoder for decoding GOP(0-0) or GOP(0-1), the decoding order of anchor frames is unchanged regardless of whether the playback direction is forward or reverse or whether the playback speed is normal or fast. In contrast, in both the GOP(0-0) and GOP(0-1), the decoding order of B-pictures is different depending on the playback direction or playback speed. In FIGS. 42A and 42B, the decoding orders at the ×1 or ×−1 forward and reverse playback speeds are shown.

More specifically, in the ×1 forward-direction playback operation, as shown in FIG. 43A, in one decoder, after decoding I2 through P17 of GOP(0), which are anchor frames of GOP(0-0), B3 through B16 of GOP(0), which are B-pictures of GOP(0-0), are decoded. In the other decoder, after decoding the anchor frames I2 through P14 of GOP(0-0), P17 and P20 of GOP(0) and I2, P5, and P8 of GOP(1 ), which are the anchor frames of GOP(0-1), and the first I2 of GOP(2) are decoded by using I2 through P14 as reference images, and then, B18 and B19 of GOP(0) and B0 through B7 of GOP(1), which are B-pictures of GOP(0-1), and B0 and B1 of GOP(2) are decoded.

In the ×−1 reverse-direction playback operation, as shown in FIG. 43B, in one decoder, after decoding the anchor frames I2 through P14 of GOP(0-0), P17 and P20 of GOP(0) and I2, P5, and P8 of GOP(1), which are anchor frames of GOP(0-1), and the first I2 of GOP(2) are decoded by using I2 through P14 as reference images. Then, B1 and B0 of GOP(2) and B7 through B0 of GOP(1) and B19 and B18 of GOP(0), which are B-pictures of GOP(0-1), are decoded. In the other decoder, after decoding I2 through P17, which are anchor frames of GOP(0-0), B16 through B3 of GOP(0), which are B-pictures of GOP(0-0), are decoded.

There may be the case where a GOP including 4 or less anchor frames and a GOP having 6 or more anchor frames are continued. In this case, the setting of the decoding processing units by combining such GOPs and then re-dividing them to equally distribute the load to decoders is described below with reference to FIGS. 44 through 46B.

As shown in FIG. 44, GOP(0) includes 9 frames B0 through P8, and GOP(1) includes 15 frames B0 through P14, followed by GOP(2). In each decoding processing unit, the first two B-pictures are decoded together with the previous GOP.

Although there are only three anchor frames in GOP(0), there are 5 anchor frames in GOP(1), and thus, GOP(0) and GOP(1) are combined and are re-divided, as indicated in the bottom section of FIG. 44, so that two decoding processing units GOP(0-0) and GOP(0-1) are generated from GOP(0) and GOP(1), and decoding is then performed based on those decoding processing units.

After combining GOP(0) and GOP(1), I2 of GOP(0) through P8 of GOP(1) are set, as shown in FIG. 45A, to be a first decoding processing unit GOP(0-0), and B9 through P14 of GOP(1) and B1 and B2 of GOP(2) are set, as shown in FIG. 45B, to be a second decoding processing unit, and the first and second decoding processing units are decoded in different decoders. The final anchor frame P8 of GOP(0-0) is required for decoding the first two B-pictures B9 and B10 of GOP(0-1). That is, P8 also serves as the anchor frame of GOP(0-1). Among the anchor frames of GOP(0-0), the anchor frames I2 and P5 of GOP(1) are required for decoding the anchor frames of GOP(0-1). Accordingly, after decoding I2 and P5 of GOP(1), the anchor frames of GOP(0-1) and the first I-picture of the subsequent GOP are decoded.

Thus, in either decoder for decoding GOP(0-0) or GOP(0-1), the decoding order of anchor frames is unchanged regardless of whether the playback direction is forward or reverse or whether the playback speed is normal or fast. In contrast, in both the GOP(0-0) and GOP(0-1), the decoding order of B-pictures is different depending on the playback direction or playback speed. In FIGS. 45A and 45B, the decoding orders at the ×1 and ×−1 forward and reverse playback speeds are shown.

Figure 46A:
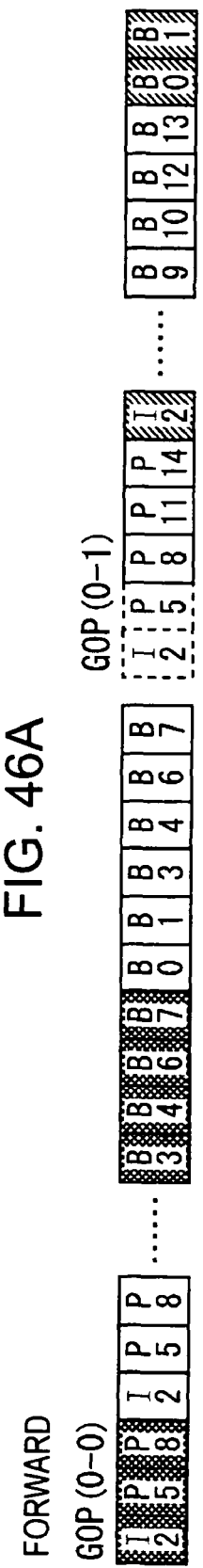

More specifically, in the ×1 forward-direction playback operation, as shown in FIG. 46A, in one decoder, after decoding I2 through P8 of GOP(0) and I2 through P8 of GOP(1), which are anchor frames of GOP(0-0), B3 through B7 of GOP(0) and B0 through B7 of GOP(1), which are B-pictures of GOP(0-0), are decoded. In the other decoder, after decoding the anchor frames I2 through P5 of GOP(1), which are anchor frames of GOP(0-0), P8 through P14 of GOP(1), which are anchor frames of GOP(0-1), and the first I2 of GOP(2) are decoded by using I2 through P5 as reference images, and then, B9 through B13 of GOP(1), which are B-pictures of GOP(0-1), and B0 and B1 of GOP(2) are decoded.

Figure 46B:
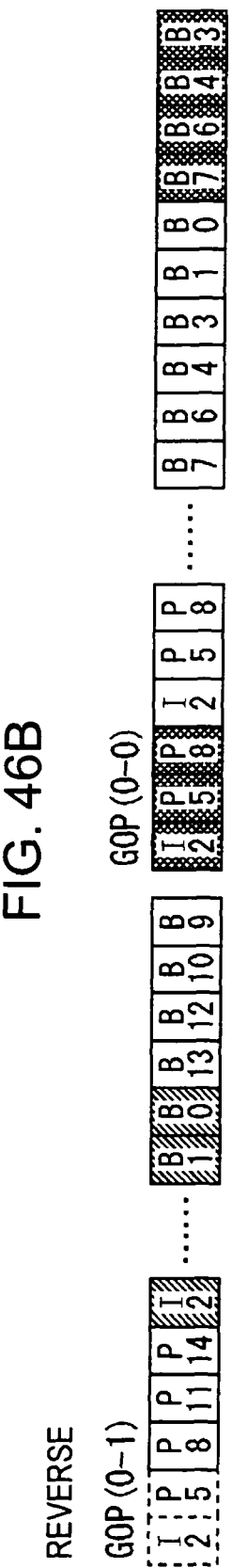

In the ×−1 reverse-direction playback operation, as shown in FIG. 46B, in one decoder, after decoding the anchor frames I2 and P5 of GOP(1), which are anchor frames of GOP(0-0), P8 through P14 of GOP(1), which are the anchor frames of GOP(0-1), and the first I2 of GOP(2) are decoded by using I2 and P5 as reference images. Then, B1 and B0 of GOP(2) and B13 through B9 of GOP(1), which are B-pictures of GOP(0-1), are decoded. In the other decoder, after decoding I2 through P8 of GOP(0) and I2 through P8 of GOP(1), which are anchor frames of GOP(0-0), B7 through B0 of GOP(1) and B7 through B3 of GOP(0), which are B-pictures of GOP (0-0), are decoded.

As described with reference to FIGS. 35 through 46B, the decode unit, which serves as the decoding processing unit, is constructed. Then, decoding scheduling is conducted for each decode unit, and frame omission is performed as required so that the playback operation can be performed in the specified playback direction at the specified playback speed. Then, decoding is performed and streams are played back and output.

More specifically, among a plurality of GOPs transferred and stored in the memory 18, the CPU 20 reads the structures of a GOP to be decoded and the subsequent GOP and then constructs the decode unit, which serves as the decoding processing unit, by dividing and combining the GOPs based on the number of anchor frames. The CPU 20 then sends a control command to the PCI bridge 17 to control the PCI bridge 17 to read stream data for each decode unit from the memory 18 and to supply the read stream data to one of the decoders 22, 23, and 24.

Then, the CPU 20 sets scheduling as described above. In this case, as in GOP(0-1) discussed with reference to FIGS. 35, 41, or 44, to decode anchor frames of the corresponding decode unit, if it is necessary that at least part of anchor frames of another decode unit be decoded, the anchor frames of that decode unit are also set in the input picture queue. That is, anchor frames of another decode unit required for decoding the corresponding decode unit are also set in the display order information queue.

Then, in the decode setting processing described with reference to the flowcharts in FIGS. 12 and 13, the CPU 20 sets the points of the reference counters based on the picture IDs set in the display order setting queue.

It is now assumed, for example, that pictures IDs are set in the display order setting queue corresponding to GOP(0-1) described with reference to FIG. 35, such as in I(2), P(5), P(8), P(11), P(14), P(17), B(18), B(19), P(20), B(21), B(22), P(23), B(24), B(25), P(26), B(27), B(28), P(29), B(0), B(1), and I(2). When the pointer indicating the display order of, for example, B(21), is set as the self-reference counter, the pointer indicating the display order of P(20), which is the preceding reference image, is set as the preceding reference pointer, and the pointer indicating the display order of P(23), which is the upcoming reference pointer, is set as the upcoming reference pointer. When the pointer indicating the display order of, for example, P(20), is set as the self-reference counter, the pointer indicating the display order of P(17), which is the preceding reference image, is set as the preceding reference pointer. When the pointer indicating the display order of, for example, P(17), is set as the self-reference counter, the pointer indicating the display order of P(14), which is the preceding reference image, is set as the preceding reference pointer. Similarly, the pointers are set in the corresponding self-reference counters, and also, the pointer indicating the display order of P(11) is set as the preceding reference counter for P(14), the pointer indicating the display order of P(8) is set as the preceding reference counter for P(11), the pointer indicating the display order of P(5) is set as the preceding reference counter for P(8), and the pointer indicating the display order of I(2) is set as the preceding reference counter for P(5).

It is determined in step S116 in FIG. 12 that I(2), P(5), P(8), P(11), P(14), and P(17) are not contained in the predetermined 15 frames. However, since they are picture IDs to be decoded, they are not deleted in step S118.

Then, it is determined in step S119 that I(2), P(5), P(8), P(11), P(14), and P(17) are not displayed.

It is determined in step S124 that P(5), P(8), P(11), P(14), and P(17) are P-pictures, and then, in step S125, the CPU 20 increments the corresponding preceding reference counters by one. More specifically, for P(17), the preceding reference counter of P(14) is incremented by one, and similarly, the reference counters of P(11), P(8), P(5), and I(2) are incremented by one for P(14), P(11), P(8), and P(5), respectively.

After step S125, or if it is determined in step S119 that the corresponding frame is not displayed and if it is determined in step S126 that the corresponding frame is an I-picture, in step S127, the CPU 20 sets the corresponding picture ID in the corresponding decode queue and deletes the picture ID from the display order setting queue. That is, I(2), P(5), P(8), P(11), P(14), and P(17) are set in the I/P-picture decode queue.

In this manner, I-pictures and P-pictures other than those contained in the decode unit, i.e., I-pictures and P-pictures to be decoded for decoding anchor frames, are also set in the I/P-picture decode queue, and decode scheduling is conducted so that those pictures are decoded before the anchor frames in the decode unit.

The CPU 20 then controls the decoder 22, 23, or 24 to perform decoding by referring to the register value indicating the decoder that receives the subsequent data. The elementary-stream address determining unit 73 of the decoder 22, 23, or 24 allows, under the control of the controller 20, the memory controller 74 to read the picture data corresponding to the picture ID set in the time-information I/P-picture decode queue from the input buffer 75 and to supply the read data to the decode processor 77.

If the picture to be decoded is an I-picture, the CPU 20 controls the decode processor 77 to decode the I-picture supplied from the memory controller 74 and also controls the write-image address determining unit 78 to supply the decoded frame data to the memory controller 81 and to store it in the video bank memory 82. If the picture to be decoded is a P-picture, the CPU 20 controls the reference-image address determining unit 79 to allow the memory controller 81 to read the reference image stored in the video bank memory 82 based on the reference bank position of the P-picture and to supply the read reference image to the decode processor 77 and controls the decode processor 77 to decode the P-picture supplied from the memory controller 74. The CPU 20 also controls the write-image address determining unit 78 to supply the decode frame data to the memory controller 81 and to store it in the video bank memory 82, and decrements the corresponding preceding reference counter by one. If the picture to be decoded is a B-picture, the CPU 20 controls the reference-image address determining unit 79 to allow the memory controller 81 to read the reference images stored in the video bank memory 82 based on the reference bank positions of the B-picture and to supply the read reference images to the decode processor 77, and controls the decode processor 77 to decode the B-picture supplied from the memory controller 74 and decrements the corresponding preceding and upcoming reference counters by one.

That is, since the reference counters of the I-pictures and P-pictures other than those in the decode unit sequentially become 0, the banks storing those picture IDs can be released and are used for decoding anchor frames or B-pictures.

The GOP dividing/combining processing when the number of pictures forming a GOP is other than 15 is described below with reference to the flowchart of FIG. 47.

In step S601, the CPU 20 determines whether there is any decode unit that has not been scheduled after dividing a GOP.

If an unscheduled decode unit is found in step S601, the process proceeds to step S602 in which the CPU 20 sets scheduling of the unscheduled decode unit in the frame processing shown in FIG. 4 and decodes the decode unit.

If it is determined in step S601 that there is no unscheduled decode unit, the process proceeds to step S603 in which the CPU 20 detects the structures of the subsequent GOP and the GOP after the next, which have not been scheduled.

In step S604, the CPU 20 determines whether the subsequent GOP is greater than the maximum size that can be decoded by one decoder. More specifically, the CPU 20 checks the number of anchor frames of the subsequent GOP and compares the checked number of anchor frames with the suitable number of anchor frames decoded by one decoder, which is determined by the number of banks in one decoder to determine whether the subsequent GOP is greater than the maximum size.

If it is determined in step S604 that the subsequent GOP is greater than the maximum size that can be decoded by one decoder, the process proceeds to step S605 to determine whether the combined size of the subsequent GOP and the GOP after the next is the size that can be decoded by two decoders. More specifically, if the video bank memory 82 has 8 banks, the CPU 20 determines whether the number of anchor frames of the combined GOP is 10 or less, i.e., twice or less than the number obtained by subtracting three from the number of banks in the video bank memory 82.

If it is determined in step S605 that the combined size is a suitable size that can be decoded by two decoders (for example, when a long GOP having 6 or more anchor frames and a short GOP having 4 or less anchor frames are continued, as described with reference to FIGS. 41 through 43B), the process proceeds to step S610.

If it is determined in step S605 that the combined GOP is not a size that can be decoded by two decoders, the process proceeds to step S606. In step S606, the CPU 20 divides the subsequent GOP into a plurality of decode units that can be decoded by one decoder, as in a long GOP having 30 pictures discussed with reference to FIGS. 35 through 37B. The process then proceeds to step S612.

If it is determined in step S604 that the subsequent GOP is not greater than the maximum size that can be decoded by one decoder, the process proceeds to step S607 to determine whether the combined size of the subsequent GOP and the GOP after the next is a suitable size that can be decoded by one decoder.

If it is determined in step S607 that the combined size is a size that can be decoded by one decoder, the process proceeds to step S608. In step S608, the subsequent GOP and the GOP after the next are combined into one decode unit, as in the case where GOPS, each having 4 or less anchor frames, are continued, as described with reference to FIGS. 38 through 40B. The process then proceeds to step S612.

If it is determined in step S607 that the combined size does not become a size that can be decoded by one decoder, the process proceeds to step S609 to determine whether the combined size is a size that can be decoded by two decoders. More specifically, if a short GOP having 4 or less anchor frames and a long GOP having 6 or more anchor frames are continued, as discussed with reference to FIGS. 44 through 46B, and if the video bank memory has 8 banks, the CPU 20 determines whether the number of anchor frames of the combined GOP is 10 frames or less, i.e., twice or less than the number obtained by subtracting 3 from the number of banks in the video bank memory 82.

If it is determined in step S605 or S609 that the combined size becomes a size that can be decoded by two decoders, the process proceeds to step S610. In step S610, the CPU 20 combines the two GOPs and then re-divides them into two decode units, as discussed with reference to FIGS. 41 through 43B or FIGS. 44 through 46B. The process then proceeds to step S612.

If it is determined in step S609 that the combined size does not become a size that can be decoded by two decoders, the process proceeds to step S611 in which the CPU 20 sets the subsequent GOP as one decode unit.

After step S606, S608, S610, or S611, the process proceeds to step S612 in which the CPU 20 schedules the decoding of the subsequent decode unit by performing the frame processing shown in FIG. 4, and decodes the decode unit.

Then, in step S613, if there is any unscheduled divided decode unit, the CPU 20 stores it in a waiting list. The processing is then completed.

According to the above-described GOP dividing/combining processing, even if the number of pictures forming a GOP is other than 15 or even if the number of pictures is different depending on the GOP, the dividing or combining of GOPs can be performed to achieve fast decoding processing.

In the above-described example, the dividing or combining of GOPs to achieve efficient scheduling when the video bank memory 82 of the decoder 22, 23, or 24 has 8 banks has been described. Even if the number of banks (frames) to be stored in the video bank memory 82 is other than 8, the dividing or combining of GOPs is suitably performed in accordance with the number of banks.

After dividing GOPS, in the second decode unit, i.e., in the decode unit having anchor frames that should be decoded after decoding the anchor frames of the previous decode unit, if the number of anchor frames of the second decode unit is 6, the displacement of the display start timing from the decode start timing for decoding the anchor frames of the second decode unit is 6 pictures if the head of the decode unit is an I-picture or P-picture, and is 7 pictures if the head is a B-picture. If the number of anchor frames in the second decode unit is n frames (n is 5 or less), the displacement of the display start timing from the decode start timing is changed based on the number of anchor frames, i.e., it is n frames if the head is an I-picture or P-picture and is n+1 frames if the head is a B-picture.

Figure 48:
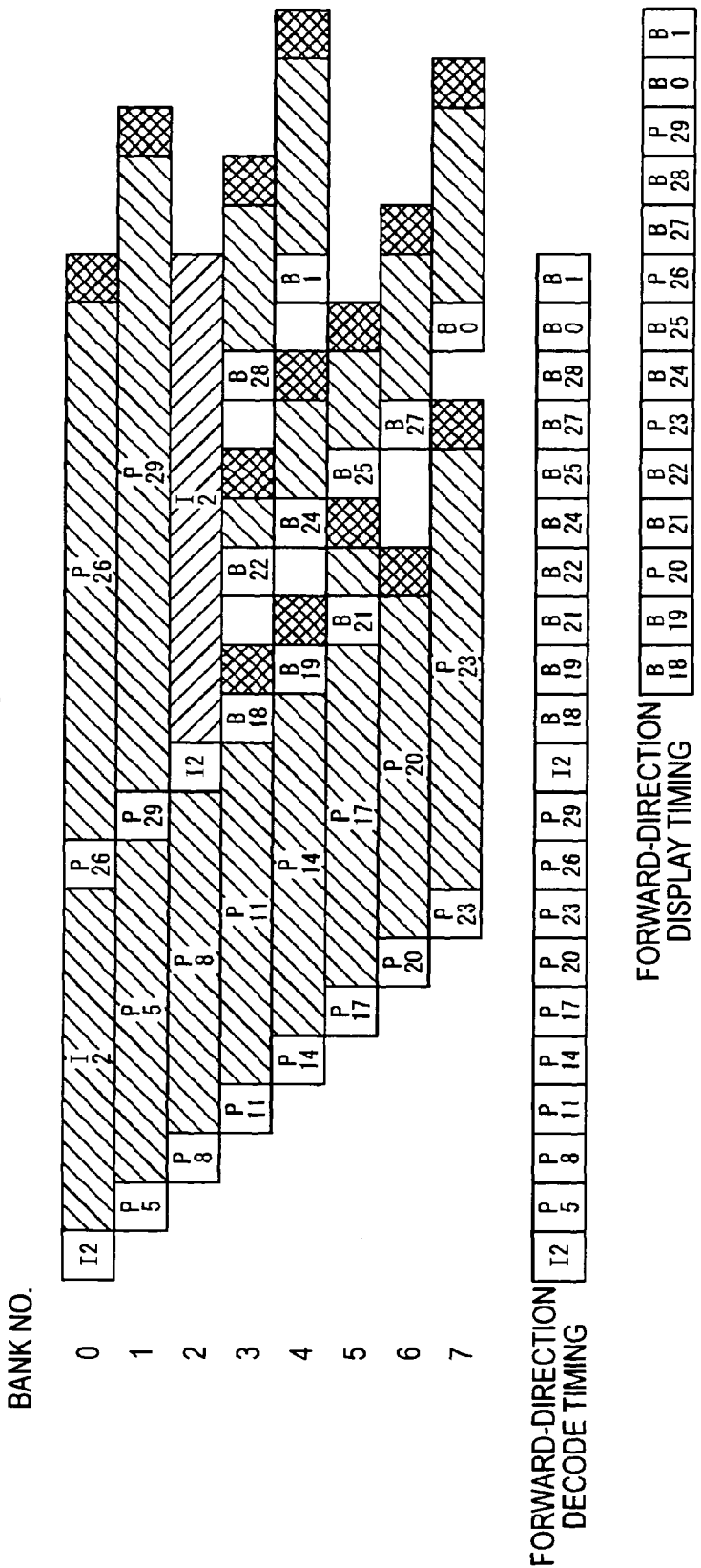
FIG. 48 illustrates decode unit GOP(0-1) shown in FIG. 35 stored in 8 banks of a video bank memory in a ×1 playback operation.

FIG. 48 illustrates the decode unit GOP(0-1) described with reference to FIG. 35 stored in the 8 banks of the video bank memory 82 in the ×1 playback operation.

In banks No. 0 through No. 5, I2, P5, P8, P11, P14, and P17, respectively, of GOP(0-0) to be decoded for decoding the anchor frames of GOP(0-1) are stored in the decoding order. When P5 is decoded, the reference counters of I2 all become 0, and thus, bank No. 0 can be released and overwritten by other data. When P8 is decoded, the reference counters of P5 all become 0, and thus, bank No. 1 can be released and overwritten by other data. When P11 is decoded, the reference counters of P8 all become 0, and thus, bank No. 2 can be released and overwritten by other data. When P14 is decoded, the reference counters of P11 all become 0, and thus, bank No. 3 can be released and overwritten by other data. When P17 is decoded, the reference counters of P14 all become 0, and thus, bank No. 4 can be released and overwritten by other data. Bank No. 5 storing P17 is not released until B18 and B19 of decode unit GOP(0-1) are decoded.

Thereafter, the decoding of frames of the decode unit (0-1) is started. Decoded I-pictures and P-pictures of decode unit (0-1) are sequentially stored in empty banks. Accordingly, P20 is stored in bank No. 6 and P23 is stored in bank No. 7. Then, P26 is stored in the released bank No. 0, P29 is stored in the released bank No. 1, and I2 of the subsequent decode unit is stored in the released bank No. 2. Subsequently, when B18 is stored in bank No. 3 and is displayed, B19 is stored in bank No. 4 at the same time. When B19 is displayed, bank No. 3 storing B18 that has been displayed and bank No. 5 storing P17 that has been used as a reference image are released. B21 is then stored in bank No. 5. Then, banks storing an I-picture or P-picture are released when that picture has been displayed and has been used as a reference image. The decoded B-pictures are sequentially stored in the banks released at the earlier time, and the banks storing B-pictures are released after B-pictures have been displayed. That is, banks storing pictures whose self-reference counters, forward-reference counters, and upcoming-reference counters all become 0 are sequentially released. B-pictures are sequentially stored in the banks released at the earlier time, and banks storing B-pictures are released after B-pictures have been displayed.

Figure 49:
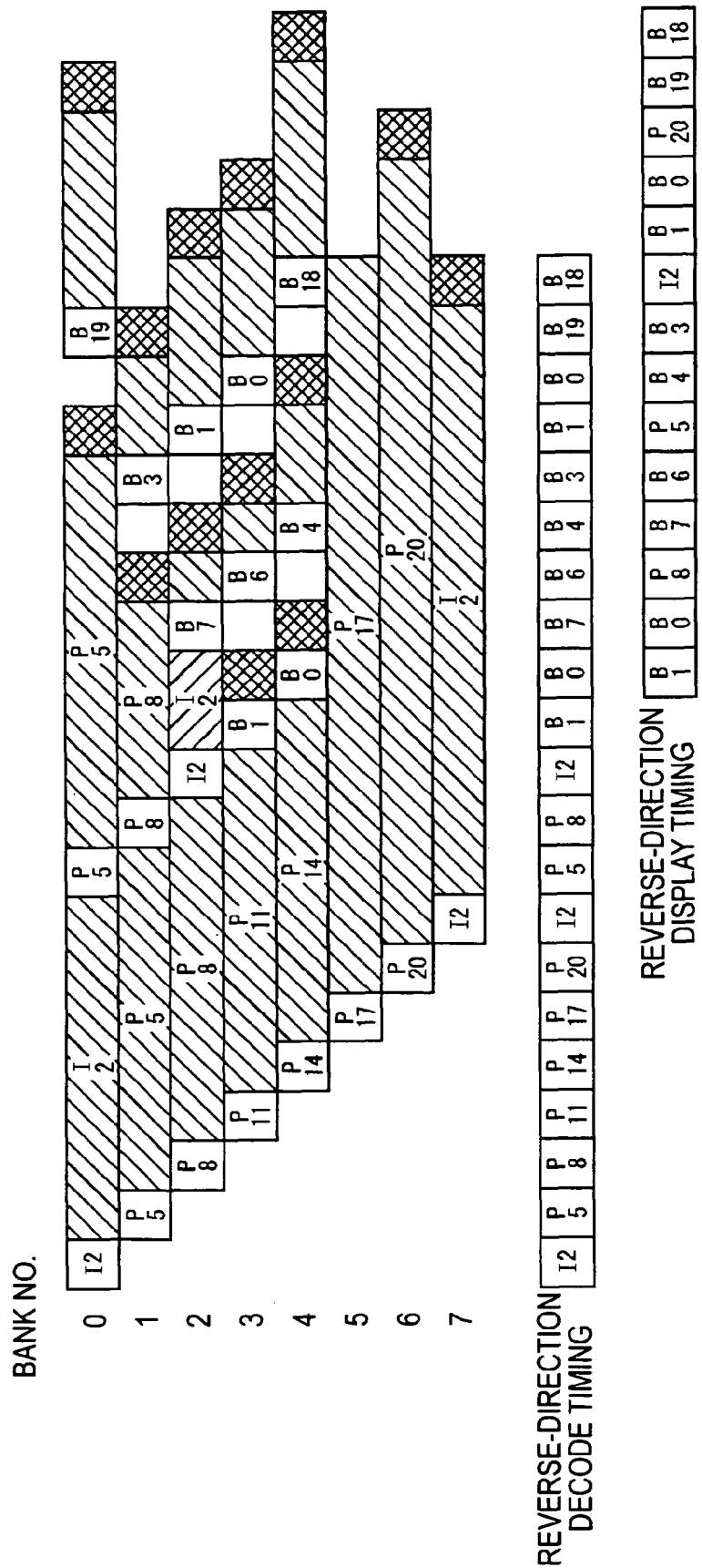
FIG. 49 illustrates decode unit GOP(0-1) shown in FIG. 41 stored in 8 banks of a video bank memory in a ×−1 playback operation.

FIG. 49 illustrates decode unit GOP(0-1) discussed with reference to FIG. 41 stored in the 8 banks of the video bank memory 82 in the ×−1 playback operation.

In banks No. 0 through No. 5, I2, P5, P8, P11, P14, and P17, respectively, of GOP(0-0) to be decoded for decoding the anchor frames of GOP(0-1) are stored in the decoding order. When P5 is decoded, the reference counters of I2 all become 0, and thus, bank No. 0 can be released and overwritten by other data. When P8 is decoded, the reference counters of P5 all become 0, and thus, bank No. 1 can be released and overwritten by other data. When P11 is decoded, the reference counters of P8 all become 0, and thus, bank No. 2 can be released and overwritten by other data. When P14 is decoded, the reference counters of P11 all become 0, and thus, bank No. 3 can be released and overwritten by other data. When P17 is decoded, the reference counters of P14 all become 0, and thus, bank No. 4 can be released and overwritten by other data. Bank No. 5 storing P17 is not released until B18 and B19 of the decode unit GOP(0-1) are decoded.

Thereafter, the decoding of frames of the decode unit(0-1) is started. Decoded I-pictures and P-pictures of decode unit (0-1) are sequentially stored in empty banks. Accordingly, P20 is stored in bank No. 6 and I2 is stored in bank No. 7. Then, P5 is stored in the released bank No. 0, P8 is stored in the released bank No. 1, and I2 of the subsequent decode unit is stored in the released bank No. 2. Subsequently, when B1 is stored in bank No. 3 and is displayed, B0 is stored in bank No. 4 at the same time. When B0 is displayed, bank No. 3 storing B1 that has been displayed and bank No. 2 storing I2 that has been used as a reference image are released. B7 is then stored in bank No. 2. Then, banks storing an I-picture or P-picture are released when that picture has been displayed and has been used as a reference image. The decoded B-pictures are sequentially stored in the banks released at the earlier time, and the banks storing B-pictures are released after B-pictures have been displayed. That is, banks storing pictures whose self-reference counters, forward-reference counters, and upcoming-reference counters all become 0 are sequentially released. In the reverse-direction playback operation as in the example shown in FIG. 49, since P17 stored first in bank No. 5 is referred to by B18 displayed for the last time, bank No. 5 is not released until the display of this GOP is finished.

Figure 50:
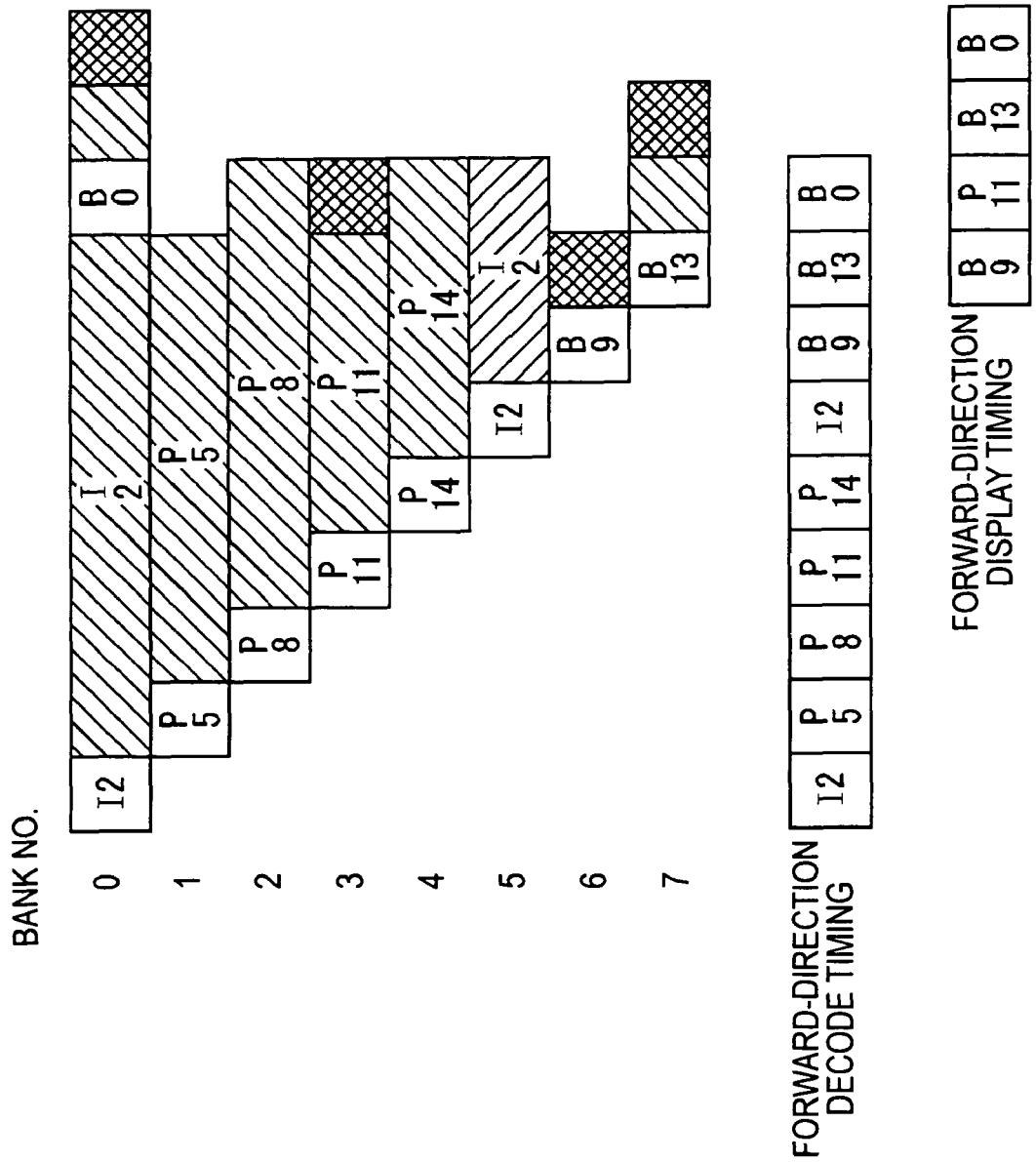
FIG. 50 illustrates decode unit GOP(0-1) shown in FIG. 44 stored in 8 banks of a video bank memory in a ×2 playback operation.

FIG. 50 illustrates decode unit GOP(0-1) discussed with reference to FIG. 44 stored in the 8 banks of the video bank memory 82 in the ×2 playback operation.

In banks No. 0 through No. 2, I2, P5, and P8, respectively, of GOP(0-0) to be decoded for decoding anchor frames of GOP(0-1) are stored in the decoding order. When P5 is decoded, the reference counters of I2 all become 0, and thus, bank No. 0 can be released and overwritten by other data. When P8 is decoded, the reference counters of P5 all become 0, and thus, bank No. 1 can be released and overwritten by other data. Bank No. 2 storing P8 is not released until B9 of the decode unit GOP(0-1) is decoded.

Thereafter, the decoding of frames of the decode unit (0-1) is started. Decoded I-pictures and P-pictures are sequentially stored in the decoding order. Accordingly, P11, P14, and I2 are stored in bank Nos. 3, 4, and 5, respectively. Subsequently, B9 to be displayed first is stored in bank No. 6, and when B9 is displayed, B13 is stored in bank No. 7 at the same time. When P11 is displayed, B0 is stored in the released bank No. 0. That is, banks storing pictures whose self-reference counters, forward-reference counters, and upcoming-reference counters all become 0 are sequentially released. Decoded B-pictures are sequentially stored in the banks released at the earlier time, and the banks storing B-pictures are released after B-pictures have been displayed.

As described above, as in decoding a decode unit, which serves as the decoding processing unit, formed by dividing or combining GOPs, compression-coded video data can be decoded by referring to reference counters without requiring a complicated control operation even if the capacity of a bank memory is small, thereby implementing a fast playback operation, a reverse-direction playback operation, or a fast reverse-direction playback operation.

In the above description, the number of anchor frames contained in one decode unit is set to be the same or smaller than the number of banks fixed for decoding anchor frames. More preferably, by comparing the number of anchor frames of a subject decode unit with that of the previous decode unit, the number of anchor frames is set such that it does not become greater than that of the previous decode unit by m frames (m is an integer greater than 1, which can be set experimentally or empirically, and more preferably, 2 to 4).

For example, if a GOP having one anchor frame and a GOP having 10 anchor frames are continued, the total number of the anchor frames of the two GOPs is 11, and it is difficult to form two decode units from those two GOPs. Accordingly, decoding is conducted such that "one anchor frame+1", "5 anchor frames+1", and "5 anchor frames+1", thereby causing a delay in the decoding processing.

Thus, by comparing the number of anchor frames of the decode unit with that of the previous decode unit, the number of anchor frames is set such that it does not become greater than that of the previous decode unit by 2 or more. In this case, when the total number of anchor frames of the two GOPs is 11, decoding is conducted such that "one anchor frame+1", "3 anchor frames+1", "13 anchor frames+1", and "4 anchor frames+1". Thus, a delay does not occur in the decoding processing.

Additionally, the following flag sets may be provided as metadata for the compression-coded video data stored in the HDD 16. A read flag set indicates whether compression-coded video data stored in the HDD 16 is effective as data to be read from the HDD 16, a decode flag set indicates whether the coded data is effective as data to be decoded based on decode scheduling, and a display flag set indicates whether the coded data is effective as data to be displayed based on the display scheduling. Then, the flag sets are automatically updated according to the playback speed or playback direction, thereby enhancing the management of scheduling.

In this case, a series of scheduling and flag sets used for previous variable-speed playback operations may be separately managed as scheduling metadata (log information). If necessary, the metadata may be embedded in the compression-coded video data as the syntax or recorded in a recording medium, such as the HDD 16.

The number of decoders, the number of banks, the decoder IDs, etc. may be managed as metadata (structure log information). Additionally, the playback speed and playback direction may be managed as metadata (playback log information). In this case, the metadata may be embedded in the compression-coded video data as the syntax, or may be recorded in a recording medium, such as the HDD 16.

By referring to the metadata (log information), the past schedule processing can be reused, thereby making schedule processing faster and more precise.

The above-described metadata may be managed in an external device as a database.

In the above-described embodiment, it is not necessary that the decoder 22, 23, or 24 completely decode compression-coded video data stored in the HDD 16.

More specifically, in the embodiment of the present invention, the decoder 22, 23, or 24 may only decode and dequantize variable-length codes without performing inverse discrete cosine transform (IDCT) or the decoder 22, 23, or 24 may dequantize variable-length codes without decoding them. In this case, the decoder 22, 23, or 24 may generate log information indicating to which degree (for example, to dequantizing) the coding or decoding processing has been executed, and outputs the log information in association with the incompletely decoded data.

Additionally, in the foregoing embodiment, incompletely coded data (for example, data subjected to DCT and quantization without being subjected to variable-length coding) and, if necessary, log information concerning the coding and decoding processing, may be stored in the HDD 16. In this case, the decoder 22, 23, or 24 may decode the incompletely coded data and convert it into a baseband signal under the control of the CPU 20.

More specifically, the decoder 22, 23, or 24 may perform IDCT and dequantization without decoding variable-length codes on incompletely coded data which is subjected to DCT conversion and quantization without being subjected to variable-length coding.

In this case, the CPU 20 may obtain log information concerning the coding and decoding processing stored in the HDD 16 in association with the incompletely coded data, and conducts decoding scheduling based on the obtained log information.

In the foregoing embodiment, incompletely coded data, and if necessary, log information concerning coding and decoding processing, may be stored in the HDD 16, and it is not necessary that the decoder 22, 23, or 24 decode completely the incompletely coded data under the control of the CPU 20.

In this case, too, for example, the CPU 20 may obtain log information concerning the coding and decoding processing stored in the HDD 16 in association with the incompletely coded data, and conducts decoding scheduling based on the obtained log information. The decoder 22, 23, or 24 may also generate log information concerning the coding and decoding processing and outputs it in association with the incompletely decoded data.

In other words, the decoder 22, 23, or 24 may partially conduct decoding (execute part of the steps of the decoding processing) under the control of the CPU 20. The CPU 20 may obtain log information concerning the coding and decoding processing stored in the HDD 16 in association with the incompletely coded data and executes scheduling for decoding performed by the decoder 22, 23, or 24 based on the obtained log information. If necessary, the decoder 22, 23, or 24 may generate log information concerning the coding and decoding processing and outputs the log information in association with the incompletely decoded data.

In the HDD 16, log information concerning the coding and decoding processing may also be stored in association with compression-coded stream data, and the CPU 20 can execute decoding scheduling based on the log information. Even when the decoder 22, 23, or 24 can decode compression-coded stream data under the control of the CPU 20 and convert it into a baseband signal, log information concerning the coding and decoding processing may be generated, if necessary, and is output in association with the baseband signal.

Although in the above-described embodiment the playback apparatus 1 contains a plurality of decoders therein, decoders may be separately provided from the playback apparatus 1.

In this case, each independent decoder can receive and decode compression-coded video data, and display and output the resulting data. Additionally, as described above, each decoder may receive and partially decode compression-coded video data, and outputs the decoded data to an external source together with log information concerning the coding and decoding processing. Alternatively, each decoder may receive and decode partially coded data and converts it into a baseband signal, and outputs it to an external source. Alternatively, each decoder may receive and partially decode partially compression-coded video data and outputs the decoded data to an external source together with log information concerning the coding and decoding processing.

In the foregoing embodiment, the CPU 11 and the CPU 20 are separately provided. However, the CPU 11 and the CPU 20 may be integrated into one CPU for controlling the overall playback apparatus 1, or even if the CPU 11 and the CPU 20 are separately configured, they may be integrated into one chip.

If the CPU 11 and the CPU 20 are separately provided, at least part of the processing executed by the CPU 11 in the foregoing embodiment may be executed by the CPU 20 in a time-sharing manner. Alternatively, part of the processing executed by the CPU 20 may be executed by the CPU 11 in a time-sharing manner. That is, processors that can execute distribute processing may be used as the CPU 11 and the CPU 20.

Alternatively, the playback apparatus 1 may be configured to connect to a network, and at least part of the processing executed by the CPU 11 or the CPU 20 in the above-described embodiment may be executed by a CPU of another apparatus connected to the network.

Similarly, although in the foregoing embodiment the memory 13 and the memory 21 are provided separately, they may be integrated into one memory in the playback apparatus 1.

In the foregoing embodiment, the HDD 16, the decoders 22, 23, and 24, and the selector 25 are connected to each other via the bridges and buses so that they are integrated into the playback apparatus 1. However, some of those elements may be connected externally by wiring or wireless means, or those elements may be connected to each other in another connection mode.

Although in the foregoing embodiment the compressed stream data is stored in the HDD 16, it may be stored in another recording medium, such as an optical disc, a magneto-optical disk, a semiconductor memory, or a magnetic disk.

The CPU 20, the memory 21, the memory 18, the decoders 22, 23, and 24, and the selector 25 are mounted on the same expansion card, for example, a PCI card or a PCI-express card. However, those elements may be separately mounted on different expansion cards if the transfer rate between the cards is high by using, for example, a PCI-express technique.

A coding method other than MPEG, for example, H264/AVC, may be used.

The above-described series of processing jobs may be executed by hardware or software. If software is used, a corresponding software program is installed from a recording medium into a computer built in dedicated hardware or a computer, such as a personal computer, that can execute various functions by installing various program thereinto. In this case, the playback apparatus 1 shown in FIG. 1 can be formed by, for example, a personal computer 201 shown in FIG. 51.

Figure 51:
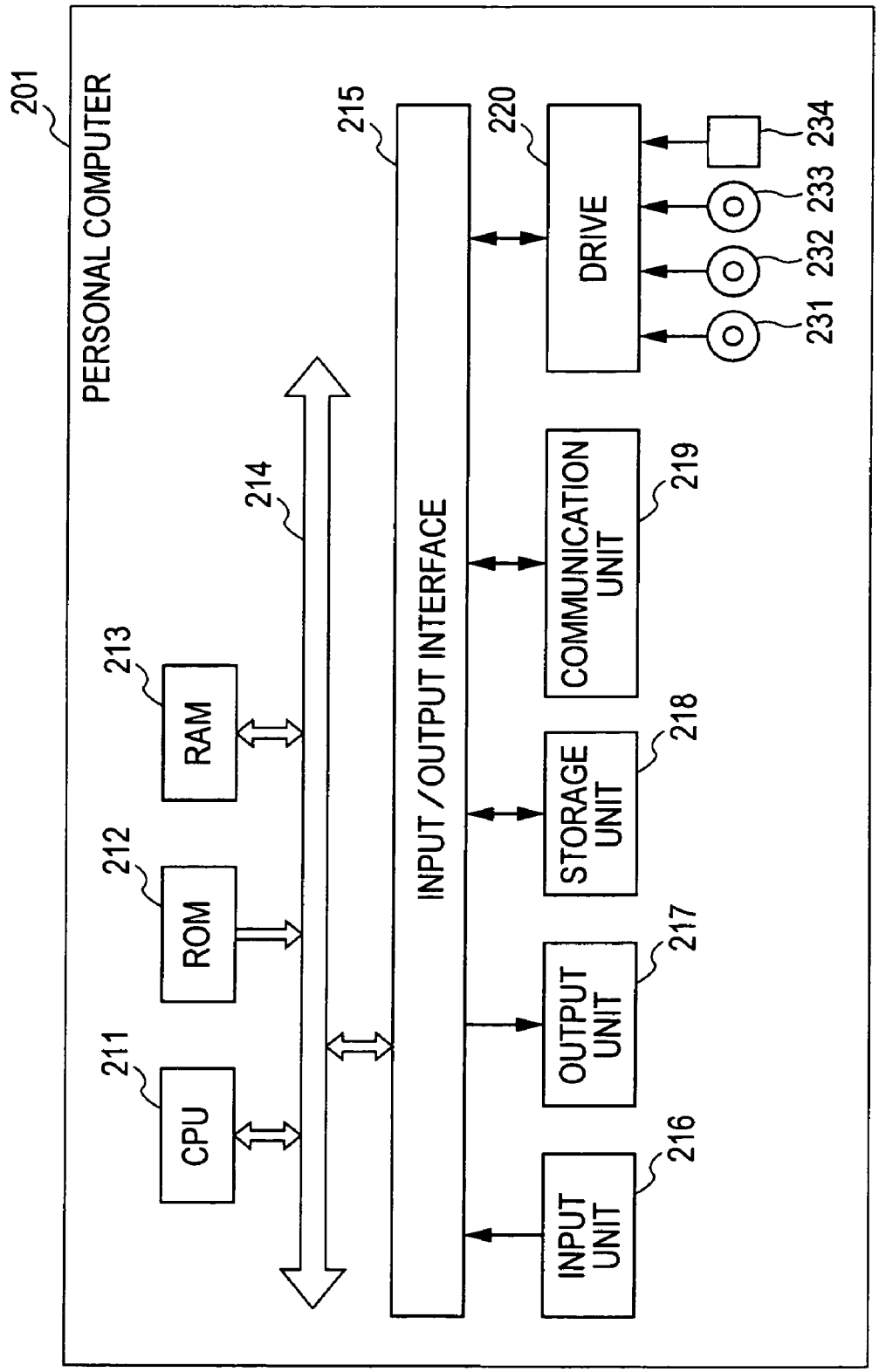
FIG. 51 is a block diagram illustrating the configuration of a personal computer.

In the personal computer 201 shown in FIG. 51, a central processing unit (CPU) 211 executes various processing jobs according to programs stored in a read only memory (ROM) 212 or programs loaded from a storage unit 218 into a random access memory (RAM) 213. In the RAM 213, data required for executing processing by the CPU 211 is also stored.

The CPU 211, the ROM 212, and the RAM 213 are connected to each other via a bus 214. An input/output interface 215 is also connected to the bus 214.

An input unit 216, such as a keyboard and a mouse, an output unit 217, such as a display or a speaker, the storage unit 218, such as a hard disk, and a communication unit 219, such as a modem or a terminal adapter, are connected to the input/output interface 215. The communication unit 219 performs communication via a network, such as the Internet.

A drive 220 is also connected to the input/output interface 215 if necessary, and a magnetic disk 231, an optical disc 232, a magneto-optical disk 233, or a semiconductor memory 234 is installed in the drive 220 if necessary, and a computer program read from such a recording medium is installed into the storage unit 218.

As described above, if software is used for performing a series of processing jobs, a corresponding software program may be installed into a computer from a recording medium or via a network.

Such a recording medium may be a package medium storing the program therein, distributed for providing the program to the user separately from the apparatus, such as the magnetic disk 231 (including a floppy disk), the optical disc 232 (including a compact disk read only memory (CD-ROM) or a digital versatile disk (DVD)), the magneto-optical disk 233 (including a mini disk (MD) (registered trademark)), or the semiconductor memory 234. Alternatively, the recording medium may be the ROM 212 or a hard disk contained in the storage unit 218 storing the program therein, which is supplied to the user while being built in the apparatus.

In this specification, steps forming the program recorded in a recording medium include processing performed in chronological order as described in the specification, and they also include processing executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for decoding compression-coded video data, comprising:
at least one decode means for decoding the compression-coded video data;
supply control means for controlling the supply of the compression-coded video data to the decode means; and
control means for controlling processing executed by the supply control means and the decode means,
wherein the decode means includes a bank memory for storing decoded picture data,
the control means controls a timing at which a picture stored in the bank memory is released by changing a value of a first counter indicating a number of times for which the picture stored in the bank memory is referred to when a P-picture or a B-picture is decoded by the decode means,
the compression-coded video data includes groups of pictures,
upon receiving a group of pictures including I-pictures or P-pictures having a number greater than a value obtained by subtracting three from the number of banks of the bank memory, the control means divides the group of pictures into decoding processing units, each including I-pictures or P-pictures having a number smaller than a value obtained by subtracting two from the number of banks of the bank memory, and controls the supply control means to supply the compression-coded video data of the decoding processing units to the decode means.

2. The information processing apparatus according to claim 1, wherein the control means releases a picture stored in the bank memory by referring to a value of a second counter indicating whether the picture stored in the bank memory has been displayed.

3. The information processing apparatus according to claim 1, wherein the control means determines the order of decoding processing for a plurality of pictures contained in a decoding processing unit for the decoding processing performed by the decode means so that I-pictures and P-pictures are decoded before B-pictures.

4. The information processing apparatus according to claim 1, wherein the bank memory has a number of banks in accordance with the number of pictures contained in a decoding processing unit for the decoding processing performed by the decode means.

5. The information processing apparatus according to claim 4, wherein the bank memory stores the number of pictures greater than the number of I-pictures and P-pictures contained in the decoding processing unit by two.

6. The information processing apparatus according to claim 4, wherein the number of the decode means is three, and each of the decode means includes the bank memory storing 8 pictures.

7. The information processing apparatus according to claim 1, wherein the control means selects pictures to be output from the decode means from among pictures contained in a decoding processing unit for the decoding processing performed by the decode means on the basis of a playback speed instruction provided by playback speed instruction means,
the decode means includes
decode processing execution means for executing decoding processing, and
picture supply control means for controlling the supply of pictures to the decode processing execution means,
the picture supply control means supplies, under the control of the control means, I-pictures and P-pictures, and B-pictures to be selected as pictures output from the decode means to the decode processing execution means among the pictures contained in the decoding processing unit, and
the decode processing execution means decodes each of the pictures supplied from the picture supply control means and also outputs the pictures selected as pictures to be output from the decode means under the control of the control means.

8. The information processing apparatus according to claim 1, wherein, when the picture at the head of the decoding processing unit is an I-picture or a P-picture among the decoded pictures output from the decode means, the control means controls the decode means so that a decode start timing at which the decode means starts decoding and a display output timing at which the decode means starts outputting the decoded pictures are displaced from each other by a first predetermined number of pictures.

9. The information processing apparatus according to claim 8, wherein the first predetermined number is greater than a total number of I-pictures and P-pictures by one.

10. The information processing apparatus according to claim 1, wherein, when the picture at the head of the decoding processing unit is a B-picture among the decoded pictures output from the decode means, the control means controls the decode means so that a decode start timing at which the decode means starts decoding and a display output timing at which the decode means starts outputting the decoded pictures are displaced from each other by a second predetermined number of pictures.

11. The information processing apparatus according to claim 10, wherein the second predetermined number is greater than a total number of I-pictures and P-pictures by two.

12. The information processing apparatus according to claim 1, wherein a plurality of the decode means are provided, the information processing apparatus further comprising:
output switch means for receiving non-compressed data output from the plurality of decode means and for selectively outputting the received non-compressed data,
wherein the control means further controls processing performed by the output switch means.

13. The information processing apparatus according to claim 1, wherein the bank memory has a number of banks smaller than the number of pictures contained in a decoding processing unit for the decoding processing performed by the decode means.

14. The information processing apparatus according to claim 1, wherein the control means forms the decoding processing units such that the total number of the I-pictures or the P-pictures contained in the divided decoding processing units does not become greater by a predetermined number or more than a total number of I-pictures or P-pictures contained in a temporally prior group of pictures or contained in a temporally decoding unit.

15. An information processing apparatus for decoding compression-coded video data, comprising:
- at least one decode means for decoding the compression-coded video data;
- supply control means for controlling the supply of the compression-coded video data to the decode means; and
- control means for controlling processing executed by the supply control means and the decode means,
- wherein the decode means includes a bank memory for storing decoded picture data,
- the control means controls a timing at which a picture stored in the bank memory is released by changing a value of a first counter indicating a number of times for which the picture stored in the bank memory is referred to when a P-picture or a B-picture is decoded by the decode means,
- wherein the compression-coded video data includes groups of pictures, and
- upon receiving a first group of pictures including I-pictures or P-pictures having a number smaller than a value obtained by subtracting three from the number of banks of the bank memory, the control means detects a structure of a second group of pictures temporally continuous from the first group of pictures, and, if the total number of the I-pictures or the P-pictures contained in the first group of pictures and the second group of pictures is smaller than a value obtained by subtracting two from the number of banks of the bank memory, the control means combines the first group of pictures and the second group of pictures to form a decoding processing unit, and controls the supply control means to supply the compression-coded video data of the decoding processing unit to the decode means.

16. The information processing apparatus according to claim 15, wherein the control means forms the decoding processing unit such that the total number of the I-pictures or the P-pictures contained in the combined decoding processing unit does not become greater than a total number of I-pictures and P-pictures contained in a temporally prior group of pictures by a predetermined number or more.

17. An information processing apparatus for decoding compression-coded video data, comprising:
- at least one decode means for decoding the compression-coded video data;
- supply control means for controlling the supply of the compression-coded video data to the decode means; and
- control means for controlling processing executed by the supply control means and the decode means,
- wherein the decode means includes a bank memory for storing decoded picture data,
- the control means controls a timing at which a picture stored in the bank memory is released by changing a value of a first counter indicating a number of times for which the picture stored in the bank memory is referred to when a P-picture or a B-picture is decoded by the decode means,
- wherein the compression-coded video data includes groups of pictures, and
- the control means detects a structure of a first group of pictures and a structure of a second group of pictures temporally continuous from the first group of pictures, and if the total number of I-pictures or P-pictures contained in the first group of pictures and the second group of pictures is smaller than a twice a value obtained by subtracting three from the number of banks of the bank memory, the control means combines the first group of pictures and the second group of pictures and then divides the combined group of pictures to form a first decoding processing unit and a second decoding processing unit, each including the I-pictures or the P-pictures smaller than a value obtained by subtracting two from the number of banks of the bank memory, and the control means controls the supply control means to individually supply the compression-coded video data of the first decoding processing unit and the compression-coded video data of the second decoding processing unit to the decode means.

18. The information processing apparatus according to claim 17, wherein the control means forms the first decoding processing unit and the second decoding processing unit such that the total number of the I-pictures or the P-pictures contained in the first decoding processing unit and the second decoding processing unit does not become greater than the total number of the I-pictures or the P-pictures of a temporally prior decoding processing unit or a temporally prior group of pictures by a predetermined number or more.

19. An information processing method for an information processing apparatus that decodes compression-coded video data, comprising the steps of:
- setting a counter indicating a number of times for which a picture stored in a bank memory is referred to when a P-picture or a B-picture is decoded;
- determining an order of the decoding processing for pictures contained in a decoding processing unit so that I-pictures and P-pictures are decoded before B-pictures;
- controlling execution of the decoding processing on a basis of the determined order of the decoding processing by using the bank memory having a number of banks which is determined in accordance with a number of pictures contained in the decoding processing unit; and
- controlling a timing at which a picture stored in the bank memory is released by changing a value of the counter indicating the number of times for which the picture stored in the bank memory is referred to when a P-picture or a B-picture is decoded in the controlled decoding processing,
- wherein the compression-coded video data includes groups of pictures,
- upon receiving a group of pictures including I-pictures or P-pictures having a number greater than a value obtained by subtracting three from the number of banks of the bank memory, dividing the group of pictures into decoding processing units, each including I-pictures or P-pictures having a number smaller than a value obtained by subtracting two from the number of banks of the bank memory, and supplying the compression-coded video data of the decoding processing units to a decoder.

20. A non-transitory recording medium encoded with instructions, which when executed by a computer causes the computer to execute processing for decoding compression-coded video data is recorded, the processing comprising the steps of:
- setting a counter indicating a number of times for which a picture stored in a bank memory is referred to when a P-picture or a B-picture is decoded;
- determining an order of the decoding processing for pictures contained in a decoding processing unit so that I-pictures and P-pictures are decoded before B-pictures;
- controlling execution of the decoding processing on a basis of the determined order of the decoding processing by using the bank memory having a number of banks which is determined in accordance with a number of pictures contained in the decoding processing unit; and controlling a timing at which a picture stored in the bank memory is released by changing a value of the counter indicating the number of times for which the picture stored in the bank memory is referred to when a P-picture or a B-picture is decoded in the controlled decoding processing, wherein the compression-coded video data includes groups of pictures, upon receiving a group of pictures including I-pictures or P-pictures having a number greater than a value obtained by subtracting three from the number of banks of the bank memory, dividing the group of pictures into decoding processing units, each including I-pictures or P-pictures having a number smaller than a value obtained by subtracting two from the number of banks of the bank memory, and supplying the compression-coded video data of the decoding processing units to a decoder.

21. An information processing apparatus for decoding compression-coded video data including I-pictures, P-pictures, and B-pictures, comprising:

at least one decoder that decodes the compression-coded video data;

a supply controller that controls the supply of the compression-coded video data to the decoder; and a processor that controls processing executed by the supply controller and the decoder, wherein the decoder includes a bank memory for storing decoded picture data, the processor controls a timing at which a picture stored in the bank memory is released by changing a value of a first counter indicating a number of times for which the picture stored in the bank memory is referred to when a P-picture or a B-picture is decoded by the decoder, the compression-coded video data includes groups of pictures, upon receiving a group of pictures including I-pictures or P-pictures having a number greater than a value obtained by subtracting three from the number of banks of the bank memory, the processor divides the group of pictures into decoding processing units, each including I-pictures or P-pictures having a number smaller than a value obtained by subtracting two from the number of banks of the bank memory, and controls the supply controller to supply the compression-coded video data of the decoding processing units to the decoder.

* * * * *